United States Patent [19]
Uemura et al.

[11] Patent Number: 5,519,646
[45] Date of Patent: May 21, 1996

[54] CALCULATOR WITH DISPLAY OF PROCESSING FOR MULAS AS PROCESSING PROGRESSES

[75] Inventors: Syuji Uemura, Yamatokoriyama; Yoshihiro Okuda; Syuuji Kaya; Toshiro Oba; Akiyoshi Satoh, all of Nara; Katsumasa Tsuneyoshi, Higashiosaka; Fumiaki Kawawaki; Takafumi Bannai, both of Nara, all of Japan

[73] Assignee: Sharp Kabushiki Kaisha, Osaka, Japan

[21] Appl. No.: 274,412

[22] Filed: Jul. 13, 1994

[30] Foreign Application Priority Data

Jul. 15, 1993 [JP] Japan .................................. 5-175472
Dec. 28, 1993 [JP] Japan .................................. 5-336897

[51] Int. Cl.$^6$ ...................................................... G06F 3/147
[52] U.S. Cl. ................................ 364/709.12; 364/710.03; 364/710.14
[58] Field of Search ...................... 364/704.12, 710.03, 364/710.14

[56] References Cited

U.S. PATENT DOCUMENTS

| | | | |
|---|---|---|---|
| 3,971,924 | 7/1976 | Ozawa et al. | 364/710.03 |
| 4,181,965 | 1/1980 | Olander, Jr. et al | 364/710.05 |
| 4,225,932 | 9/1980 | Hirano et al. | 364/710.03 |
| 4,386,412 | 5/1983 | Ito | 364/710.14 |
| 4,580,235 | 4/1986 | Yanagawa | 364/710.05 |
| 4,954,977 | 9/1990 | Colombat | 364/710.03 |

FOREIGN PATENT DOCUMENTS

| | | |
|---|---|---|
| 48-24639 | 3/1973 | Japan . |
| 62-157960 | 7/1987 | Japan . |
| 2-176849 | 7/1990 | Japan . |
| 4-297948 | 10/1992 | Japan . |

*Primary Examiner*—David H. Malzahn
*Attorney, Agent, or Firm*—Nixon & Vanderhye

[57] ABSTRACT

The invention provides a calculator wherein it is possible to start an operation on the basis of an inputted formula and successively know the progress processes of operation until an operation result is obtained. An inputted formula edited on the basis of the data inputted from a keyboard is once displayed and the calculator is placed in the state of waiting for key entry. Then, when a Enter key is pressed down, only the operator codes selected among plural operator codes in the inputted formula in accordance with the priority order of operation are processed and a process formula as the result of the processing is displayed. Thereafter, every time the Enter key is pressed down, the operation is executed in accordance with the priority order and the process formulas obtained in the respective operations are successively displayed. Accordingly, the user of the calculator can successively recognize the respective intermediate processes as process formulas as well as the operation result of the inputted formula.

13 Claims, 60 Drawing Sheets

IP: CODE POINTING POINTER DURING INPUT PROCESSING
OP: NEXT CODE OUTPUT POSITION POINTING POINTER
LP: NUMERICAL CODE POINTING POINTER NEXT TO CODE OUTPUTTED JUST BEFORE
PP: OPERATOR CODE POINTING POINTER ONE BEFORE CODE UNDER PROCESSING

Fig.15A
PROCESS DISPLAY: 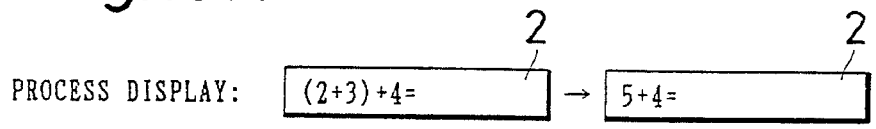
Fig.15B
Fig.15C
| PROCESSING PROCEDURE | PROCESSING CODE | NUMERICAL VALUE BUFFER | FUNCTION BUFFER | OPERATION BUFFER | Kako | OUTPUTTED FORMULA |
|---|---|---|---|---|---|---|
| (1) | | | | | 0 | |
| (2) | ( | | ( | | 1 | |
| (3) | 2 | | ( | 2 | 1 | |
| (4) | + | 2 | (<br>+ | | 1 | |
| (5) | 3 | 2 | (<br>+ | 3 | 1 | |
| (6) | ) | | | | 0 | 5 |
| (7) | + | | | | 0 | 5+ |
| (8) | 4 | | | | 0 | 5+4 |
| (9) | = | | | | 0 | 5+4= |

Fig.16A
PROCESS DISPLAY: 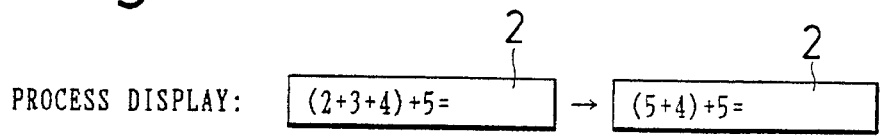
Fig.16B
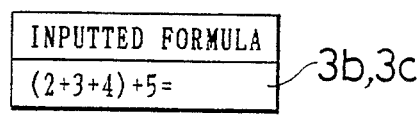
Fig.16C
| PROCESSING PROCEDURE | PROCESSING CODE | NUMERICAL VALUE BUFFER | FUNCTION BUFFER | OPERATION BUFFER | Kako | OUTPUTTED FORMULA |
|---|---|---|---|---|---|---|
| (1) |  |  |  |  | 0 |  |
| (2) | ( |  | ( |  | 1 |  |
| (3) | 2 |  | ( | 2 | 1 |  |
| (4) | + | 2 | (<br>+ |  | 1 |  |
| (5) | 3 | 2 | (<br>+ | 3 | 1 |  |
| (6) | + |  |  |  | 0 | (5+ |
| (7) | 4 |  |  |  | 0 | (5+4 |
| (8) | ) |  |  |  | 0 | (5+4) |
| (9) | + |  |  |  | 0 | (5+4)+ |
| (10) | 5 |  |  |  | 0 | (5+4)+5 |
| (11) | = |  |  |  | 0 | (5+4)+5= |

Fig.19A
PROCESS DISPLAY: 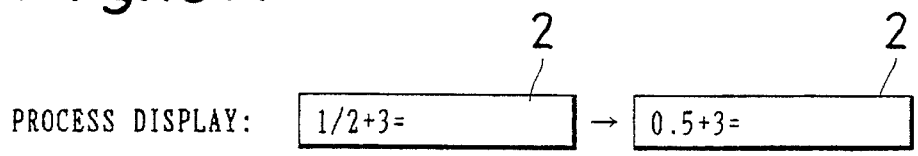
Fig.19B
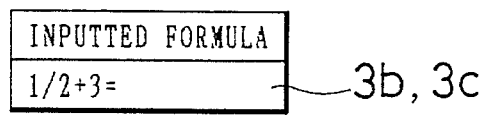
Fig.19C
| PROCESSING PROCEDURE | PROCESSING CODE | NUMERICAL VALUE BUFFER 3d | FUNCTION BUFFER 3e | OPERATION BUFFER 3f | OUTPUTTED FORMULA 3c |
|---|---|---|---|---|---|
| (1) | 1 |  |  | 1 |  |
| (2) | / | 1 | / |  |  |
| (3) | 2 | 1 | / | 2 |  |
| (4) | + |  |  |  | 0.5+ |
| (5) | 3 |  |  |  | 0.5+3 |
| (6) | = |  |  |  | 0.5+3= |

Fig. 20A

PROCESS DISPLAY: | 1/(2+3)+4= | → | 1/5+4= |

Fig. 20B

| INPUTTED FORMULA |
| 1/(2+3)+4= |   — 3b, 3c

Fig. 20C

| PROCESSING PROCEDURE | PROCESSING CODE | NUMERICAL VALUE BUFFER (3d) | FUNCTION BUFFER (3e) | OPERATION BUFFER (3f) | OUTPUTTED FORMULA (3c) |
|---|---|---|---|---|---|
| (1) | 1 |   |   | 1 |   |
| (2) | / | 1 | / |   |   |
| (3) | ( | 1 | / <br> ( |   |   |
| (4) | 2 | 1 | / <br> ( | 2 |   |
| (5) | + | 1 <br> 2 | / <br> ( <br> + |   |   |
| (6) | 3 | 1 <br> 2 | / <br> ( <br> + | 3 |   |
| (7) | ) | 1 <br> 2 <br> 3 | / <br> ( <br> + <br> ) |   | 1/5 |
| (8) | + |   |   |   | 1/5+ |
| (9) | 4 |   |   |   | 1/5+4 |
| (10) | = |   |   |   | 1/5+4= |

Fig.23A
PROCESS DISPLAY: 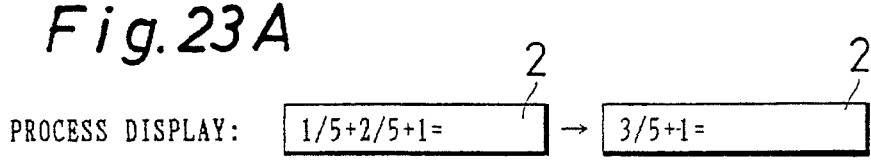
Fig.23B
Fig.23C
| PROCESSING PROCEDURE | PROCESSING CODE | NUMERICAL VALUE BUFFER | FUNCTION BUFFER | OPERATION BUFFER | DISP | OUTPUTTED FORMULA |
|---|---|---|---|---|---|---|
| (1) | 1 |   |   | 1 | 0 |   |
| (2) | / | 1 | / |   | 0 |   |
| (3) | 5 | 1 | / | 5 | 0 |   |
| (4) | + | 1<br>5 | /<br>+ |   | 0 |   |
| (5) | 2 | 1<br>5 | /<br>+ | 2 | 0 |   |
| (6) | / | 1<br>5<br>2 | /<br>+<br>/ |   | 0 |   |
| (7) | 5 | 1<br>5<br>2 | /<br>+<br>/ | 5 | 0 |   |
| (8) | + |   |   |   | 0 | 3/5+ |
| (9) | 1 |   |   | 1 | 0 | 3/5+ |
| (10) | = |   |   |   | 0 | 3/5+1= |

Fig.24A
PROCESS DISPLAY:
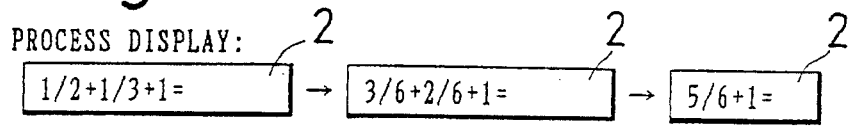
Fig.24B
Fig.24C
| PROCESSING PROCEDURE | PROCESSING CODE | NUMERICAL VALUE BUFFER 3d | FUNCTION BUFFER 3e | OPERATION BUFFER 3f | disp | OUTPUTTED FORMULA 3c |
|---|---|---|---|---|---|---|
| (1) | 1 | | | 1 | 0 | |
| (2) | / | 1 | / | | 0 | |
| (3) | 2 | 1 | / | 2 | 0 | |
| (4) | + | 1<br>2 | /<br>+ | | 0 | |
| (5) | 1 | 1<br>3 | /<br>+ | 1 | 0 | |
| (6) | / | 1<br>3<br>1 | /<br>+<br>/ | | 0 | |
| (7) | 3 | 1<br>5<br>2 | /<br>+<br>/ | 3 | 0 | |
| (8) | + | | | | 1 | 3/6+2/6+ |
| (9) | 1 | | | 1 | 1 | 3/6+2/6+ |
| (10) | = | | | | 1 | 3/6+2/6+1= |
Fig.24D
disp = 1

Fig.24E

| PROCESSING PROCEDURE | PROCESSING CODE | NUMERICAL VALUE BUFFER | FUNCTION BUFFER | OPERATION BUFFER | disp | OUTPUTTED FORMULA |
|---|---|---|---|---|---|---|
| (1) | 3 |   |   | 3 | 0 |   |
| (2) | / | 3 | / |   | 0 |   |
| (3) | 6 | 3 | / | 6 | 0 |   |
| (4) | + | 3<br>6 | /<br>+ |   | 0 |   |
| (5) | 2 | 3<br>6 | /<br>+ | 2 | 0 |   |
| (6) | / | 3<br>6<br>2 | /<br>+<br>/ |   | 0 |   |
| (7) | 6 | 3<br>6<br>2 | /<br>+<br>/ | 6 | 0 |   |
| (8) | + |   |   |   | 0 | 5/6+ |
| (9) | 1 |   |   | 1 | 0 | 5/6+ |
| (10) | = |   |   |   | 0 | 5/6+1= |

Fig.26A
PROCESS DISPLAY:
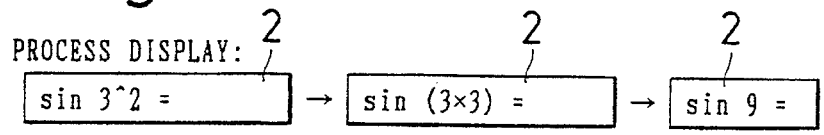
Fig.26B
Fig.26C
| PROCESSING PROCEDURE | PROCESSING CODE | NUMERICAL VALUE BUFFER | FUNCTION BUFFER | OPERATION BUFFER | disp | OUTPUTTED FORMULA |
|---|---|---|---|---|---|---|
| (1) | sin | | sin | | 0 | |
| (2) | 3 | | sin | 3 | 0 | |
| (3) | ^ | 3 | sin ^ | | 0 | |
| (4) | 2 | 3 | sin ^ | 2 | 0 | |
| (5) | = | | | | 1 | sin(3×3)= |
Fig.26D

Fig.26E

| PROCESSING PROCEDURE | PROCESSING CODE | NUMERICAL VALUE BUFFER 3d | FUNCTION BUFFER 3e | OPERATION BUFFER 3f | disp | OUTPUTTED FORMULA 3c |
|---|---|---|---|---|---|---|
| (1) | sin | | sin | | 0 | |
| (2) | ( | | sin<br>( | | 0 | |
| (3) | 3 | | sin<br>( | 3 | 0 | |
| (4) | × | 3 | sin<br>(<br>× | | 0 | |
| (5) | 3 | 3 | sin<br>(<br>× | 3 | 0 | |
| (6) | ) | 3<br>3 | sin<br>(<br>× | | 0 | sin 9 |
| (7) | = | | | | 0 | sin 9= |

Fig. 27A

PROCESS DISPLAY: | 3^2+1= |—2 → | 3×3+1= |—2

| PATH FOR DEVELOPMENT OF POWER |

Fig. 27B

| INPUTTED FORMULA |
| 3^2+1= | —3b, 3c

Fig. 27C

| PROCESSING PROCEDURE | PROCESSING CODE | NUMERICAL VALUE BUFFER (3d) | FUNCTION BUFFER (3e) | OPERATION BUFFER (3f) | conv | OUTPUTTED FORMULA (3c) |
|---|---|---|---|---|---|---|
| (1) | 3 |   |   | 3 | 0 |   |
| (2) | ^ | 3 | ^ |   | 0 |   |
| (3) | 2 | 3 | ^ | 2 | 0 |   |
| (4) | + |   |   |   | 1 | 3×3+ |
| (5) | 1 |   |   |   | 1 | 3×3+1 |
| (6) | = |   |   |   | 1 | 3×3+1= |

Fig.28A
PROCESS DISPLAY: 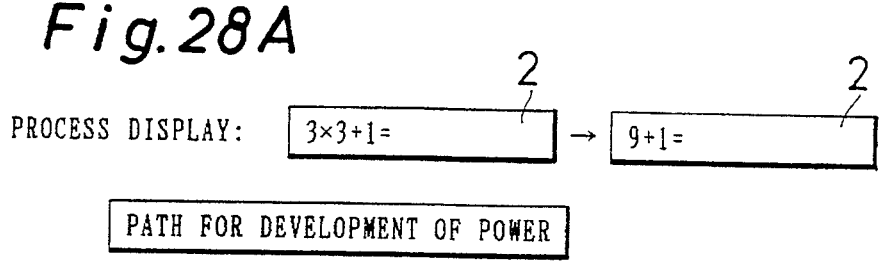
PATH FOR DEVELOPMENT OF POWER
Fig.28B
Fig.28C
| PROCESSING PROCEDURE | PROCESSING CODE | NUMERICAL VALUE BUFFER | FUNCTION BUFFER | OPERATION BUFFER | conv | OUTPUTTED FORMULA |
|---|---|---|---|---|---|---|
| (1) | 3 | | | 3 | 0 | |
| (2) | × | | | | 0 | |
| (3) | 3 | | | 3 | 0 | |
| (4) | + | | | | 0 | |
| (5) | 1 | | | | 0 | |
| (6) | = | | | | 0 | |
PATH FOR OPERATION

| INPUTTED FORMULA |
|---|
| 3×3+1= |

― 3b, 3c

| PROCESSING PROCEDURE | PROCESSING CODE | NUMERICAL VALUE BUFFER 3d | FUNCTION BUFFER 3e | OPERATION BUFFER 3f | conv | OUTPUTTED FORMULA 3c |
|---|---|---|---|---|---|---|
| (1) | 3 |  |  | 3 | 0 |  |
| (2) | × | 3 | × |  | 0 |  |
| (3) | 3 | 3 | × | 3 | 0 |  |
| (4) | + |  |  |  | 1 | 9+ |
| (5) | 1 |  |  |  | 1 | 9+1 |
| (6) | = |  |  |  | 1 | 9+1= |

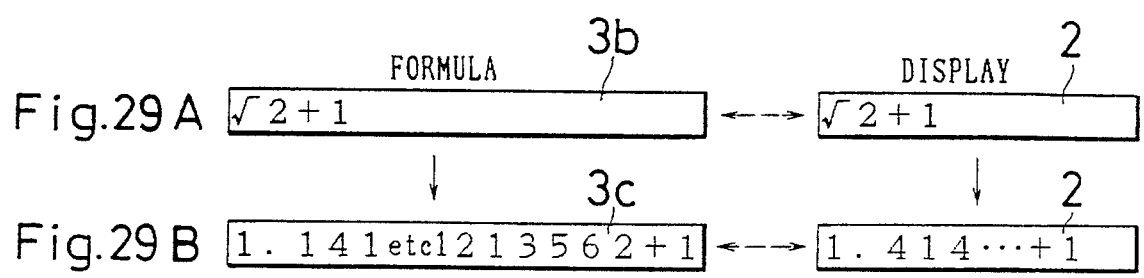
Fig.29A
Fig.29B
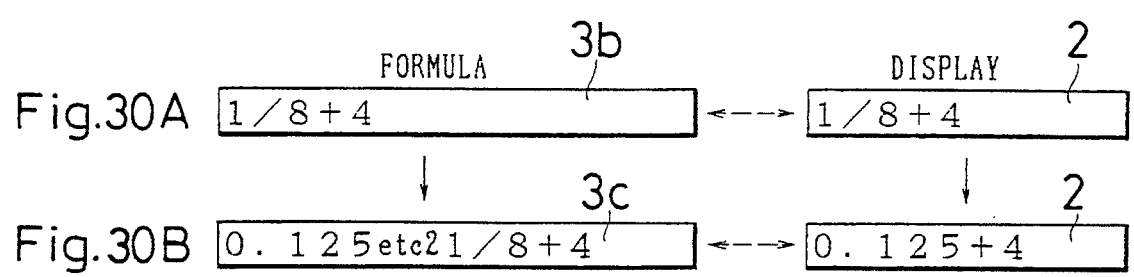
Fig.30A
Fig.30B

31~36 PROCESS FORMULAS 40-45 PROCESS FORMULAS

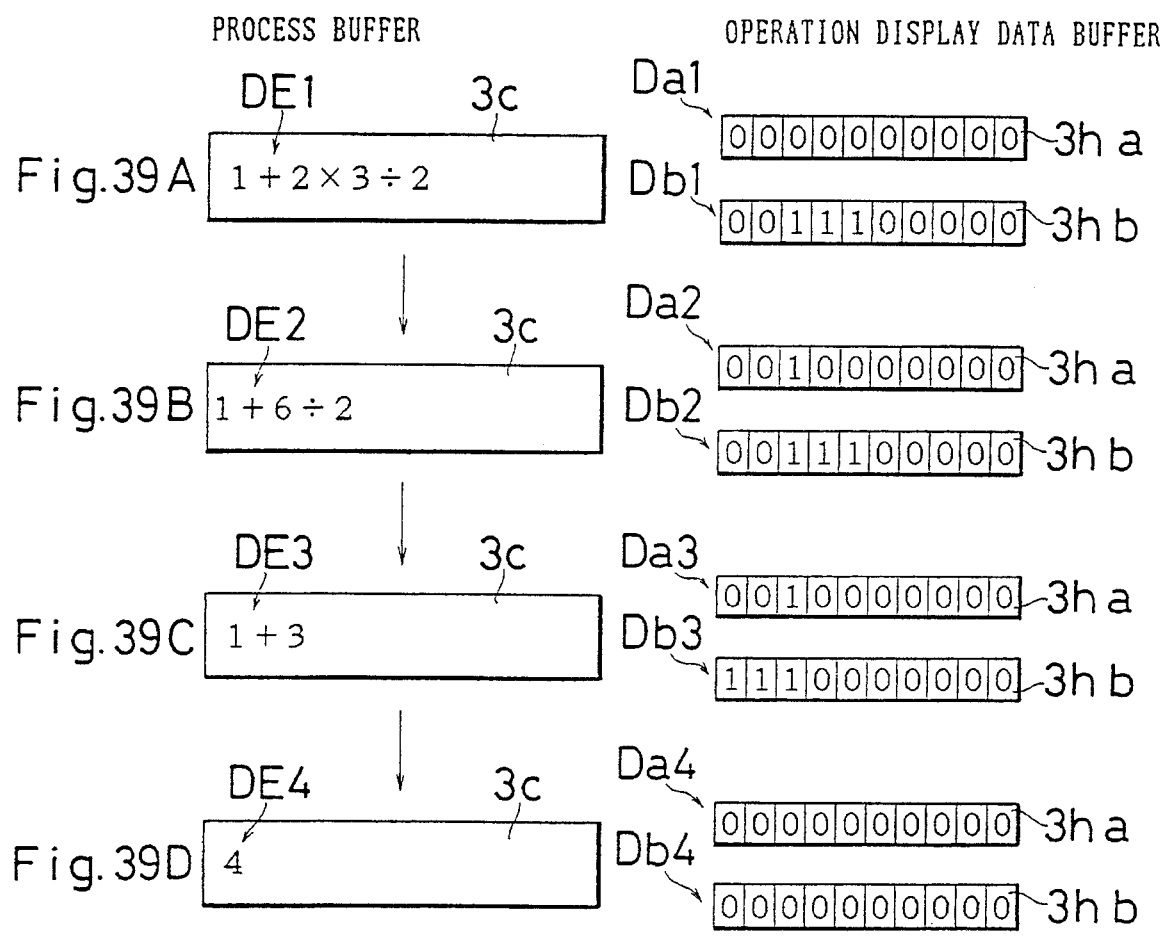

DISPLAY FORMULA

PROCESS BUFFER DATA AND
OPERATION DISPLAY DATA TO BE USED
(SEE FIG.39)

Fig. 40A  | 1 + 2 × 3 ÷ 2 |

PROCESS BUFFER DATA DE1
OPERATION DISPLAY DATA Da1

17 [ADVANCE] ↓  ↑ [RETURN] 18

Fig. 40B  | 1 + <u>2 × 3</u> ÷ 2 |

PROCESS BUFFER DATA DE1
OPERATION DISPLAY DATA Db1

17 [ADVANCE] ↓  ↑ [RETURN] 18

Fig. 40C  | 1 + <u>6</u> ÷ 2 |

PROCESS BUFFER DATA DE2
OPERATION DISPLAY DATA Da2

17 [ADVANCE] ↓  ↑ [RETURN] 18

Fig. 40D  | 1 + <u>6 ÷ 2</u> |

PROCESS BUFFER DATA DE2
OPERATION DISPLAY DATA Db2

17 [ADVANCE] ↓  ↑ [RETURN] 18

Fig. 40E  | 1 + <u>3</u> |

PROCESS BUFFER DATA DE3
OPERATION DISPLAY DATA Da3

17 [ADVANCE] ↓  ↑ [RETURN] 18

Fig. 40F  | <u>1 + 3</u> |

PROCESS BUFFER DATA DE3
OPERATION DISPLAY DATA Db3

17 [ADVANCE] ↓  ↑ [RETURN] 18

Fig. 40G  | 4 |

PROCESS BUFFER DATA DE4
OPERATION DISPLAY DATA Da4

Fig. 41
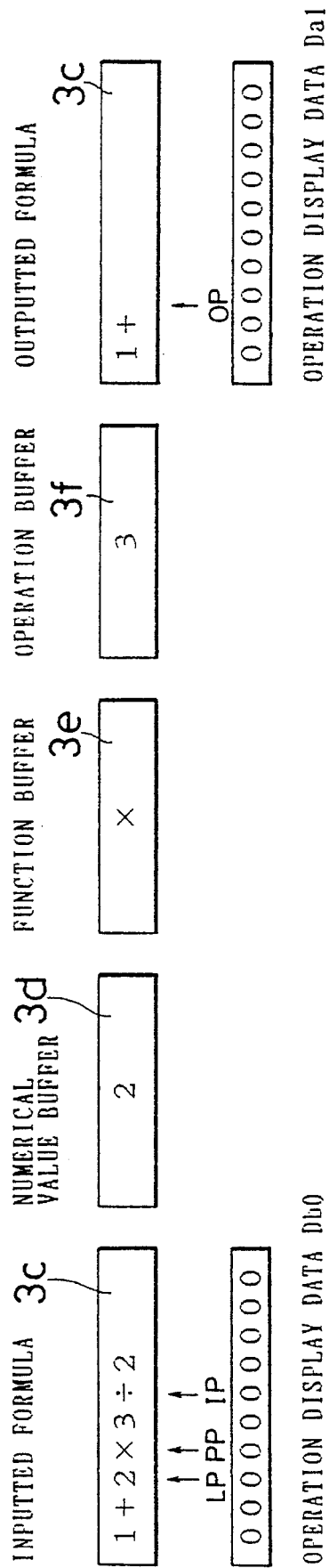
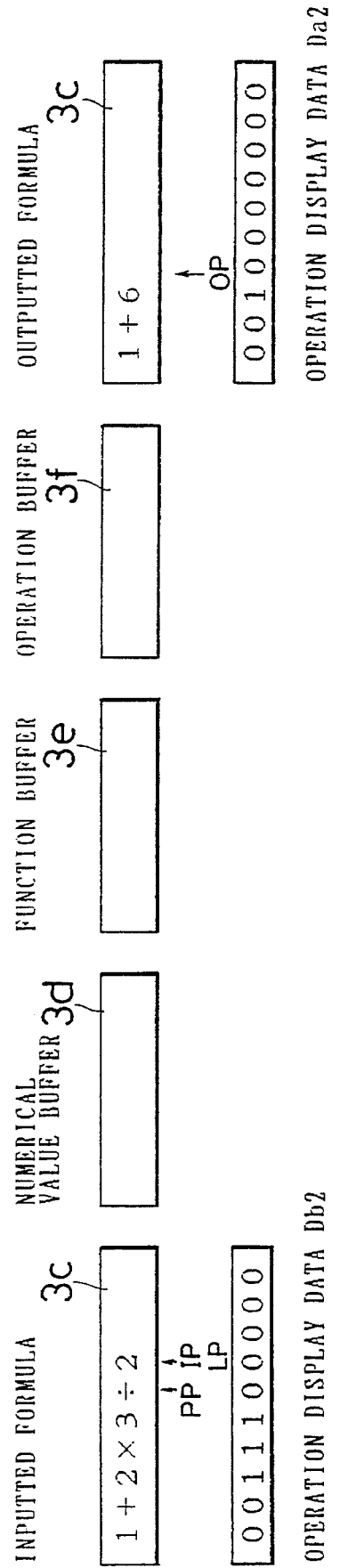

Fig.46A  [5×2÷3×3]  17 [ADVANCE]  [RETURN]  2  18

Fig.46B  [10÷3×3]  17 [ADVANCE]  [RETURN]  2  18

Fig.46C  [3.3333333×3]  17 [ADVANCE]  [RETURN]  2  18

Fig.46D  [9.9999999]  2

Fig.46E  [10]  17 [ADVANCE]  [RETURN]  2  18

LEVEL 1

LEVEL 2

INDEPENDENT POWER OPERATION

POWER OPERATION IN FORMURA

Fig.54A

| PRIME NUMBER | NUMERATOR COUNTER |
|---|---|
| 2 | 0 |
| 3 | 0 |
| 5 | 0 |
| ⋮ | ⋮ |
| (n-th PRIME NUMBER) | 0 |

| PRIME NUMBER | DENOMINATOR COUNTER |
|---|---|
| 2 | 0 |
| 3 | 0 |
| 5 | 0 |
| ⋮ | ⋮ |
| (n-th PRIME NUMBER) | 0 |

| | STACK | 15 | ~3k |
| --- | --- | --- | --- |
| | | PRIME NUMBER | NUMERATOR COUNTER |
| NUMERATOR | | 2 | 0 |
| COUNTER TABLE | | 3 | 0 |
| | | 5 | 0 |
| | | . | . |
| | | . | . |
| | | . | . |
| | | (n-th PRIME NUMBER) | 0 |

| | STACK | 5 | ~3k |
| --- | --- | --- | --- |
| | | PRIME NUMBER | NUMERATOR COUNTER |
| NUMERATOR | | 2 | 0 |
| COUNTER TABLE | | 3 | 1 |
| | | 5 | 0 |
| | | . | . |
| | | . | . |
| | | . | . |
| | | (n-th PRIME NUMBER) | 0 |

| | STACK | 1 | ~3k |
| --- | --- | --- | --- |
| | | PRIME NUMBER | NUMERATOR COUNTER |
| NUMERATOR | | 2 | 0 |
| COUNTER TABLE | | 3 | 1 |
| | | 5 | 1 |
| | | . | . |
| | | . | . |
| | | . | . |
| | | (n-th PRIME NUMBER) | 0 |

STACK: 24 — 3m

DENOMINATOR COUNTER TABLE

| PRIME NUMBER | DENOMINATOR COUNTER |
|---|---|
| 2 | 0 |
| 3 | 0 |
| . | . |
| . | . |
| . | . |
| (n-th PRIME NUMBER) | 0 |

STACK: 12 — 3m

DENOMINATOR COUNTER TABLE

| PRIME NUMBER | DENOMINATOR COUNTER |
|---|---|
| 2 | 1 |
| 3 | 0 |
| . | . |
| . | . |
| . | . |
| (n-th PRIME NUMBER) | 0 |

STACK: 6 — 3m

DENOMINATOR COUNTER TABLE

| PRIME NUMBER | DENOMINATOR COUNTER |
|---|---|
| 2 | 2 |
| 3 | 0 |
| . | . |
| . | . |
| . | . |
| (n-th PRIME NUMBER) | 0 |

STACK: | 3 | ~3m

DENOMINATOR COUNTER TABLE:

| PRIME NUMBER | DENOMINATOR COUNTER |
|---|---|
| 2 | 3 |
| 3 | 0 |
| . | . |
| . | . |
| . | . |
| (n-th PRIME NUMBER) | 0 |

STACK: | 1 | ~3m

DENOMINATOR COUNTER TABLE:

| PRIME NUMBER | DENOMINATOR COUNTER |
|---|---|
| 2 | 3 |
| 3 | 1 |
| . | . |
| . | . |
| . | . |
| (n-th PRIME NUMBER) | 0 |

DISPLAY: 3

NUMERATOR COUNTER TABLE (3i):

| | |
|---|---|
| 2 | 0 |
| 3 | 0 |
| 5 | 1 |
| ⋮ | ⋮ |
| (n-th PRIME NUMBER) | 0 |

Fig.57B

DISPLAY: 3 × 5

NUMERATOR COUNTER TABLE (3i):

| | |
|---|---|
| 2 | 0 |
| 3 | 0 |
| 5 | 0 |
| ⋮ | ⋮ |
| (n-th PRIME NUMBER) | 0 |

Fig.58A

DISPLAY: $\dfrac{3\times 5}{2}$ —2

DENOMINATOR COUNTER TABLE

| | |
|---|---|
| 2 | 2 |
| 3 | 1 |
| . | . |
| . | . |
| . | . |
| (n-th PRIME NUMBER) | 0 |

DISPLAY: $\dfrac{3\times 5}{2\times 2}$ —2

DENOMINATOR COUNTER TABLE

| | |
|---|---|
| 2 | 1 |
| 3 | 1 |
| . | . |
| . | . |
| . | . |
| (n-th PRIME NUMBER) | 0 |

DISPLAY: $\dfrac{3\times 5}{2\times 2\times 2}$ —2

DENOMINATOR COUNTER TABLE

| | |
|---|---|
| 2 | 0 |
| 3 | 1 |
| . | . |
| . | . |
| . | . |
| (n-th PRIME NUMBER) | 0 |

3j

Fig.58D   DISPLAY $$\frac{3 \times 5}{2 \times 2 \times 2 \times 3}$$ -2

DENOMINATOR COUNTER TABLE

| | | |
|---|---|---|
| 2 | 0 |
| 3 | 0 |
| . | . |
| . | . |
| . | . |
| (n-th PRIME NUMBER) | 0 |

NUMERATOR COUNTER TABLE 3i

| | |
|---|---|
| 2 | 0 |
| 3 | 1 |
| 5 | 1 |
| . | . |
| . | . |
| . | . |
| (n-th PRIME NUMBER) | 0 |

DENOMINATOR COUNTER TABLE

| | |
|---|---|
| 2 | 3 |
| 3 | 1 |
| 5 | 0 |
| . | . |
| . | . |
| . | . |
| (n-th PRIME NUMBER) | 0 |

NUMERATOR COUNTER TABLE  3i

| | |
|---|---|
| 2 | 0 |
| 3 | 0 |
| 5 | 1 |
| . | . |
| . | . |
| . | . |
| (n-th PRIME NUMBER) | 0 |

DENOMINATOR COUNTER TABLE

| | |
|---|---|
| 2 | 3 |
| 3 | 0 |
| 5 | 0 |
| . | . |
| . | . |
| . | . |
| (n-th PRIME NUMBER) | 0 |

DISPLAY $\dfrac{5}{2 \times 2 \times 2}$ — 2

Fig.62A $\dfrac{1}{2} + \dfrac{1}{3}$

↓ [ENTER]KEY

Fig.62B $= \dfrac{1 \times 3}{2 \times 3} + \dfrac{1 \times 2}{3 \times 2}$

LEAST COMMOM MULTIPLE = 6
K 1 = 3
K 2 = 2

↓ [ENTER]KEY

Fig.62C $= \dfrac{3}{6} + \dfrac{2}{6}$

↓ [ENTER]KEY

Fig.62D $= \dfrac{3 + 2}{6}$

↓ [ENTER]KEY

Fig.62E $= \dfrac{5}{6}$

CALCULATOR WITH DISPLAY OF PROCESSING FOR MULAS AS PROCESSING PROGRESSES

BACKGROUND OF THE INVENTION

1. Field of the Invention

The present invention relates to a calculator comprising a display for displaying an inputted numerical formula (hereinafter described as "inputted formula"), for calculating the numerical formula and for displaying the results according to the key operation of a user.

2. Description of the Related Art

Hitherto, electronic desktop calculators (hereinafter described as "calculators") having various functions have been presented. The calculator disclosed in the Japanese Unexamined Patent Publication (KOKAI) No. JP-A 2-176849 (1990) is provided with first and second displays, and operates every time a numerical value is entered and a function key is pressed. The result of the operation is displayed in the first display, and the previous operation result in the second display. Thus, the previous operation result is shown in the second display on every key input, so that the user can proceed with the operation while easily confirming the intermediate result of operation.

The display apparatus of the calculator disclosed in the Japanese Unexamined Patent Publication (KOKAI) No. JP-A 4-297948 (1992) is provided with four displays, namely, a first-operand display, a second-operand display, an operation result display, and an operator display. For example, by an input of "12+36=" by continuous key input operations, it is constituted so that "12" may be displayed in the first-operand display, "+" in the operator display, "36" in the second-operand display, and "48" in the operation result display, and all the key-inputted values in the process of operation are displayed at the same time, so that the user of the calculator can visually confirm with ease.

In the data display apparatus disclosed in the Japanese Unexamined Patent Publication (KOKAI) No. JP-A 48-24639 (1973), a television receiver capable of displaying an image in plural lines while scanning is utilized as a display apparatus of a calculator, and when a key input of, for example, "12×4=" is entered, "12" displayed in the first line, "×4" in the second line, and "48" in the third line of the receiver sequentially, and a parting line is shown between the second and third lines, so that the process of operation is displayed by clearly distinguishing between the operands and the operation result.

The prior art disclosed in the above publications is merely intended to show the key input values or the operation result value in the corresponding display area out of plural display areas for individually predetermined applications every time a key input is made for operation, and the problem is that it is not constituted to display the processes of operation (including conversion of value and transformation of formula) from the input operation formula till finding the answer. Hence, it is disadvantageous that, for example, a schoolchild cannot learn the solution of a formula while confirming every step of the progress of the operation in self-teaching of mathematics.

In some of the conventional calculators, fractions can be calculated, and by inputting a fraction formula, the result of calculation is displayed in a fraction. In such calculator, for example, when a fraction formula "3/6+4/12" is entered in a specified method from the keyboard, a calculation result "5/6" is shown in a display.

Although fractions can be calculated in certain conventional calculators, what is displayed is only a calculation result for an inputted fraction formula.

In recent school education, calculators capable of calculating fractions have come to be employed. In such a case, although it is important to know the calculation result of the fractions, it is more important from the educational aspect to know the process of finding the result of calculation. In the conventional calculators, however, the calculation process of fraction formulas cannot be known, which is a problem from the educational point of view.

SUMMARY OF THE INVENTION

An object of the invention is to provide a calculator wherein it is possible to start an operation on the basis of an inputted formula and successively know the progress processes of operation until the operation result of the inputted formula is obtained.

The invention provides a calculator comprising:

input means for inputting a numerical formula including at least one operator and at least one numerical value or at least one character representing a numerical value, processing means for processing the inputted numerical formula according to predetermined processing procedures and successively outputting a numerical formula showing a progress process in accordance with the progress of the processing and a calculation result of the numerical formula, and display means for displaying the inputted formula, the numerical formula showing a progress process and the calculation result of the numerical formula.

Further, the invention is characterized in that the numerical formula showing a progress process includes at least one operator and at least one numerical value or at least one character representing a numerical value.

Further, the invention is characterized in that the processing means operates regarding an operator in the highest priority order of operation among the operators included in the inputted numerical formula or the numerical formula showing a progress process and creates an numerical formula showing a progress process.

Further, the invention is characterized in that the calculator further comprises mode selecting means for selecting the display mode of a numerical value, and the processing means converts the display mode of the numerical value included in the inputted numerical formula or numerical formula showing a progress process on the basis of the output from the mode selecting means and creates an numerical formula showing a progress process.

Further, the invention is characterized in that the progressing means converts the inputted numerical formula or numerical formula showing a progress process into other mathematically equivalent formula and creates a numerical formula showing a progress process.

Further, the invention is characterized in that the processing means stores the numerical value included in the inputted numerical formula or numerical formula showing a progress process in a display mode having the highest mathematical accuracy regardless of the selected display mode of numerical value so that the inputted numerical formula, the numerical formula showing a progress process and the calculation result of the inputted numerical formula have an identical mathematical accuracy with that of each other.

Further, the invention is characterized in that the calculator further comprises directing means for directing advance and return of processing in accordance with predetermined processing procedures, and the processing means selects and outputs any one of the inputted numerical formula, the numerical formula showing a progress process and the operation result of the inputted numerical formula in correspondence to the output from the directing means.

Further, the invention is characterized in that the processing means outputs the inputted numerical formula or numerical formula showing a progress process together with first identification information showing an object to be next processed, and the display means displays an object element to be next processed in a numerical formula to be displayed in a form different from that of other elements composing the numerical formula on the basis of the first identification information.

Further, the invention is characterized in that the processing means outputs the inputted numerical formula or numerical formula showing a progress process together with second identification information showing a numerical value obtained by a directly preceding processing, and the display means displays a numerical value obtained by a directly preceding processing in the numerical formulas to be displayed in a form different from that of other elements composing the numerical formulas on the basis of the second identification information.

Further, the invention is characterized in that the display means displays a predetermined character for a numerical value obtained by a directly preceding processing in the numerical formula to be displayed on the basis of the second identification information and displays the obtained numerical value instead of the predetermined character when a correct numerical value is inputted or inputting from the input means is executed by using a predetermined operation.

Further, the invention is characterized in that the number of character positions of a numerical formula which can be displayed in the display means is predetermined, and the processing means outputs the calculation result of a numerical formula to be outputted instead of the numerical formula to be outputted when the number of character positions of the formula to be outputted exceeds the predetermined number thereof.

Further, the invention is characterized in that the calculator further comprises understanding level input means for inputting a user's understanding level of the inputted numerical formula, and the processing means selects and batch-processes plural processing on the basis of the output from the understanding level input means from among the processings according to the predetermined processing procedures and creates a numerical formula showing a progress process.

Further, the invention is characterized in that the processing means selects and batch-processes plural processings on the basis of the number and kind of operators included in the inputted numerical formula from among processings according to the predetermined processing procedures and creates a numerical formula showing a progress process.

The invention provides a calculator comprising:

input means for inputting a fractional formula, prime factor factorization means for factorizing respective denominators and numerators of plural fractions included in the fractional formula into prime factors, fraction reduction means for reducing the fractions on the basis of the factorized denominators and numerators of the fractions, and display means for successively displaying respective processes of the fractional formula processed by the input means, the prime factor factorization means and the fraction reduction means.

The invention provides a calculator comprising:

input means for inputting a fractional formula, reduction means for finding a least common denominator of plural fractions included in the fractional formula and reducing the fractions included in the fractional formula to the common denominator so that the value of the denominator of each fractions become the least common denominator thereamong, operation means for operating the reduced fractional formula, and display means for successively displaying respective processes of the fractional formula processed by the input means, the reduction means, and the operation means.

According to the invention, not only the calculation result of an inputted numerical formula is displayed, but also numerical formulas showing a progress process (intermediate process) of processing of the inputted formula until the calculation result is obtained are successively displayed.

Further, according to the invention, the numerical formula showing a progress process displayed in the display of the calculator includes at least one operator and at least one value or at least one character representing a value.

Further, according to the invention, the numerical formula showing a progress process is created by the operation regarding an operator ranking first in the predetermined priority order of operation among the operators included in the inputted formula or the numerical formula showing a progress process. For example, in the case where multiplication and addition are included in the numerical formula, multiplication is higher than addition in the priority order of operation. Accordingly, the operation regarding multiplication is first executed. Herein the priority order of operation means general priority order defined in mathematics.

Further, according to the invention, when a numerical value displaying mode is selected, the numerical value in the inputted formula or a numerical formula showing a progress process is converted into the selected mode. Thereby the next numerical formula showing a progress process is created. For example, in the case where a decimal mode and a fraction mode are provided as display modes of numerical value and the decimal mode is selected, when a fraction is included in the numerical formula, the fraction is converted into a decimal and the decimal is displayed.

Further, according to the invention, an inputted formula or a numerical formula showing a progress process is converted into other mathematically equivalent numerical formula and displayed in the form of the converted formula. For example, a power calculation is included in the numerical formula, the power form is converted into a multiplication form and displayed in the multiplication form.

Further, according to the invention, a numerical value included in the inputted formula or a numerical formula showing a progress process is stored in a display mode having the highest mathematical accuracy regardless of the display mode selected for the numerical value. Thereby the inputted formula, the numerical formula showing a progress process and the calculation result of the inputted formula have an identical mathematical accuracy with that of each other. For example, in the case where a decimal mode is selected as a display mode for numerical value, when a fraction is included in a formula, the fraction is displayed in a form converted into a decimal on displaying the formula, but on storing the numerical value, the fraction is stored as it is.

Further, according to the invention, an inputted formula is displayed in display means. If directing means directs the advance of processing, the processing is executed in accordance with predetermined processing procedures, numerical formulas showing a progress process are successively displayed, and finally the calculation result of the inputted formula is displayed.

On the other hand, if the directing means directs the return of processing, the processing is executed in the reverse order of the predetermined processing procedures and a numerical formula showing the directly preceding progress process is displayed.

Further, according to the invention, in displaying an inputted formula or a numerical formula showing a progress process in display means, an object element to be next processed is displayed in a form different form that of other elements composing the formula. For example, the object element to be next processed is underlined in displaying.

Further, according to the invention, in displaying an inputted formula or a numerical formula showing a progress process, a numerical value obtained by the directly preceding processing in the numerical formula to be displayed is displayed with a predetermined character instead of the numerical value. When the user of the calculator inputs a correct numerical value from input means or inputs with predetermined operations for the input means, the obtained numerical value is displayed instead of the predetermined character.

Further, according to the invention, when the number of positions of a numerical formula showing a progress process exceeds the predetermined number of positions which can be displayed by display means, the calculation result of the numerical formula showing a progress process is displayed instead of the numerical formula itself.

Further, according to the invention, by inputting a user's understanding degree of an inputted formula, plural processings among the processings according to predetermined processing procedures are batch-processed. Accordingly, in correspondence to the user's understanding degree, the contents of the numerical formula showing a progress process until the calculation result of the inputted formula is displayed are changed.

Further, according to the invention, plural processings among the processings according to predetermined processing procedures are batch-processed on the basis of the number and kind of operators included in an inputted formula. For example, when a numerical formula including only one operator is inputted, it is judged that the user's understanding level is low, the processings are executed one by one, and respective numerical formulas showing a progress process are displayed. On the other hand, when a numerical formula including plural operators is inputted, relatively easy processings are batch-processed, and a numerical formula showing a progress process is displayed.

Further, according to the invention, plural denominators and numerators included in fraction formula inputted from in put means are factorized by prime factor factorizing means. The fractions are reduced on the basis of the factorized denominators and numerators of the fractions by fraction reduction means. The respective processes of the fraction formula processed by the input means, the prime factor factorizing means, and the fraction reduction means are successively displayed by display means. Accordingly, the user of the calculator can know the respective processes of the fraction calculation in reducing the fraction formula.

Further, according to the invention, the least common denominator of the denominators of plural fractions included in a fraction formula inputted from input means is derived and the fractions are reduced so that the value of the denominator of each fraction become the least common denominator. The reduced fraction formula is operated by operation means. The respective processes of the fraction formula processed by the input means, the reduction means, and the operation means are successively displayed by display means. Accordingly, the user of the calculator can know the respective processes of the fraction formula calculation where reduction is conducted to operate the fraction formula.

The calculator of the invention makes it possible to see the processings of a formula inputted into the calculator successively because the formulas showing a progress process up to a time when the operation result of the inputted formula is obtained by processing thereof are outputted one after another.

According to the calculator of the invention, since a formula showing a processing progress includes at least one operator and at least one value or at least one character representing a value, the variety of the formulas which can be processed by the calculator is expanded.

According to the calculator of the invention, since a formula is processed regarding an operator necessary for obtaining a formula showing a progress process following the present process, the user of the calculator can easily understand from an outputted formula showing a progress process of processing regarding which operator the processing is being conducted and learn how to calculate the inputted formula, even when the inputted formula includes plural operators.

According to the calculator of the invention, since the value in an inputted a formula or a formula showing a progress process of processing is converted in correspondence with the mode deciding a display form of value, it is possible to easily understand the difference in progress of processing from the mode.

According to the calculator of the invention, an inputted formula or a formula showing a progress process of processing is converted in the other formula having the same mathematical contents and the converted formula is outputted. Accordingly, the user of the calculator can easily understand such operations as reduction to common denominator and power operation.

According to the calculator of the invention, the mathematical accuracy is ensured among an inputted formula, a formula showing a progress process of processing and the calculation result of the inputted formula in processing the inputted formula. Accordingly, that makes it easy for a user to understand the difference from a user's calculation result referring to the outputs in the processes of processing.

According to the calculator of the invention, any of an inputted formula, a formula showing a progress process of processing and the calculation result of the inputted formula can be outputted as desired. Accordingly, the user of the calculator can easily know a desired intermediate progress of processing from the formulas and effectively learn the processes of processing the inputted formula.

According to the calculator of the invention, since part of a formula to be next processed is indicated, the user of the calculator can more clearly understand the operation processes.

According to the calculator of the invention, since the values obtained by operations are displayed, the user of the calculator can more clearly understand the operation processes.

According to the calculator of the invention, not only the processes of processing are displayed, but also user's calculation results can be inputted prior to displaying the values obtained by processing of the calculator.

Accordingly, the user of the calculator can proceed with the processes by himself, inputting his calculation results.

According to the calculator of the invention, when the character position number of the operation result of a process formula exceeds the predetermined character position number of display means, the calculation result of an inputted formula is displayed without displaying a process formula. Accordingly, the calculation result of the inputted formula obtained by an ordinary operation processing is not in contradiction to that by the internal process processing of the calculator where the operation progresses are successively displayed.

According to the calculator of the invention, the outputted contents of a formula showing a progress process are changed in correspondence of a user's understanding level. Accordingly, a calculator in which a process adapted for the user's understanding level is displayed is provided.

According to the calculator of the invention, whether or not to change the display of progress process is judged on the calculator side and therefore an operation process adapted for the user's understanding level is displayed without setting the user's understanding level.

According to the calculator of the invention, the user of the calculator can see from display means the respective processes that the denominators and numerators of the fractions included in a fraction formula are factorized into prime factors and the fraction are reduced.

According to the calculator of the invention, the user of the calculator can see the respective processes that a fraction formula is reduced to a common denominator to be operated. Accordingly, the user can easily understand how the fraction formula is calculated and an educationally good calculator can be provided.

BRIEF DESCRIPTION OF THE DRAWINGS

Other and further objects, features, and advantages of the invention will be more explicit from the following detailed description taken with reference in the drawings wherein:

FIGS. 15A, 15B, 15C and FIGS. 16A, 16B, 16C are diagrams for explaining a display example about processing of function F1-c and an internal operation example of the embodiment;

FIG. 19A and FIG. 20A are diagrams for explaining a display example of processing of function F2-a and FIGS. 19B, 19C and FIGS. 20B, 20C are internal operation examples of the embodiment;

FIG. 23A is a diagram for explaining a display example about processing of function F3-a of the embodiment;

FIGS. 23B, 23C are internal operation examples of the embodiment;

FIG. 24A is a diagram for explaining a display example about processing of function F3-a of the embodiment;

FIGS. 24B, 24C, 24D, 24E are internal operation examples of the embodiment;

FIG. 26A is a diagram for explaining a display example about processing of function F3-b of the embodiment;

FIGS. 26B, 26C, 26D, 26E are internal operation examples of the embodiment;

FIG. 27A is a diagram for explaining a display example about processing of function F4-a;

FIGS. 27B, 27C are internal operation examples of the embodiment;

FIG. 28A is a diagram for explaining a display example about processing of function F4-a;

FIGS. 28B, 28C, 28D, 28E are internal operation examples of the embodiment;

FIGS. 29A, 29B are diagrams for explaining the state displayed while an inputted formula is converted into a process formula including code etl of the embodiment;

FIGS. 30A, 30B are diagrams for explaining the state displayed while an inputted formula is converted into a process formula including code etc2 of the embodiment;

FIGS. 39A, 39B, 39C, 39D are diagrams showing examples of process buffer and operation unit display data;

FIGS. 40A, 40B, 40C, 40D, 40E, 40F, 40G are diagrams showing display examples of operation process;

FIG. 41 is a diagram showing a method of creating operation unit display data;

FIGS. 46A, 46B, 46C, 46D, 46E are examples of contradictions occurring between ordinary operation processing and process processing and examples of solving them;

FIGS. 54A, 54B are diagrams showing the contents of a numerator counter table and a denominator counter table showing the prime number and its counter value in processing of factorization into prime factors;

FIGS. 55A, 55B, 55C are diagrams showing the values of numerator counter table and stack in each step of processing of factorization into prime factors;

FIGS. 56A, 56B, 56C, 56D, 56E are diagrams showing the values of denominator counter table and stack in each step of processing of factorization into prime factors;

FIGS. 57A, 57B are diagrams showing each step of displaying the value in the display unit according to the numerator counter table for storing the result of factorization into prime factors;

FIGS. 58A, 58B, 58C, 58D are diagrams showing each step of displaying the value in the display unit according to the denominator counter table for storing the result of factorization into prime factors;

FIGS. 60A, 60B, 60C are diagrams showing the contents of the denominator counter table, numerator counter table, and display unit in the process for reducing a fraction;

FIGS. 62A, 62B, 62C, 62D, 62E are diagrams showing the display content of display unit for showing each step of processing of flow chart shown in FIG. 61.

DETAILED DESCRIPTION OF THE PREFERRED EMBODIMENTS

Figure 1:
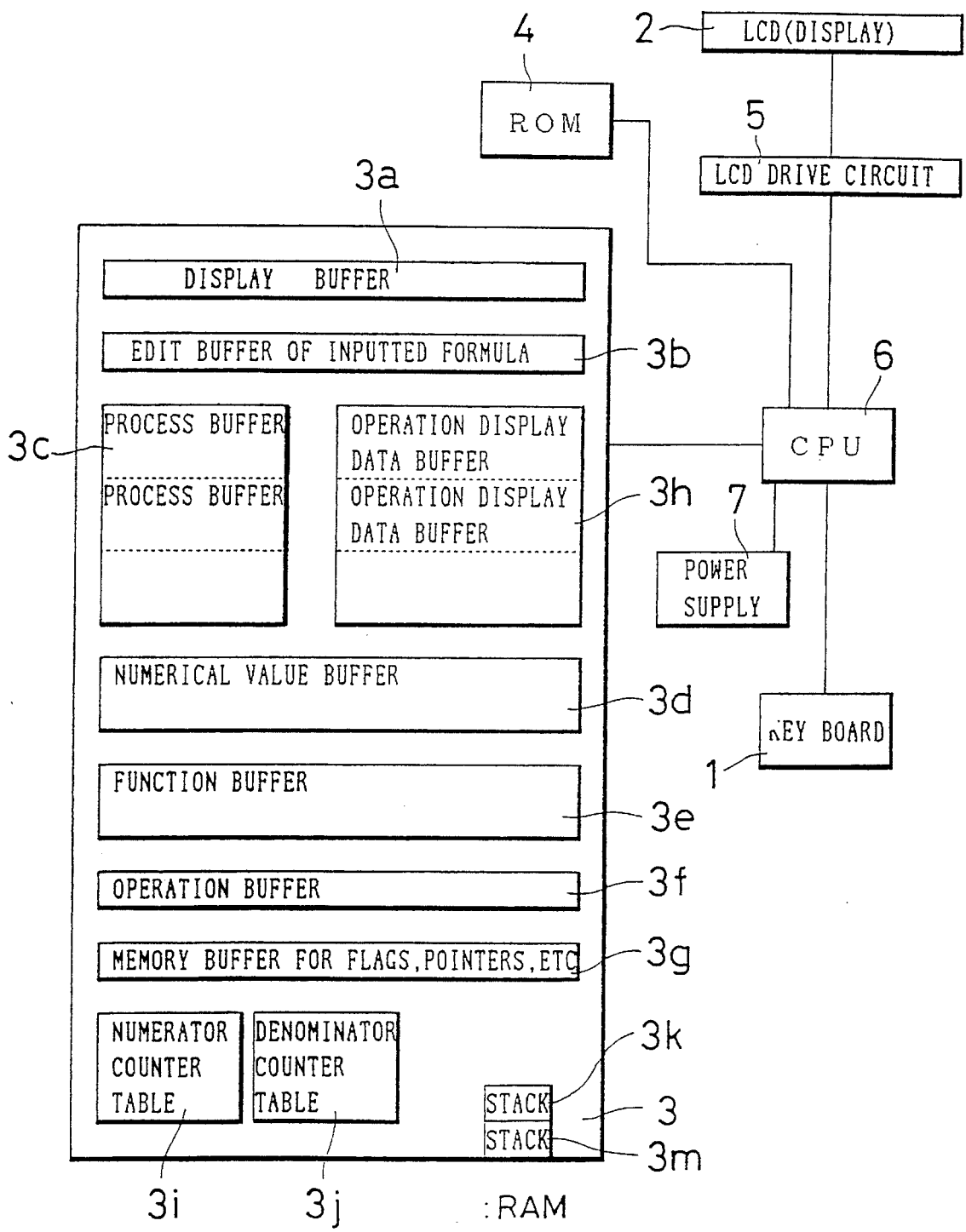
FIG. 1 is a schematic block diagram of a calculator of an embodiment of the invention.

Now referring to the drawings, preferred embodiments of the invention are described below.

FIG. 1 is a block diagram showing the construction of an electronic desktop calculator (hereinafter called calculator) of an embodiment of the invention.

Referring to FIG. 1, the calculator has a control function for reading-in the data inputted from outside, operating while modifying the numerical formula, and outputting the result of operation or step of operation (hereinafter called process) in a formula (process formula) to outside, and comprises a CPU (central processing unit) 6 for centralized managing and controlling of the calculator. The CPU 6 is connected with a keyboard 1, a RAM (random access memory) 3, a ROM (read only memory) 4, and a display 2 composed of LCD (liquid crystal display), and an LCD drive circuit 5 for driving and controlling it and a power source 7 containing a battery are also connected with the CPU 6.

The RAM 3 comprises a display buffer 3a for storing the information to be displayed in the display 2, an edit buffer 3b for storing a formula entered from the keyboard 1, plural process buffers 3c for sequentially storing the process formulas relating to the formula in the buffer 3b, a numerical value buffer 3d for storing plural numerical values used in operation of formula, a function buffer 3e for storing plural operators, an operation buffer 3f, and a memory buffer 3g for flags and pointers. Adjacently to the process buffers 3c, a data buffer 3b for displaying a portion to be operated and operated is provided. The RAM 3 also comprises a numerator counter table 3i, a denominator counter table 3j, and stacks 3k, 3m which are used in reduction of a fraction formula and factorization into prime factors. The ROM 4 preliminarily stores a program showing a method of modifying a formula, data of various constants, and a character generator. The LCD drive circuit 5 displays the input data, operation result data, process formula, and various messages in the display 2 on the basis of the information given from the CPU 6.

Below are explained the codes for composing the formula used in the embodiment and the pointers relating to various buffers. The formula in the embodiment is roughly composed of a numerical value code for expressing an operator. These codes are classified as follows.

(1) Numerical value code (1-a) Numerical entry code: "0" to "9", "−" (negative polarity), "." (decimal pint), "EXP" (exponent), etc.

(1-b) Semi-numerical entry code: Memory name, symbol such as π

(2) Operator code (2-a) Binomial function code: "+", "−" (subtraction operator), "×", "÷", etc.

(2-b) Prepositional function code: √, SIN, COS, etc.

(2-c) Postpositional function code: %, :, etc.

(2-d) Parenthesis code: (,), (.), etc.

(2-e) Execution function code: =, etc.

These operator codes are dominated by the priority order. For example, '×' must be operated before '+'. The rules of operation including the priority order of operation are the same as conventional rules, and "/" is called a fraction code, which is distinguished from "÷", and ".⇔ is called a mixed fraction code for making a distinction between the integral part and the fractional part of a mixed fraction.

FIGS. 2A, 2B, 3A, 3B are diagrams for explaining pointers for pointing the codes in a formula in the embodiment. As shown in the diagrams, pointers IP, LP, PP are provided for pointing the codes in the inputted formula in an edit buffer 3b or the process formula in a process buffer 3c, and a pointer OP is provided for pointing an output position where the next code is to be outputted in the process buffer 3c for storing an output formula (next process formula) to be the operation result of the formula.

Every time an output code is created, this code is stored from the position pointed by the pointer OP, and the value of the pointer OP is updated by +1 on each storing.

The pointer IP is a pointer for pointing the code under input processing in the inputted formula in the edit buffer 3b or the process formula in the process buffer 3c. The code pointed by the pointer IP is read-out of the buffer, analyzed, and processed according to the result of the analysis. When this processing is over, the pointer IP is updated by +1, and the code of the next input processing is pointed.

The pointer LP is a pointer for pointing the next code following the code issued immediately before in the inputted formula in the edit buffer 3b or in the process formula in the process buffer 3c. The codes from the code at the head of the inputted formula or process formula to the code just before the code pointed by the pointer LP are converted as the content of the portion of the formula from the head of the output formula (process formula) to the code just before the pointer OP. The formula from the pointer LP to the pointer IP is merely read into the function buffer 3e and the numerical value buffer 3d, and is not stored as an output formula.

The pointer PP is a pointer for pointing the operator code (the operator code read onto the function buffer 3e) positioned directly before the code presently in process in the inputted formula in the edit buffer 3b or the process formula in the process buffer 3c. The pointer PP is one for outputting the unoperated portion as it is.

Figure 4:
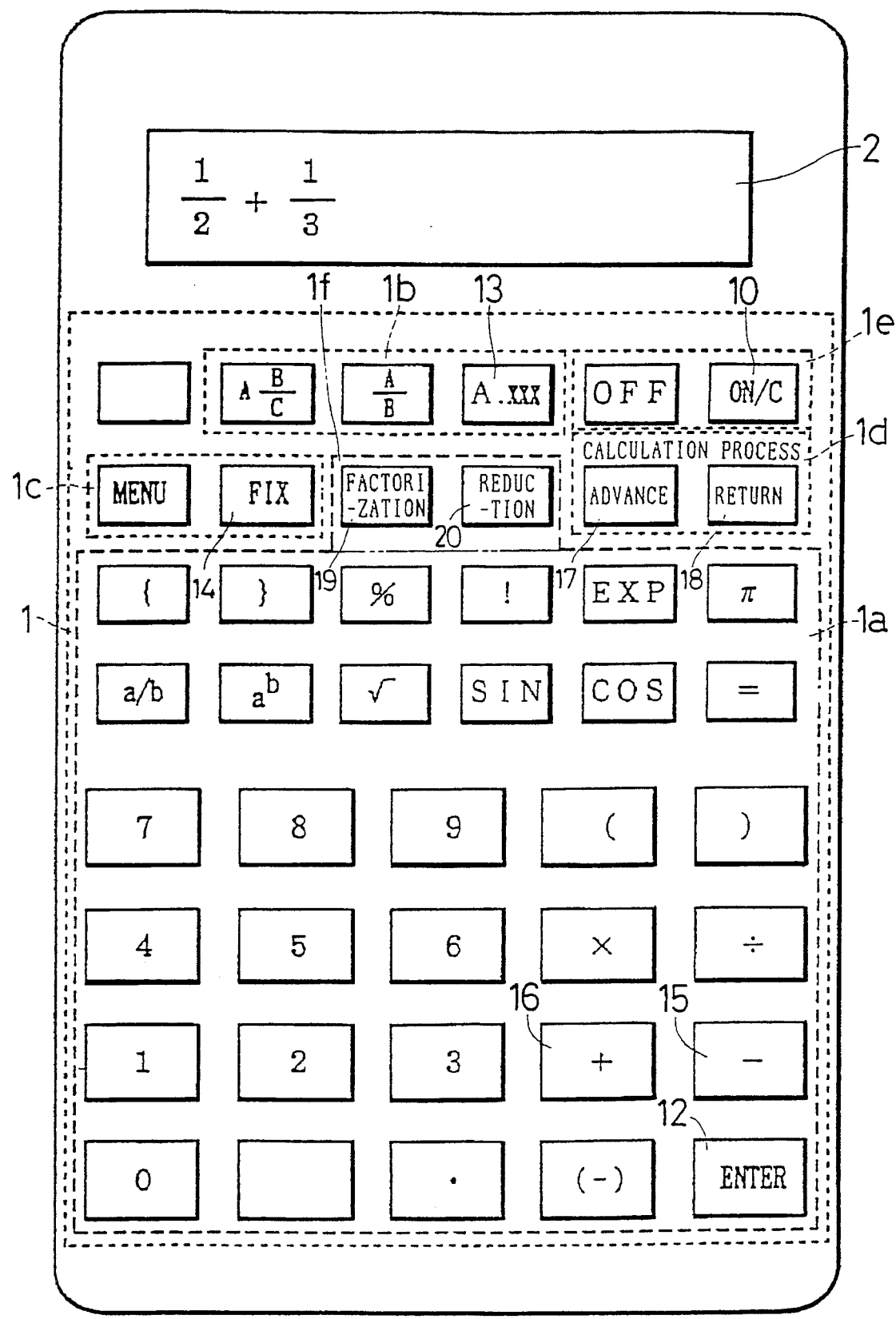
FIG. 4 is a diagram showing a key layout of a key board in FIG. 1 together with a display.

FIG. 4 is a plan view showing the key layout of the keyboard 1 together with the display 2. Plural keys are provided in the keyboard 1, and these keys are classified in accordance with their functions into a key group 1a for inputting a formula, a display mode setting key group 1b for setting mixed-fraction-, fraction-, or decimal-mode regarding a numerical value and for displaying the numerical value, a display digit setting key group 1c for setting the number of display digits of a decimal, a calculation step directing key group 1d for displaying a corresponding process formula by advancing or returning a process, a power supply key group 1e for controlling power supply to the calculator by turning on or off a power supply 7, and a fraction calculation directing key group 1f for directing a fraction calculation.

Figure 5:
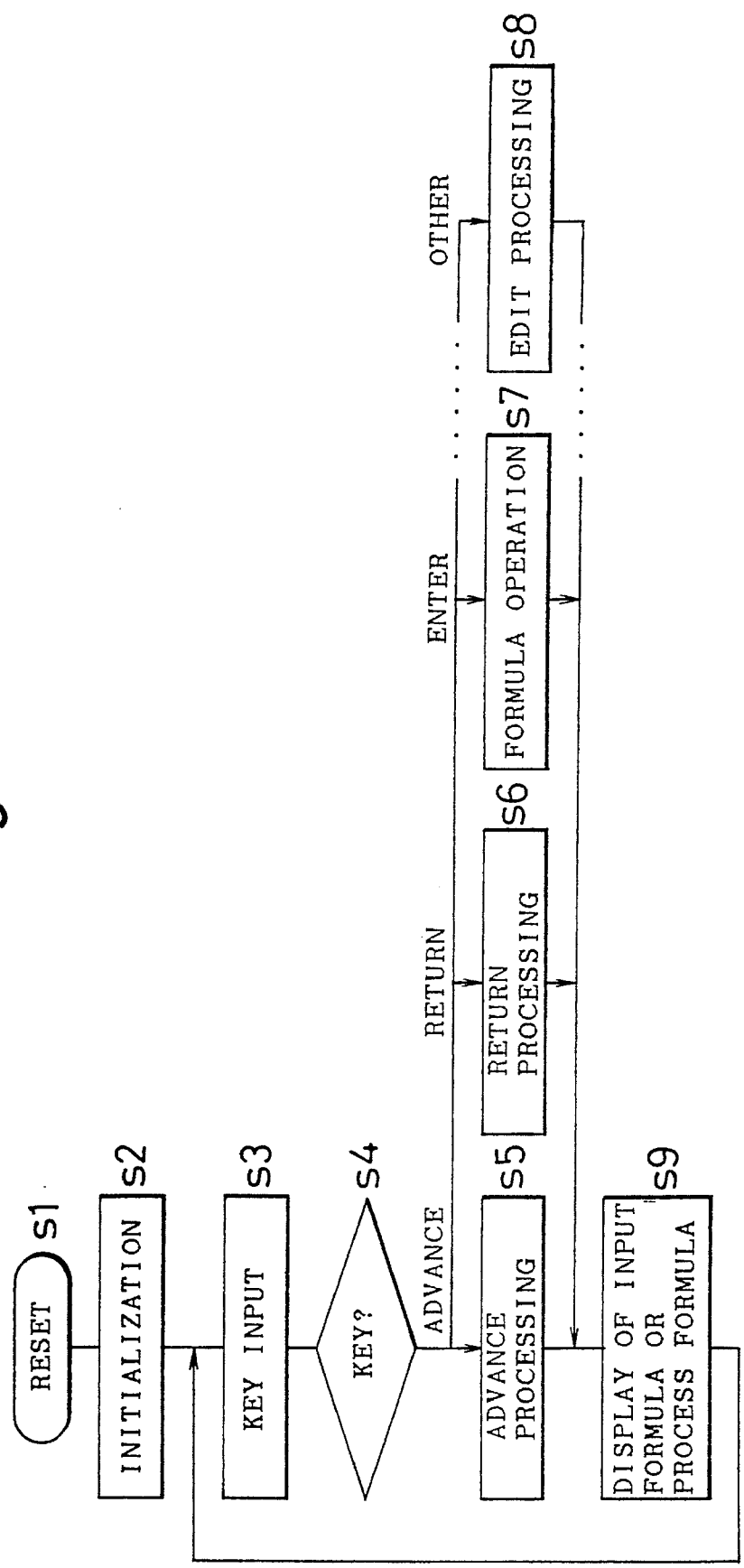
FIG. 5 is a schematic process flow chart of a calculator of an embodiment of the invention.

Referring next to FIG. 5, the outline of the calculator operation is described below. First, an ON/C key 10 of the power supply key group 1e is pressed down to start power supplying from the power supply 7, and when being reset (s1), the buffer required in operation on the RAM 3 is cleared, and the hardware of the calculator including the display 2 is initialized (s2), so that the calculator is ready to be used. Afterwards, the calculator is in the state of waiting for a key input, and when input is provided from a keyboard 1 (s3), the type of the input key is judged (s4), and processing (s5 to s8) corresponding to the result of judgement, namely, the type of the input key, is executed. Hence, the result of the execution, that is, the inputted formula or process formula (including the operation result) edited on the basis of the key input data is displayed (s9). Consequently, the calculator is placed again in the state of waiting for a key input. In this way, when any key input is provided, the corresponding processing is executed, and the result is displayed. Such a series of processing is repeated.

Below are explained sequentially functions F1 to F6 provided for displaying in process formula not only the operation result but also the intermediate steps for obtaining the result for an arbitrary formula entered by the user.

In a formula containing plural operator codes, a function F1 is a function for operating only on one or more operator codes necessary for directing the next process and leaving the other operator codes unprocessed, or simultaneously processing the other operator codes together therewith, if that makes the process more clarified, in order to create the next process formula.

This function F1 further comprises a function F1-a for creating a process formula in which only the code to be first operated among the operator codes contained in the formula has been operated and converted into the result and the other portions of the formula are left as they are, a function F1-b for creating a process formula in which plural operator codes preferred to be operated simultaneously in the formula have been simultaneously operated, if such operator codes exists in the formula, and a function F1-c for, if the formula contains parentheses, removing the parentheses when the inside of the parentheses has been converted into a numerical value only or when the portion enclosed by the parentheses contains numerical value codes only, after execution of the operation according to the operator codes contained in the parentheses.

The function F1-a is described below with reference to FIGS. 2A, 2B, 3A, 3B. When displaying the process of the sequential operations conducted according to the priority order of operator codes by using a process formula, the operator code to be processed in the inputted formula is compared with the operator codes positioned before and after in the priority order of operation, and when the priority order of the relevant operator code is judged to be higher than that of the preceding operator code and is higher than or equal to that of the following operator code, the operation according to the relevant operator code is executed. Accordingly, first the codes from the code at the head of the inputted formula to the operator code just before the relevant operator code to be processed at present are stored as an output formula. Then the operation on the basis of the relevant operators code is carried out and the operation result is stored as an output formula. Finally the codes from the operator code following the relevant code to the final code of the inputted formula is stored as an output formula. Herein, this process is explained by referring to an example of a binomial function code in FIGS. 2, 3, and other function codes may be treated in the same manner according to the priority order.

Figure 2A:
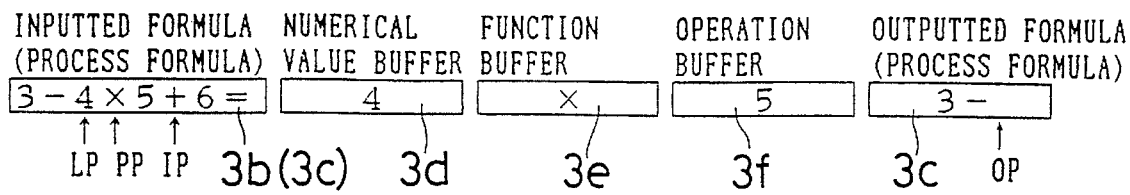
FIGS. 2A, 2B, 3A, 3B are diagrams for explaining a pointer for pointing codes in a formula in the embodiment.
Figure 2B:
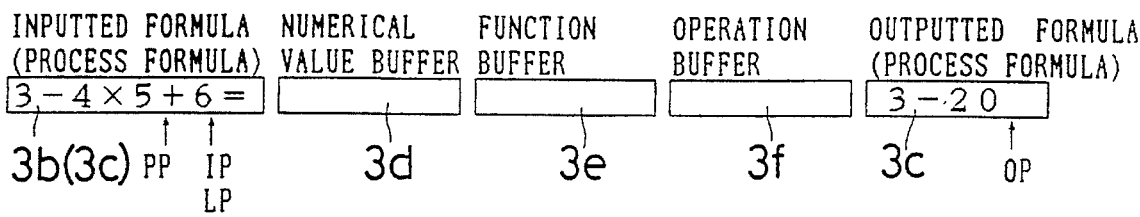
Figure 3A:
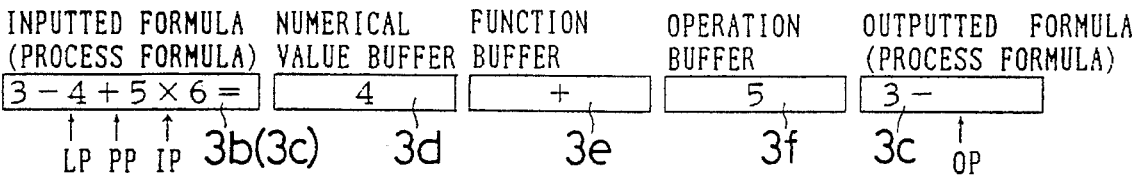

In the case of a binomial function code, as shown in FIG. 2A, the operator code [+] being presently processed, and the directly preceding operator code [×] on the function buffer 3e are compared. When the operator code [×] on the function buffer 3e is higher or equal in priority order, the function code [×] stored in the function buffer 3e is operated and processed by using the numerical value code [4] stored in the numerical value buffer 3d and the numerical value code [5] stored in the operation buffer 3f which is presently reading, and the operation result [20] is outputted as an output formula after the position pointed by the pointer OP of the process buffer 3c (see FIG. 2B). On the other hand, as shown in FIG. 3A, when the operator code [+] in the function buffer 3e is lower in the priority order than the operator code [×] being presently processed, the content from the pointer LP to the pointer PP of the inputted formula is outputted as an output formula after the position pointed by the pointer OP of the process buffer 3c. At the same time, in the numerical value buffer 3c and the function buffer 3e, the numerical value code being presently processed and the operator code are newly stored, respectively (see FIG. 3B).

On the other hand, in the case where only one operator code is processed, the above process is done until the operation according to this operator code is executed, and after this operation has been executed, the portion from the pointer IP of the inputted formula (process formula) to the execution function code (=) is directly outputted as an output formula after the position indicated by the pointer OP of the process buffer 3c.

Figure 6:
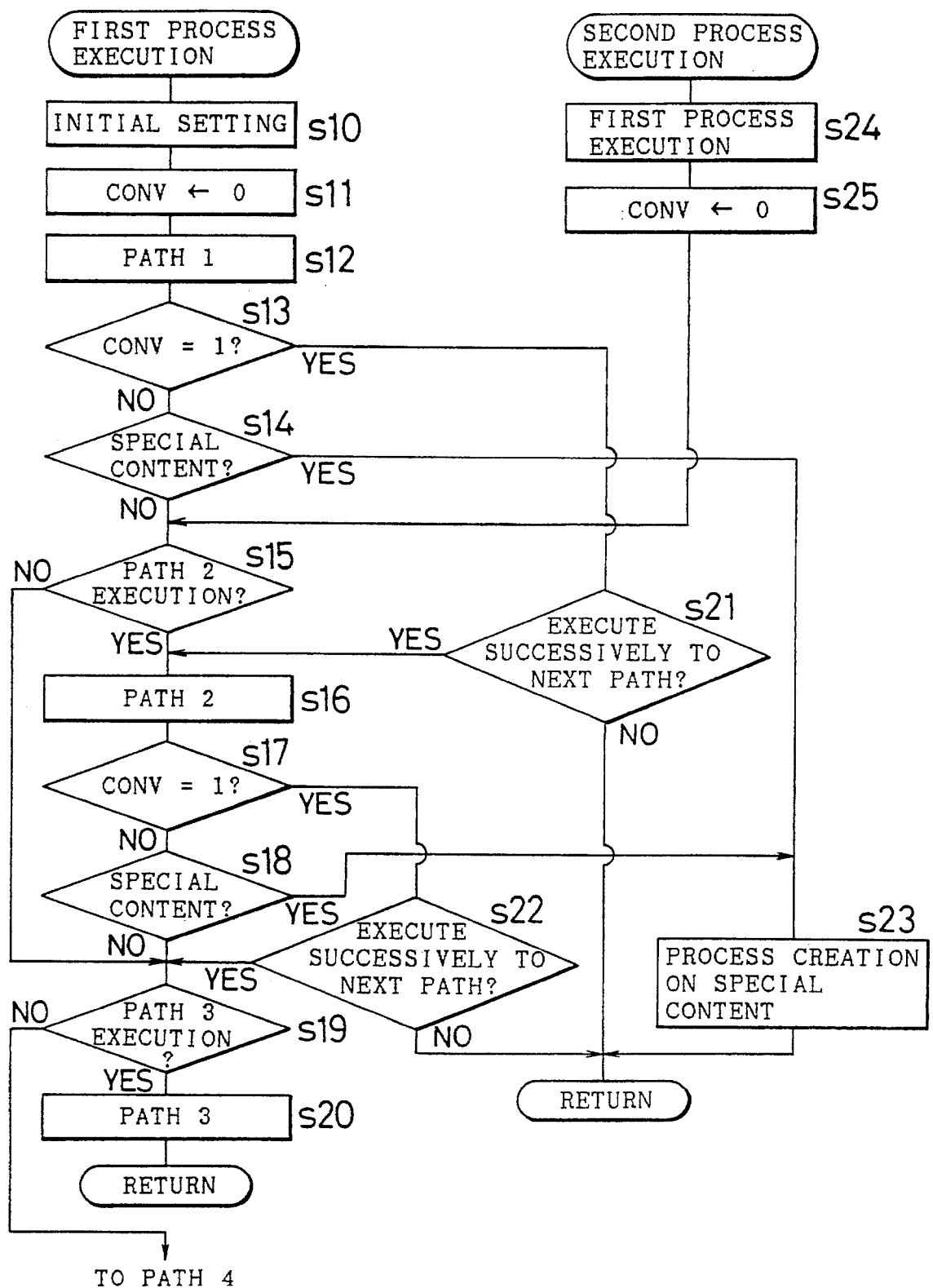
FIG. 6 is a flow chart of a main routine for creating a next process formula from an inputted formula or process formula in the embodiment.
Figure 7:
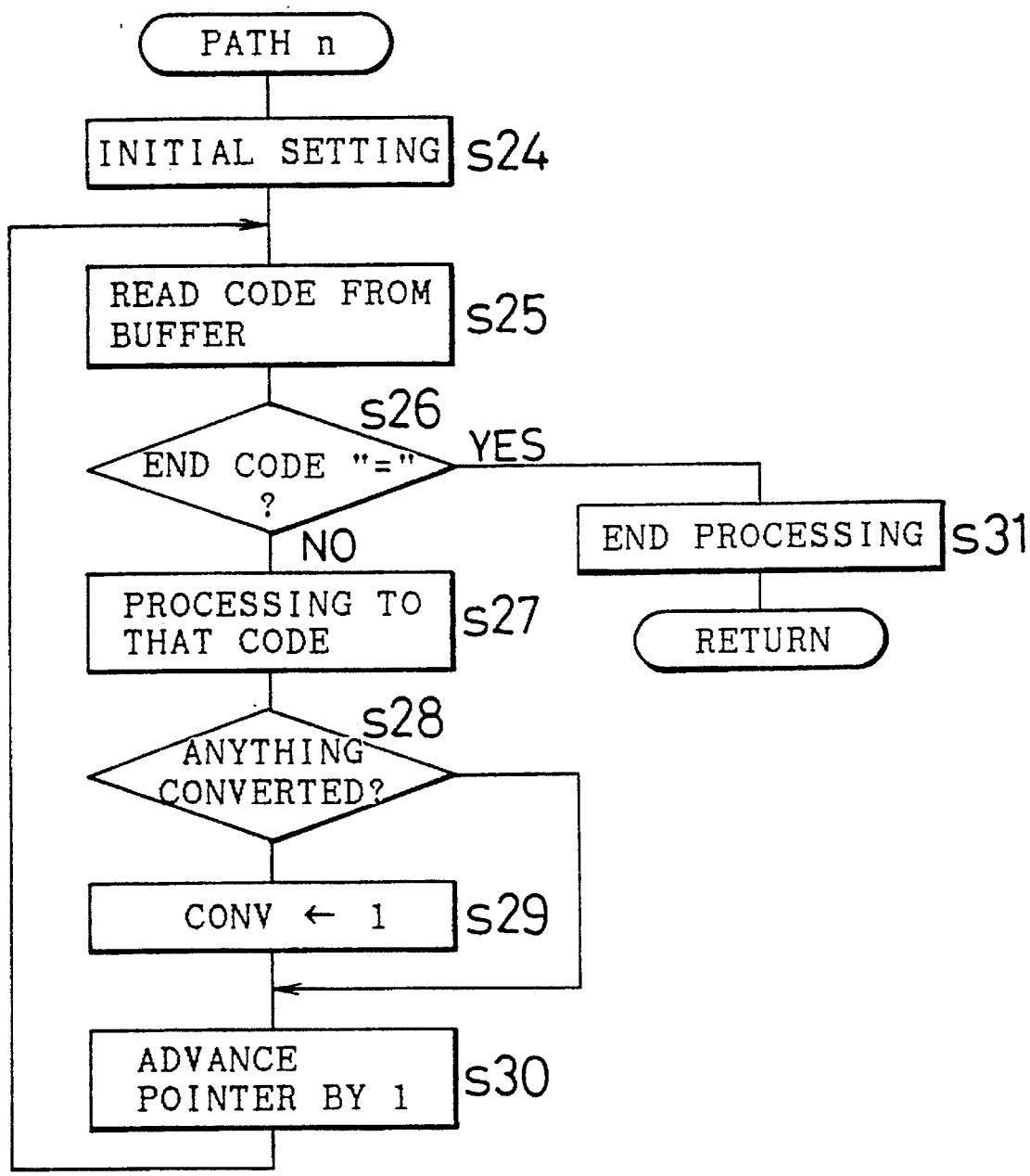
FIG. 7 is a flow chart showing a concept of processing of each path in FIG. 6.

The function F1-b is explained with reference to FIGS. 6–11. FIG. 6 is a flow chart of a main routine for creating a next process formula from the inputted formula or process formula, and FIG. 7 is a flow chart showing a concept of processing of each path in FIG. 6.

As shown in FIG. 6, the next process formula to be stored in the succeeding process buffer 3c is created as being divided into at least one or more paths. Since processing on each path is sequentially executed, the processing that makes the process unclear if executed simultaneously, for example, conversion of value and operation conforming to an operator code, will not be executed simultaneously. Besides, of the necessary processings, the processings to be always executed at the same time are executed simultaneously in the same path, and the processings not to be executed simultaneously as mentioned above are executed individually in different paths, and thereby each path is executed in due sequence to be processed.

At the edit step (s8) in FIG. 5, an inputted formula is created, and is stored in the edit buffer 3b, and then an enter key 12 is pressed, and the operation (s7) of the formula is started. Thereby, the first process in FIG. 6 is executed. In the first process execution, the pointers, flags and work areas are initialized (s10), and by the successive processing, the flag conv showing that the formula has been converted is reset by using value 0 (s11), and the processing in path 1 which is specific in the first process execution is executed (s12). After the processing in path 1, if converted (YES at s13), it is judged whether or not to execute the processing in the next path continuously. When the processing in the next path is to be executed continuously (YES at s21), it is executed (s16), or the processing step is returned to s7 when being not to be executed continuously.

On the other hand, after the processing in path 1, if the conversion is executed (NO at s13), it is judged whether execution of a special processing such as reduction to common denominator and factorial calculation is required or not. When required (YES at s14), the process formula conforming to the special processing is created and processed (s23), and the process step is returned to s7. To the contrary, if special processing is not required (NO at s14), it is judged whether or not to execute the processing in path 2 (s16). When the processing in the path 2 is to be executed (YES at s15), it is executed (s16), and it is judged whether any conversion has been done in path 2 or not. If any conversion has been done (YES at s17), it is judged whether or not to execute the processing of the next path continuously, and when it is not to be executed (NO at s22), the process step is returned to s7. Contrarily, when being to be executed (YES at s22), the process step is transferred to the next path 3 (s19, s20). If any conversion has not been done in path 2 (NO at s17), it is judged whether execution of a special processing is required or not. If required (YES at s18), the special processing (s23) is done and the processing step is returned to s7. If not necessary (NO at s18), the processing in the next path 3 is executed (s19, s20). In the case where the processing in path 2 is not executed (NO at s15), the processing step is transferred to path 3 (s19, s20).

In this way, until at least any conversion is done, the processings in path 1, path 2, . . . are executed sequentially, and thereby the first process execution is terminated, and the processing step is returned to s7.

When the enter key 12 is pressed again after execution of the first process, the second process is executed, and a second process as shown in FIG. 6 is executed so that the process formula obtained by the first process execution and stored in the process buffer 3c may be processed. In the second process execution, the initial setting is done (s24), and the flag conv is reset by using value 0 (s25), and the processings after path 2 are done in the same manner as that of the first process execution (s15) and on). Thereafter, every time the enter key 12 is pressed, the process execution on and after the third time is similarly repeated, and the process formulas are obtained sequentially.

In this way, according to the flow chart as shown in FIG. 6, for example, when an inputted formula "3×5+6×5+9×5=" is stored in the edit buffer 3b and the enter key 12 is pressed, the process formula "15+6×5+9×5=" is obtained by the first process execution, the process formula "15+30+9×5=" by the second process execution, the process formula "1530 30+45=" by the third process execution, and the process formulas "45+·=" and "90" by the fourth and the fifth process execution, respectively, in this order.

Only the processing corresponding to each path as shown in FIG. 6 is shown in the flow chart in FIG. 7. In each path, first, initial setting is done (s24), and the codes to be processed are read in by the input buffer 3b or the process buffer 3c (s25), and until the read code becomes a code "=" expressing the end of the character string of the formula (YES at s26), the codes are sequentially read in, and the processing corresponding to each read code is done repeatedly (s25 to s30). Only when any conversion has been done during the processing corresponding to each code (YES at s28), the flag conv showing that the conversion is done is set by using 1 (s29). When the end code "=" is read in (YES at s26), processing for terminating is done (s31), and the processing step is returned to a relevant step as shown in FIG. 6.

When path n according to the flow chart as shown in FIG. 7 is a path for processing the function (F1-b), processing for any one of the binomial function code, prepositional function code, postpositional function code and execution function code is done in the processing (s27) corresponding to that code. FIGS. 8, 9, 10, 11 are processing flow charts corresponding respectively to the binomial function code, prepositional function code, postpositional function code, and execution function code of the embodiment. In the diagrams, NB and FB denote a numerical value buffer 3d and a function buffer 3e, respectively.

Figure 8:
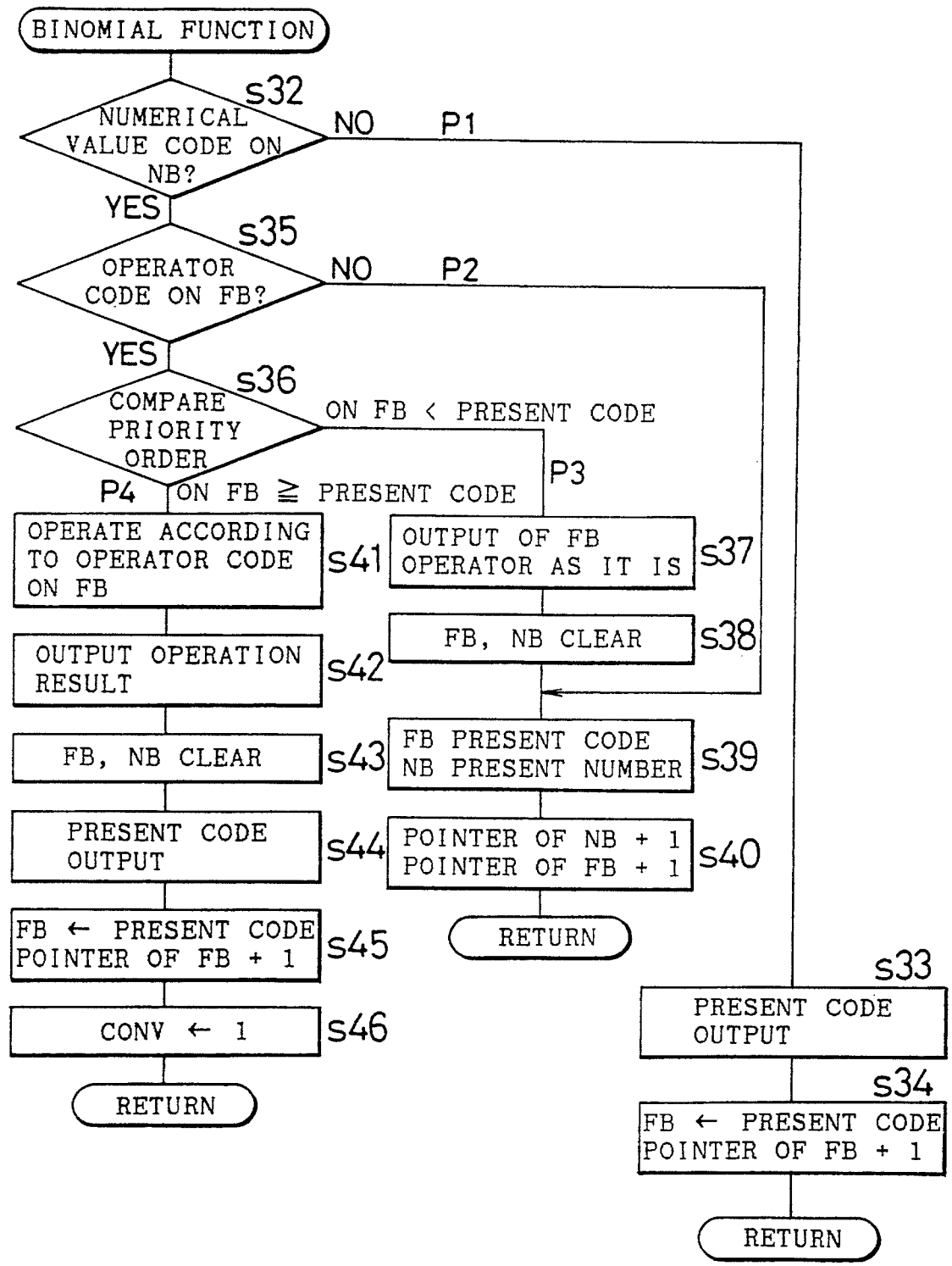
FIG. 8 is a processing flow chart of a binomial function code of the embodiment.

Referring now to FIG. 8, when processing the binomial function code, any one of the processings P1 to P4 in the diagram is executed. P1 is the process used for executing, for example, the code "×" in the formula "(2+3)×5". At this time, "(2+3)" has been preliminarily operated and outputted, no numerical value code is stored in the numerical value buffer 3d (NO at s32), and hence the code "×" is outputted directly as it is (s33), and, at the same time, the present code "×" is stored in the function buffer 3e, and the pointer pointing the code storing position of the function buffer 3d is updated by +1 (s34), thereby the processing step is returned to s27 as shown in FIG. 7.

P2 is a processing used, for example, when processing the code "×" of formula "2×3". At this time, there is a numerical value code in the numerical value buffer 3d (YES at s32), but no operator code is present in the function buffer 3e (NO at s35), and therefore the operator code "×" and the numerical value code "2" are respectively stored in the function buffer 3e and numerical value buffer 3d (s39), and the pointers pointing the code storing position of the function buffer 3e and numerical value buffer 3d are respectively updated by +1 (s40), thereby the processing step is returned to s27 as shown in FIG. 7.

P3 is a processing used, for example, when the code "×" of formula "2+3×4" is processed. As in this formula, when a numerical value code is present in the numerical value buffer 3d (YES at s32) and the operator code "+" is preliminarily stored in the function buffer 3d, the priority orders in operation of the code "+" and the code "×" to be processed presently are compared (s36). Since the code "+" is lower in priority order than the code "×", the formula "2+" up to the operator code "+" stored in the function buffer 3e is directly outputted (s37), and the function buffer 3e and numerical value buffer 3d are cleared respectively (s38), and the operator code "×" and numerical value code "3" are respectively stored in the function buffer 3e and numerical value buffer 3d (s39), and the pointers pointing the code storing position of the numerical value buffer 3d and function buffer 3e are respectively updated b +1 (s40), thereby the processing step is returned to s27 as shown in FIG. 7.

P4 is a processing used when, for example, the second operator code "+" from the beginning of the formula "2+3+4" is processed. The same as mentioned above, through the processings s32, s35, it is judged whether the priority order of the first operator code "+" preliminarily stored in the function buffer 3e is equal to or higher than that of the second operator code "+" to be processed at present (s36). Since the both codes are equal in priority order, "2+3" is operated according to the codes preliminarily stored in the function buffer 3e and numerical value buffer 3d, and the result is outputted (s42, s42), and after the numerical value buffer 3d and the function buffer 3e are cleared, the second operator code "+" is outputted (s44), and the code "+" is stored in the function buffer 3e, and the pointer pointing the code storing position of the buffer 3e is updated by +1 (s45). Afterwards, since the formula has been somewhat converted at s41, and the flag conv pointing that conversion has been conducted is set by using value 1 (s46), thereby the processing step is returned to s27 as shown in FIG. 7.

Figure 9:
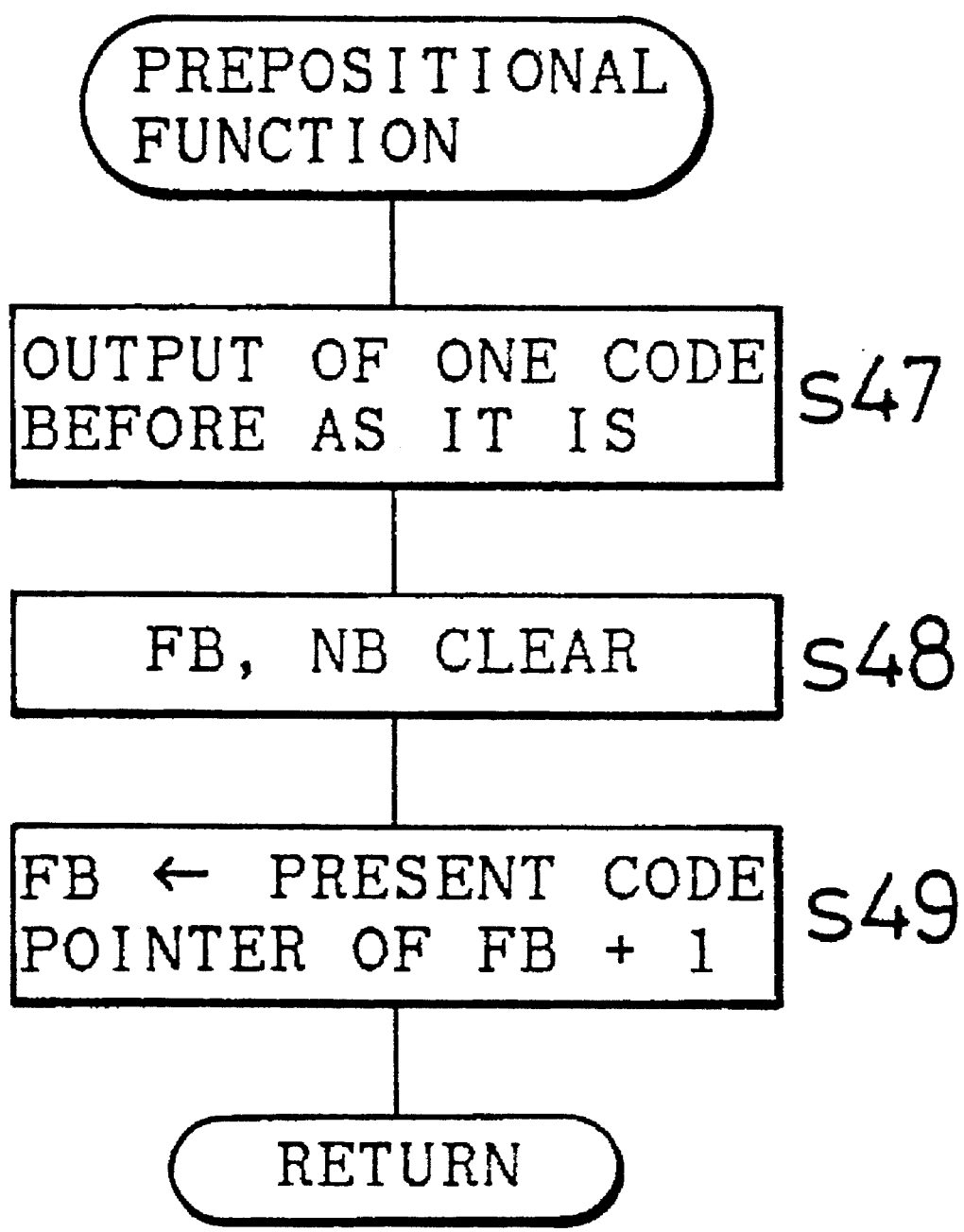
FIG. 9 is a processing flow chart of a prepositional function code of the embodiment.

Processing of prepositional function code shown in FIG. 9 is called when, for example, processing the code "√" of the formula "2+√3". When the code "√" which is a prepositional function code is processed, even if the code is preliminarily stored in the function buffer 3e or numerical value buffer 3d, the operation conforming to the code stored in the function buffer 3e or numerical value buffer 3d is not executed regardless of the priority order thereof. Accordingly, the formula "2+" up to the operator code stored in the function buffer 3e is directly outputted (s47), and the function buffer 3e and the numerical value buffer 3d are cleared (s48), and the code "√" to be processed is stored in the function buffer 3e, and the pointer pointing the code storing position of the function buffer 3e is updated by +1 (s49), and thereby the processing step is returned to s27 as shown in FIG. 7.

Figure 10:
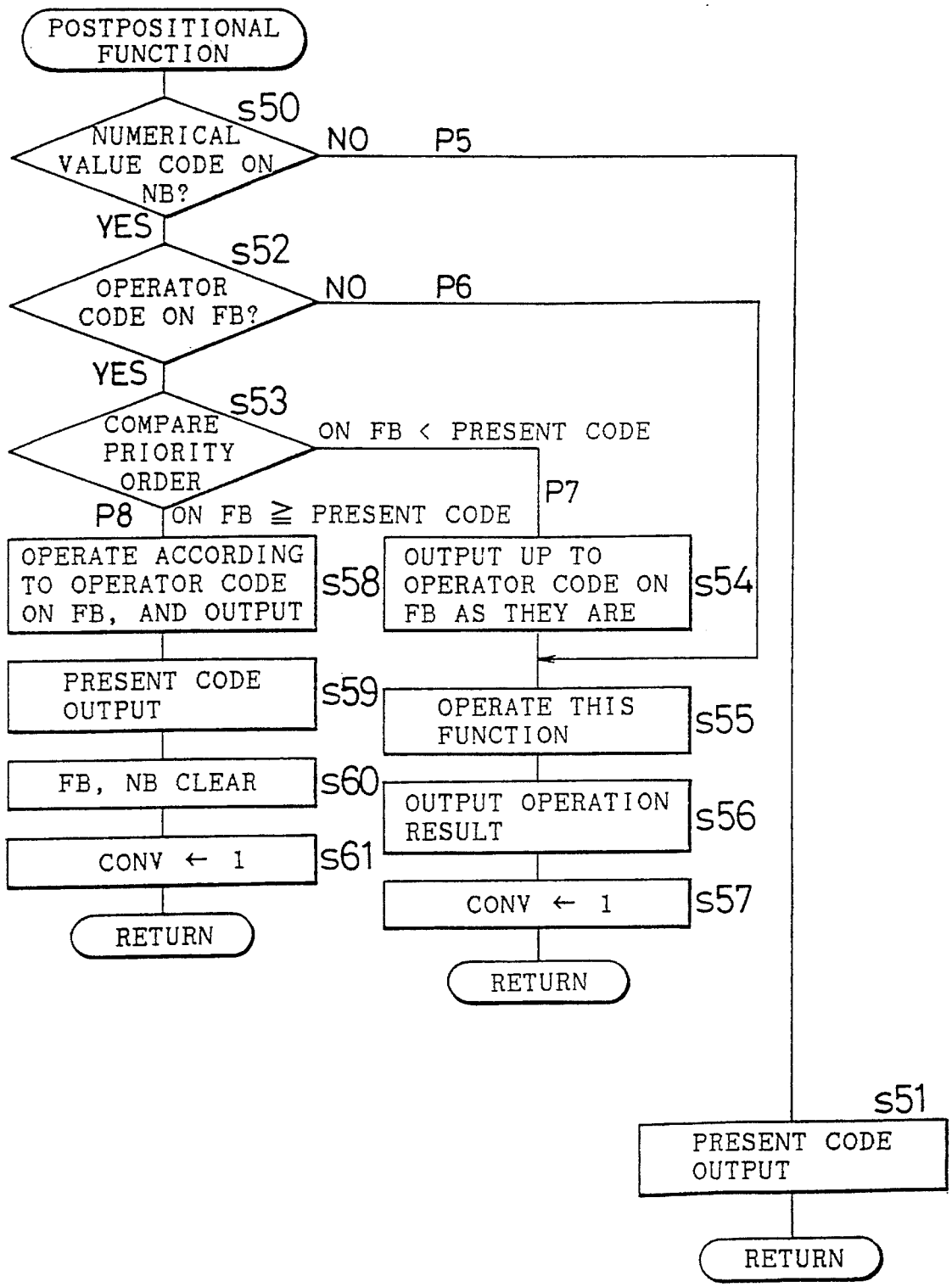
FIG. 10 is a processing flow chart of a postpositional function code of the embodiment.

In the case of processing a postpositional function code, any one of the processings P5 to P10 in FIG. 10 is executed.

P5 is a processing that is passed in the case of processing, for example, the code "%" of the formula "(2+3)%". In this case, since "(2+3)" has been previously operated and already outputted (NO at s50), the postpositional function code "%" is outputted (s51), and thereby the processing step is returned to s27 as shown in FIG. 7.

P6 is the processing that is passed in the case of processing, for example, the code "%" of the formula "3%". In this case, since operator code is not stored in the function buffer 3e (NO at s52), through the processing of s50, the operation conforming to the postpositional function code "%" is executed (s55), and the operation result is produced (s56), and the flag conv indicating the conversion has been conducted is set by using value 1 (s57). Afterwards, the operation returns to the processing of s27 in FIG. 7.

P7 is a processing that is passed in the case of, for example, processing the code "%" of the formula "2+3%". Since, through the processings of s50 and s52, it is judged that the code "+" preliminarily stored in the function buffer 3e is lower in priority order of operation than the code "%" to be processed at present (s53), the formula "2+" up to the operator code "+" preliminarily stored in the function buffer 3e is outputted directly (s54), and then "3%" is operated according to the postpositional function code "%" (s55), and the operation result "0.06" is outputted (s56). The flag conv showing the conversion has been executed is set by using value 1 (s57), and the processing step is returned to s27 as shown in FIG. 7. This formula "3%" is "3%" of "2", meaning 0.06. Hence, as the process formula, at this time, "2+0.06" is outputted.

P8 is a processing that is passed in the case of, for example, processing the code "%" of the formula "2^3%". As in this formula, when the code "^" preliminarily stored in the function buffer 3e is judged to be equal to or higher than the code "%" to be processed at present in the priority order of operation (s53), the formula "2^3" is operated and outputted (s58), and the code "%" to be processed is directly outputted (s59), and the function buffer 3e and numerical value buffer 3d are cleared (s60). At this time, the flag conv showing that the conversion has been done is set by using value 1 (s61). Afterwards, the processing step is returned to s27 as shown in FIG. 7.

Figure 11:
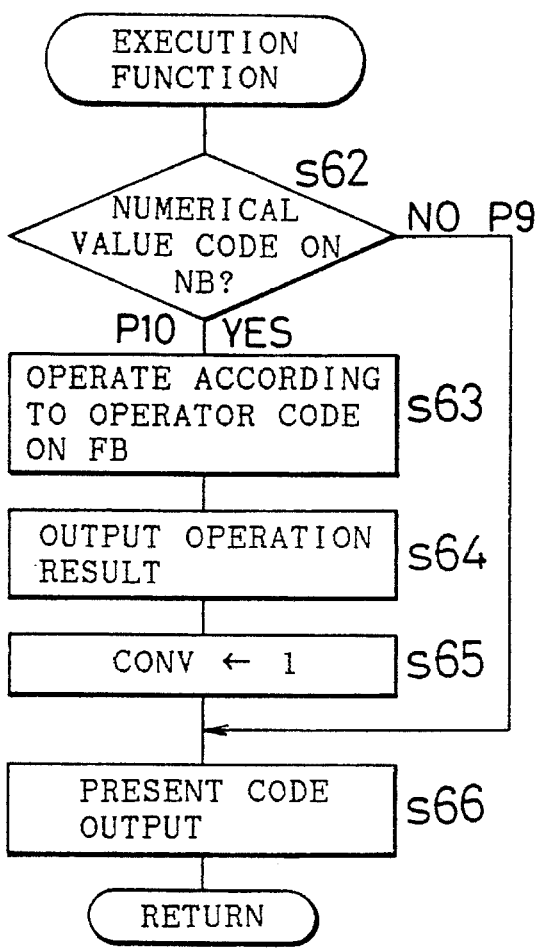
FIG. 11 is a processing flow chart of an execution function code of the embodiment.

Referring to FIG. 11, either a processing P9 or P10 as shown in FIG. 11 is carried out in the case of processing of execution function code. P9 is a process that is passed in the case of, for example, processing the code "=" of the formula "2+3%=". In this case, at the time of processing the execution function code "=", the operation result of the formula "2+3%" is already outputted. Since no code is stored on the function buffer 3e and the numerical value buffer 3d (NO at s62), the present execution function code "=" is outputted (s66), and the processing step is returned to s27 as shown in FIG. 7.

P10 is a processing that is passed in the case of, for example, processing the code "=" of the formula "2×3=". At this time, the code of the formula "2×3" is stored in the function buffer 3e and the numerical value buffer 3d (YES at s62), and the operation is performed according to the code stored in the function buffer 3e and the numerical value buffer 3d (s63), and the operation result is outputted (s64), and the flag conv showing that the conversion has been done is set by using value 1 (s65), and the present execution function code "=" is outputted as it is (s66), and the processing step is returned to s27 as shown in FIG. 7.

As mentioned above, in the case of processing two or more operator codes simultaneously by the function F1-b, in the processing of function F1-a, the operation conforming to the operator code stored in the function buffer 3e is performed, and the part of the inputted formula up to the operator code pointed by the pointer IP of the inputted formula or process formula are outputted after the position indicated by the pointer OP of the output formula or process formula, and then the processing of the next operator code is performed successively. That is, when the operation according to the operator code stored in the function buffer 3e is executed, and the part of the inputted formula up to the operator code pointed by the pointer IP is directly put out, for the comparison of priority order of operation, the operator code pointed by the pointer IP is stored at the same time in the function buffer 3e. Thereafter, the same processing may be continued.

For example, when "1+2" in a formula "1+2–4+2" is operated and "3" is outputted as the result, the operator code "–" being presently processed is outputted directly, and at the same time stored also in the function buffer 3e. Thereafter, the same processing is repeated. When processing the operator code "×", the operator code "–" is already stored in the function buffer 3e, and is used for comparison of priority order of operation. In this way, the processing corresponding to each function is basically the same as that of function F1-a, and when the operator code is outputted as it is, the operator code is stored in the function buffer 3e.

Figure 12:
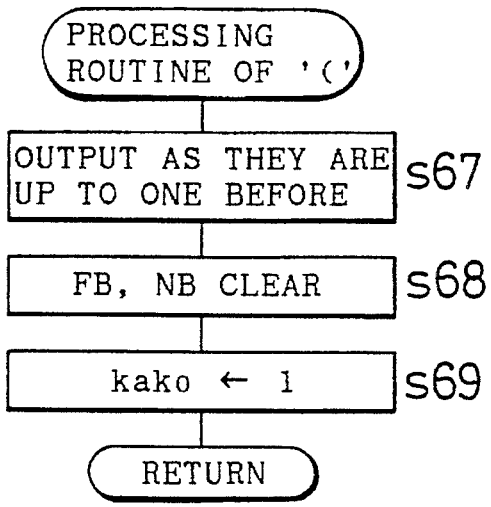
FIG. 12 is a processing flow chart of a code "(" of the embodiment.
Figure 13:
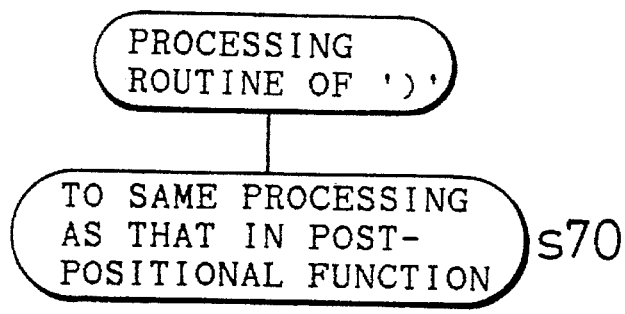
FIG. 13 is a processing flow chart of a code ")" of the embodiment.
Figure 14:
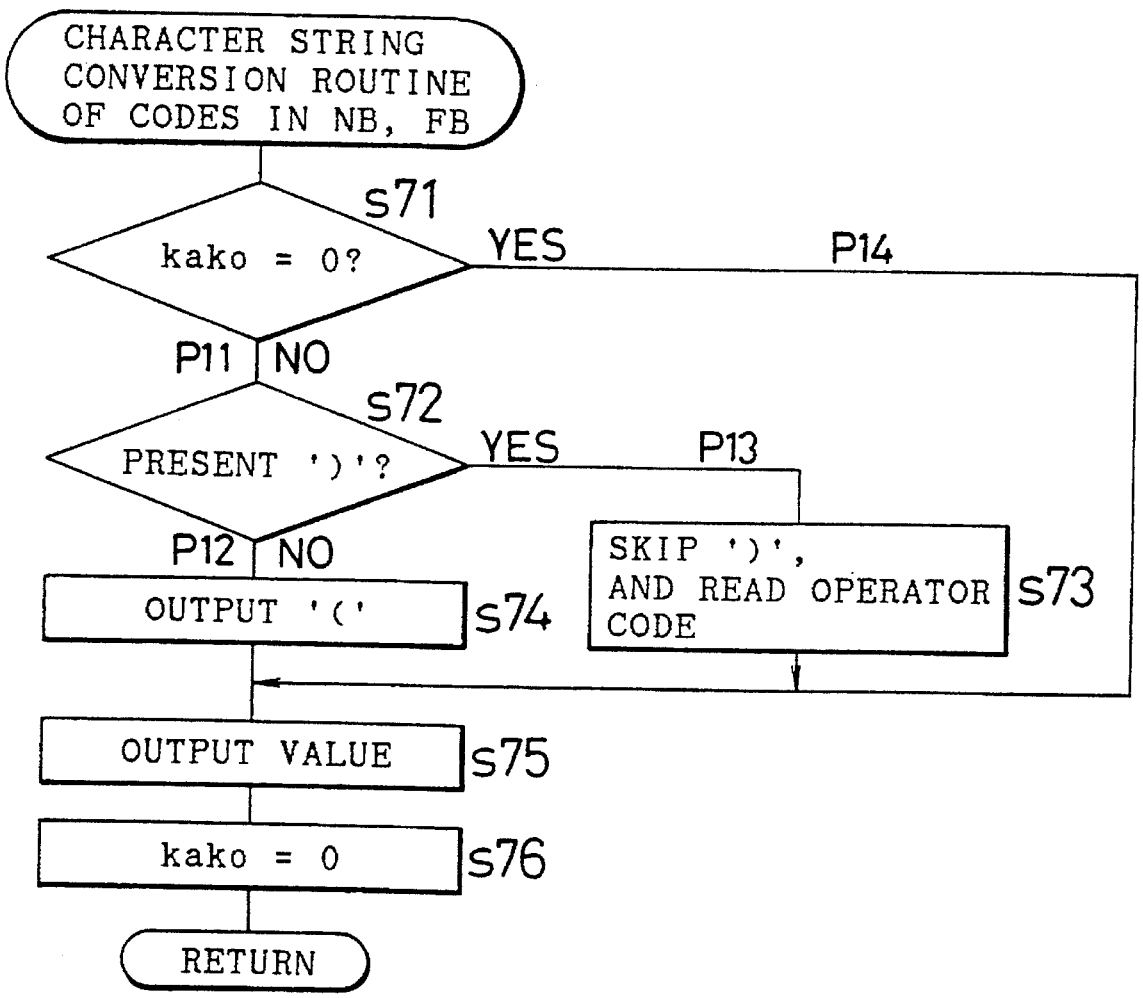
FIG. 14 is a flow chart of the processing of whether or not to remove the parentheses when outputting the code to a process buffer from a function buffer or numerical buffer of the embodiment.

When path n conforming to the flow chart in FIG. 7 is a path where the parenthesis of the function f1-c is removed, processing either a code "(" or a code ")" is executed in the processing (s27) corresponding to the code. FIGS. 12, 13 are respectively processing flow charts of the code "(" and the code ")" of the embodiment. FIG. 14 is a flow chart of the processing of whether or not to remove the parenthesis when outputting the code to the process buffer 3c from the function buffer 3e or numerical value buffer 3d in the embodiment. FIGS. 15A, 15B, 15C, and FIGS. 16A, 16B, 16C are diagrams for explaining display examples about the processing of function F1-c and an internal operation example of the embodiment.

The processing as shown in FIG. 12 is called when processing, for example, the code "(" of a formula "2+(3+4)". When processing the code "(", whatever codes may be stored in the function buffer 3e and the numerical value buffer 3d, the operation conforming to the code stored in the function buffer 3e and the numerical value buffer 3d will not be executed, regardless of the priority order. Accordingly, after directly outputting the formula "2+" up to the operator code "+" preliminarily stored in the function buffer 3e (DS67), the function buffer 3e and the numerical value buffer 3d are cleared (s68), and without outputting the code "(", the flag kako is set by using value 1 (s69), and the processing step is returned to S27 as shown in FIG. 7. Incidentally, the flag kako is the flag showing that the code "(" is present in the formula to be processed at present.

FIG. 13 shows a processing which is called when, for example, processing the code ")" of a formula "(2+3)". When processing the code ")", by setting the operator code about this code ")" lower in priority order of operation than that of the other operator codes, the processing is executed in the exactly same manner as in the postpositional function code mentioned above, and it is directly followed by the processing routine of the postpositional function code (see FIG. 10).

Referring next to FIG. 14, below is explained the processing of whether or not to remove the parenthesis when reading out the code from the function buffer 3e or the numerical value buffer 3d, and outputting into the process buffer 3c. At the time of outputting to the process buffer 3c, if the flag kako showing that the code "(" is present in the formula being processed at present is set (NO at s71), the code "(" is skipped, and it is followed by the processing of P11 in order to execute the processing of the code "(".

P12 is a processing which is called at the time of outputting after processing, for example, the code "–" of a formula "(2+3–4)". In this case, the operation of the formula "2+3" is executed, and the processing (s75) for outputting a operation result value "5" is done. However, in the case where the code ")" has not been detected from the formula (NO at s72) yet, if the flag kako is set, the code "(" is outputted (s74), and then the code "5" and the code "–" are outputted, and finally the formula "5–" is outputted (s75). Herein, since the processing (s74) of the code "(" has been executed, the flag kako is reset by using value 0 (s76).

P13 is a processing that is called an outputting after processing, for example, the code ")" of a formula "(2+3)". In this case, the formula "2+3" is operated, and this processing is called in order to output its operation result value of "5". Since it is not necessary to describe 5, which is one value, as "(5)", the code "(" and the code ")" in the original formula are omitted (s71 to S73), and only the operation result value "5" is outputted (s75). At this time, since processing of the code "(" has been done the flag kako is reset (s76).

P14 is a process for outputting a value only (s75) because the flag kako is not set (YES at s71), that is, processing of code "(" is not done.

As shown in FIG. 14, since the flag kako is always reset (s76) after the end of outputting to the process buffer 3c, it does not affect the subsequent processings.

The processing for removing the parenthesis is executed basically in the same manner as that of the prepositional function code for code "(", and the same as that of the postpositional function code for code ")". However, after the operation, for example, if the inside of the parentheses is a numerical value only, these parentheses must be removed, which is a different point from the processing of the prepositional and postpositional codes. This is explained in the following, referring to FIGS. 15A to 15C, 16A to 16C. FIG. 15A shows the state of the formula "(2+3)+4=" being displayed as "5+4=" after being operated and converted into "5+4", FIG. 15B shows the state of the formula "(2+3)+4=" stored in the edit buffer 3b and the process buffer 3c, and FIG. 15C shows the processing procedures of the formula as shown in FIG. 15B, the inside of the buffers, and the state of the flag kako. In a processing procedure (2) in FIG. 15C, when the operator code to be processed is a code "(", the code "(" is not outputted into the process buffer 3c, and the flag kako is set, and thereafter the processing proceeds in the same manner as that of the function F1-a. Consequently, when, in the processing procedure, (6), the flag kako is reset and the operator code to be processed is the code ")", the code "(" is not outputted, and only the operation result value 5 is outputted to the process buffer 3c because the processing for changing "(2+3)" into "5" is needed. Further, since, in the processing procedure (7), the next operator code "+" is read in, the code ")" is not also outputted.

FIG. 16A shows the state of the formula "(2+3+4)+5=" being displayed as "(5+4)+5=" after being operated and converted into "(5+4)+5=". FIG. 16B shows the state of the formula "(2+3+4)+5=" being stored in the edit buffer 3b or process buffer 3c, and FIG. 16C shows the processing procedures of the formula is shown in FIG. 16B, the inside of the buffers, and the state of the flag kako. In the case of processing the formula as shown in FIG. 16B, when the flag kako is set and the code under processing is other than code ")" (1 to 6 in FIG. 16C), it is the case of converting the formula "(2+3+4)" into a formula "(5+4)", and hence the code "(" is outputted before the numerical code.

Function F2 is intended for displaying a process formula after converting the numerical values contained in the formula to be processed according to the modes provided for each of plural expression forms of numerical value. This function F2 further comprises a function F2-a, which is intended for displaying a formula in which the numerical values contained in the formula to be processed have been converted on the basis of the modes and the operator codes positioned before and after the numerical values. The function F2-a is explained below, referring to FIGS. 17 to 20.

Figure 17:
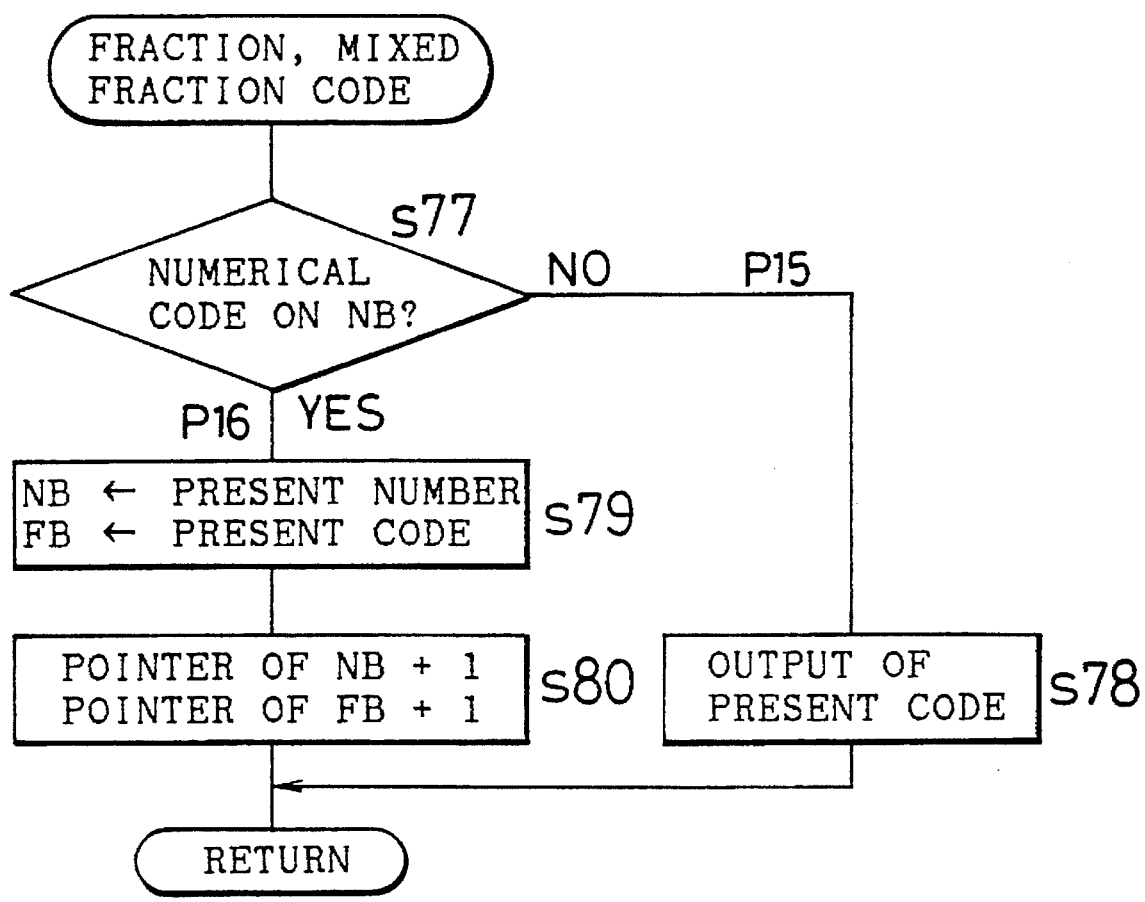
FIG. 17 is a flow chart of processing a fraction code or mixed fraction code of the embodiment.
Figure 18:
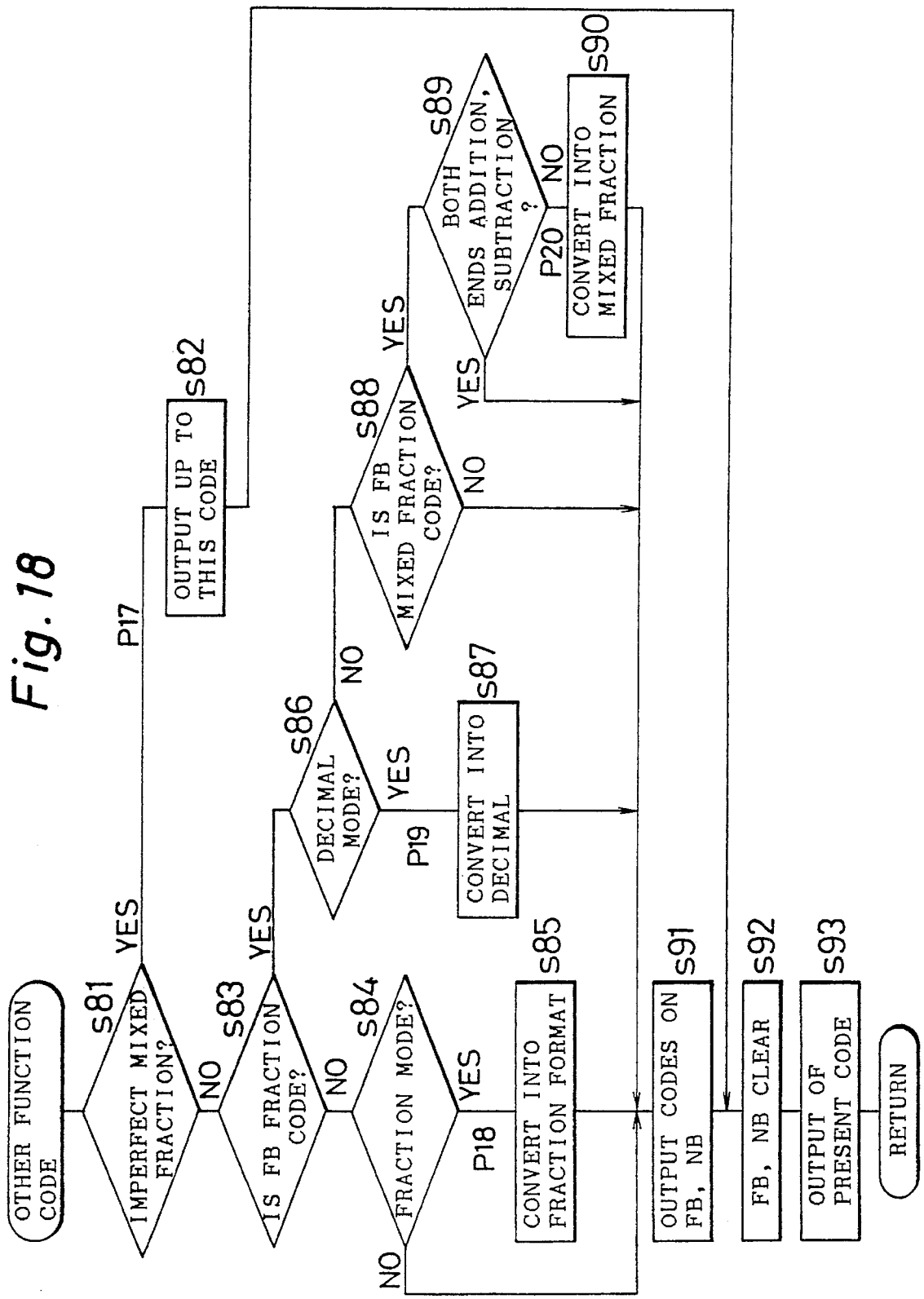
FIG. 18 is a flow chart of processing for converting a numerical value while corresponding to the present mode in relation to an operator code of the embodiment.

FIG. 17 is a flow chart of processing a fraction code or mixed fraction code of the embodiment. FIG. 18 is a flow chart of processing for converting a numerical value while corresponding to the present mode in relation to an operator code of the embodiment. FIGS. 19A, 19B, 19C, and FIGS. 20A, 20B, 20C are diagrams for explaining a display example of the processing of function F-a and an internal operation example of the embodiment.

When path n conforming to the flow chart as shown in FIG. 7 is a path for processing the function F2-a, processing for any code of fraction code, mixed fraction code and other function codes is executed in the processing for that code (s27).

As shown in FIG. 17, when processing a fraction code "/" or mixed fraction code ".", either processing P15 or P16 in the diagram is executed. P15 is, for example, a processing that is passed in the case of processing the fraction code "/" in a formula "(2+3)/2". In this case, at the time of processing the fraction code "/", the operation result of "(2+3)" has been already outputted, and no code is stored in the function buffer 3e and the numerical value buffer 3d (NO at s77), so that the present fraction code "/" is directly outputted into the process buffer 3c. Afterwards, the processing step is returned S27 as shown in FIG. 7.

P16 as shown in FIG. 17 is a processing to be passed in the case of processing, for example, the fractional code "/" in a formula "⅔". In this case, some code has been stored in the function buffer 3e or the numerical value buffer 3d (YES at s77), so that the present fraction code "1" and the numerical code "2" are stored in the fraction buffer 3e and the numerical value buffer 3d, respectively, (s79), and the pointers pointing a code stored position in the function buffer 3e and the numerical value buffer 3d, respectively are updated by +1 (s80). Thereafter, the processing step is returned to S27 as shown in FIG. 27.

In the case of the processing as shown in FIG. 18 for converting a numerical value in accordance with the present mode in relation to an operator code, any one of the processings P17 to P20 in the diagram is executed.

In these processings, the code preliminarily stored in the function buffer 8e or the numerical value buffer 3d is basically outputted in any form, and then the function buffer 3d and the numerical value buffer 3d are cleared (s92), and the code to be processed at present is directly outputted as it is (s93), and the processing step is returned to S27 in FIG. 7. The processings are done as follows according to the code stored in the function buffer 3e, the code stored in the numerical value buffer 3d, a specified display mode, and the code to be processed at present.

P17 as shown in FIG. 18 is a processing to be passed in the case where processings up to the code "+" in a formula containing an incomplete mixed fraction such as "1·(1+3)/8" are completed. Herein, the presence of an incomplete mixed fraction is recognized (YES at s81), and hence a portion of the formula, "1·(1+", up to the code "+" to be processed at present is outputted (s82).

P18 as shown in FIG. 18 is a processing (s85, s91) for converting into a fraction and outputting according to the code stored in the function buffer 3e and the numerical value buffer 3d, in the case of the fraction code "/" not stored in the function buffer 3e (NO at s83) and specified as fraction mode (YES at s84).

P19 as shown in FIG. 18 is a processing (s87 and S91) for converting into a fraction and outputting according to the code stored in the function buffer 3e and the numerical value buffer 3d, in the case of the fraction code "/" already stored in the function buffer 3e (YES at s83) and specified as fraction mode (YES at s84).

P20 as shown in FIG. 18 is a processing to be passed when the fraction code "/" is already stored in the function buffer 3e (YES at s83) and the mixed fraction code "." is also stored (YES at s88). In this case, concerning the mixed fraction code ".", if the operator codes positioned before and after the mixed fraction code are other than the codes meaning addition or subtraction, it must be converted into an improper fraction, even in the case of mixed fraction code, and therefore if the preceding and succeeding operator codes are not a code meaning addition or subtraction (NO at s89), this is a processing (s90, s91) for converting the mixed fraction conforming to the code stored in the function buffer 3e and the numerical value buffer 3d into an improper fraction and outputting the result.

Regarding the specification of mode, for example, in order to specify the decimal mode, the [A,xxx] key 13 expressing the decimal mode belonging to a display mode setting key group 1b as shown in FIG. 4 is pressed. When the ode is selected, the flag in the RAM 3 corresponding to the selected mode is set. Therefore, based on the state of flags for specifying these modes, it is judged which mode is specified at present.

Assuming that the decimal mode is specified, the case of converting a fraction into a decimal is explained with reference to FIGS. 19A–19C and 20A–20C. The numerators and denominators of the fractions in the formulas are numerical values or calculation formulas, such as ⅔, (2+3)/4, 2/(3+4), (2×3)/(4+5). The fraction as a numerical value is converted into a decimal, and therefore when both numerator and denominator are numerical values, they are promptly converted, but otherwise a processing that the conversion is not conducted is necessary. The method for realizing such processing is explained below.

FIGS. 19A and 20A show formulas before and after conversion, FIGS. 19B and 20B show the state of the formula to be converted, being stored in the edit buffer 3b or process buffer 3c, and FIGS. 19C and 20C show the processing procedure of the formulas as shown in FIGS. 19B and 20B, respectively, and the internal state of various buffers.

In procedure (2) in FIG. 19C, in the case where the code to be processed is a fraction code "/", if the code before the fraction code "/" is a numerical code, the numerical code and the fraction code "/" are stored in the numerical value buffer 3*d* and the function buffer 3*e*, respectively, and the processing step is transferred to the next procedure (3) for processing a code "2". Afterwards, in procedure (4), when processing an operator code "+" other than the fraction code "/", it is judged from a numerical value code in the numerical value buffer 3*d* and an operator code in the function buffer 3*e* whether or not to be a fraction. In the case of a fraction, the fraction is converted into a decimal according to the decimal mode specified as display mode, and the numerical value after this conversion is outputted to the process buffer 3*c*.

As shown in FIGS. 20A–20C, if either the numerator or the denominator is not a numerical value, the fraction code "/" is outputted as it is.

When the mixed fraction mode is specified as the display mode, such cases exist that the fraction is not be converted into a mixed fraction, and the mixed fraction is converted into a fraction. For example, when multiplication or division is processed, the steps of calculations are not known unless the mixed fraction is one converted into a fraction (improper fraction or proper fraction). It is in the case of addition or subtraction processing alone that the mixed fraction can be directly calculated in its form. Hence, even in the mixed fraction mode, if a processing other than addition or subtraction is required, a processing for converting the mixed fraction into a fraction (proper fraction or improper fraction) is necessary, and therefore it requires a special judgment by the operator codes positioned at both sides of a numerical value (mixed fraction, improper fraction, proper fraction, fraction) in analysis of formula.

A function F3 is intended for individually executing special processings other than the processing of function F1. The function F3 further comprises a function F3-a for displaying a process formula at the moment of transformation of a formula, when the formula is transformed regarding an operator code in the formula before an operation process conforming to the operator code is executed, and a function F3-b for displaying a process formula converted by using other operator code having the same function before an operation process conforming to an operator code in a formula.

Figure 21A:
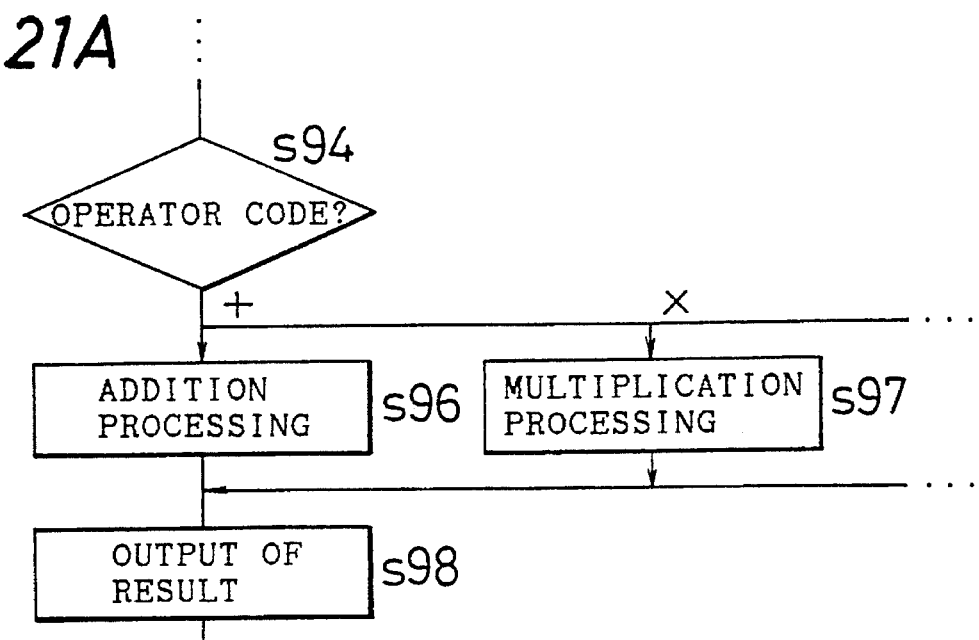
FIGS. 21A, 21B are flow charts for explaining the processing for outputting a process formula at the moment of value conversion as to processing informing to an operator code of the embodiment.
Figure 21B:
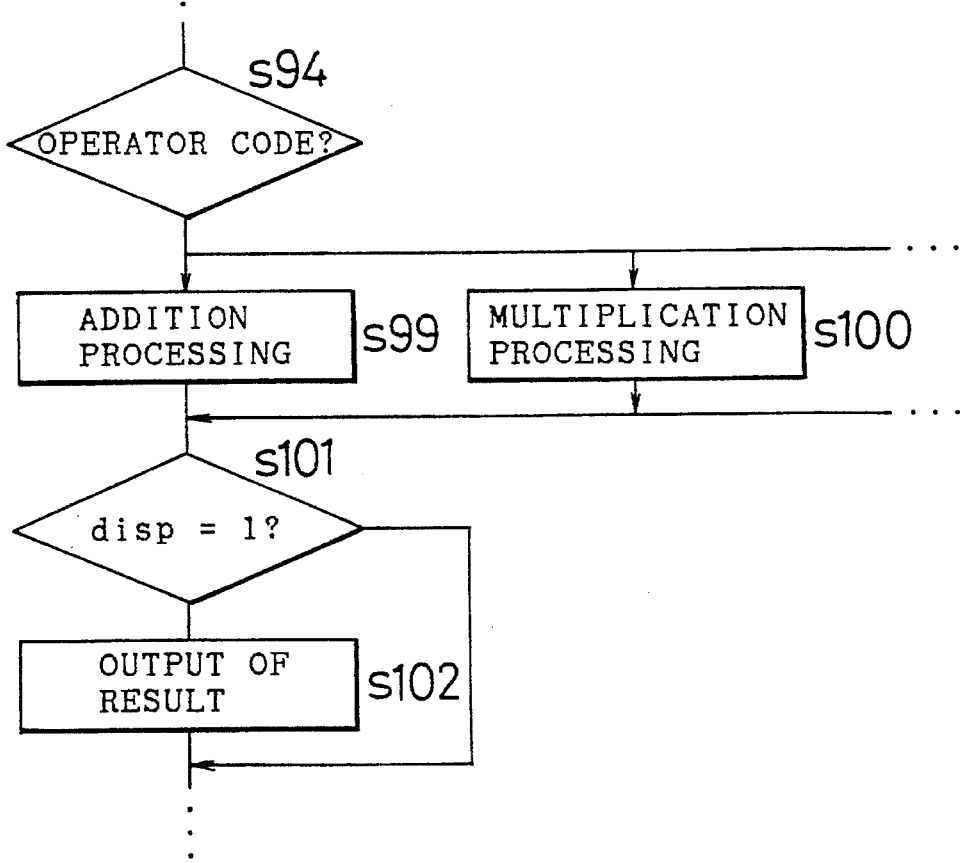

The function F3-a is described below, referring to FIGS. 21–24. FIGS. 21A, 21B are flow charts for explaining the processing for outputting a process formula at the moment of value conversion as to processing conforming to an operator code of the embodiment. The processing of the operation conforming to one operator code usually outputs the result of the operation processing. In other case, however, the operation formula relating to this operator code is once converted into other formula, and the result is outputted. When the operation conforming to an operator code in an inputted formula or process formula is done, the kind of the operator code is usually judged (s94) as shown in FIG. 21A, and various processing routines such as addition processing (s96) and multiplication processing (s97) are executed, and the process formula including the processing result is outputted (s98).

On the other hand, in the case where an operation formula is once converted into other formula having the same mathematical contents and the result is outputted, instead of outputting the result of operation processing conforming to an operator code, the kind of the operator code is judged (s94), and various processing routines such as addition processing (s99) and multiplication processing (s100) are executed, and the state of the flag disp showing whether or not the processing result is outputted as a process formula in the processing routine is checked (s101), and if the flag disp is not set by using value 1 (NO at s101), the result of the ordinary operation processing is outputted as a process formula, but otherwise (YES at s101), the result of the operation processing is not outputted, and the other formula obtained by once converting the operation formula is outputted.

Figure 22:
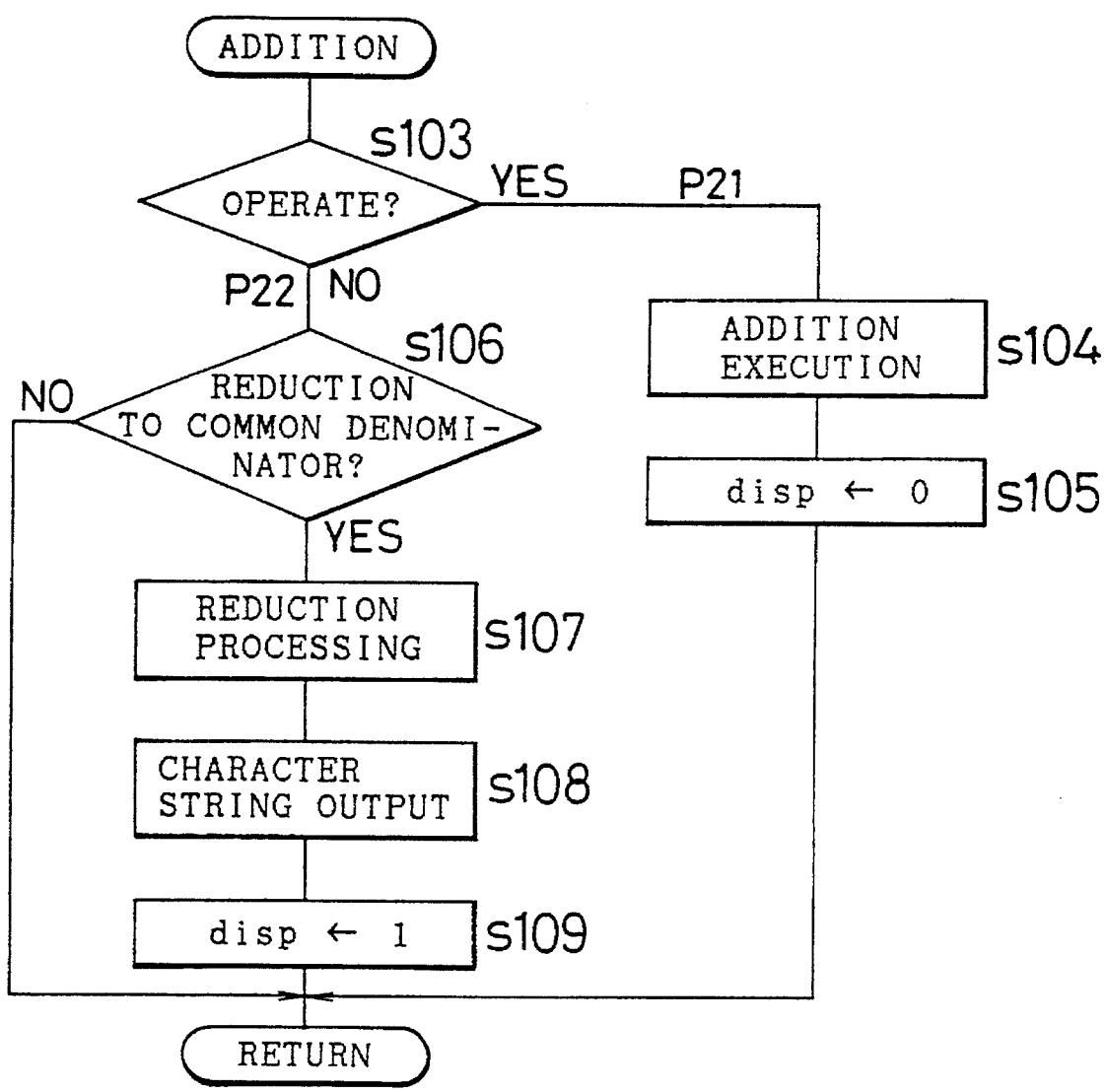
FIG. 22 is a flow chart of an addition processing routine in FIG. 21B.

FIG. 22 is a flow chart of addition process routine in FIG. 21B. FIG. 22 is applied to the addition processing routine, but it can be similarly applied to the subtraction processing routine. In FIG. 22, in the addition processing routine conforming to the operator code "+" in the formula, first it is assumed that the formula is converted by reduction processing of a fraction into a common denominator. In P21 in the diagram, for example, when two numerical values relating to a operator code "+" are both decimals, or two numerical values are fractions having the same denominators, the addition processing may be done directly (YES at s103), and therefore the addition processing is executed directly (104), and afterwards the flag disp showing that the result of the addition processing is outputted is reset by using value 0 (s105), and thereby the processing step is returned to S99 in FIG. 21B. In P22 in the diagram, for example, when two numerical values about the operator code "+" are fractions having different denominators, the addition processing cannot be done directly (NO at s103), and reduction of these fractions into a common denominator is needed (YES at s106), and therefore reduction processing is done (s107), and the result obtained by the reduction processing into a common denominator is once outputted as a process formula (s108), and the flag disp is set by using value 1 in order to show that outputting is already done (s109), and thereby the processing step is returned to S96 in FIG. 21B.

In the operation processing routine conforming to an operator code as described above, if the formula is once converted relating to this operation processing, the result of the conversion may be sometimes outputted as other process formula having the same content mathematically. This is further described while referring to FIGS. 23A–23C and FIGS. 24A–24E. FIGS. 23A, 24A are diagrams for explaining the display examples about processing of the function F3-a of the embodiment. FIGS. 23B, 23C and FIGS. 24B–24E are internal operation examples.

FIG. 23A shows the state of the formula "⅕+⅖+1=" being operated, and converted and displayed as "⅗+1=", FIG. 24B shows the state of the formula "⅕+⅖+1=" stored in the edit buffer 3*b* or process buffer 3*c*, and FIG. 23C shows the processing procedure of the formula in FIG. 23B, the inside of various buffers, and the state of flag disp. When processing the formula in FIG. 23B, at the time of a second processing of the operator code "+" (procedure 8 in FIG. 23C), the fractions are added (½+⅖) according to the contents of the numerical value buffer 3*d* and function buffer 3*e*, and the result (⅗) is outputted to the process buffer 3*c*. At this time, sine the operation result is outputted in the process buffer 3*c*, the flag disp remains reset by using value 0. Therefore, as shown in FIG. 23A, the process formula "⅗+1=" is displayed.

FIG. 24A shows the state of a formula "½+⅓+1=" being operated, and converted and displayed as "3/6+2/6+1="–>"⅚+1=", and FIG. 24B shows the state of the formula "½+⅓+1=" stored in the edit buffer 3b or process buffer 3c, and FIG. 24C shows the processing procedure of the formula in FIG. 24B, the inside of various buffers, and the state of the flag disp. Furthermore, FIG. 24D shows the state that the process formula "3/6+2/6+1=" obtained in the processing procedure in FIG. 24C is stored in the process buffer 3c, and FIG. 24E shows the processing procedure of the process formula in FIG. 24D, the inside of various buffers, and the state of the flag disp. When processing the formula in FIG. 24B, at the time of the second processing of the operator code "+" (see processing procedure 8 in FIG. 24C), the fractions are reduced to a common denominator (½+⅓+) according to the contents of the numerical value buffer 3d and function buffer 3e, and the result of the reduction (3/6+2/6+) is outputted into the process buffer 3c. At this time, since an operation result is not outputted, but the formula is once converted, the flag disp is set by using value 1. Therefore, as shown in FIG. 24A, the process formula "3/6+2/6+1=" is once displayed.

Moreover, when processing the formula in FIG. 24D, at the time of the second processing of the operator code "+" (processing procedure 8 in FIG. 24E), the fractions are added (3/6+2/6) according to the contents of the numerical value buffer 3d and the function buffer 3e, and the result (5/6+) is outputted to the process buffer 3c. At this time, since the operation result is outputted as a process formula to the process buffer 3c, the flag disp remains reset by using value 0. Therefore, as shown in FIG. 24A, the next process formula "5/6+1=" is displayed.

The function F3-b is described below, referring to FIG. 25 and FIGS. 26A to 26E. This function is similar to the function F3-a, and is used in the operation processing conforming to a certain operator code in the formula, being intended to convert to other formula having the same contents mathematically, by using other operator codes having the same meaning. For example, in the operation processing, when the power calculation is judged to be possible, the operation processing is not executed, but the formula is developed as, for example, "3^2=3×3".

Figure 25:
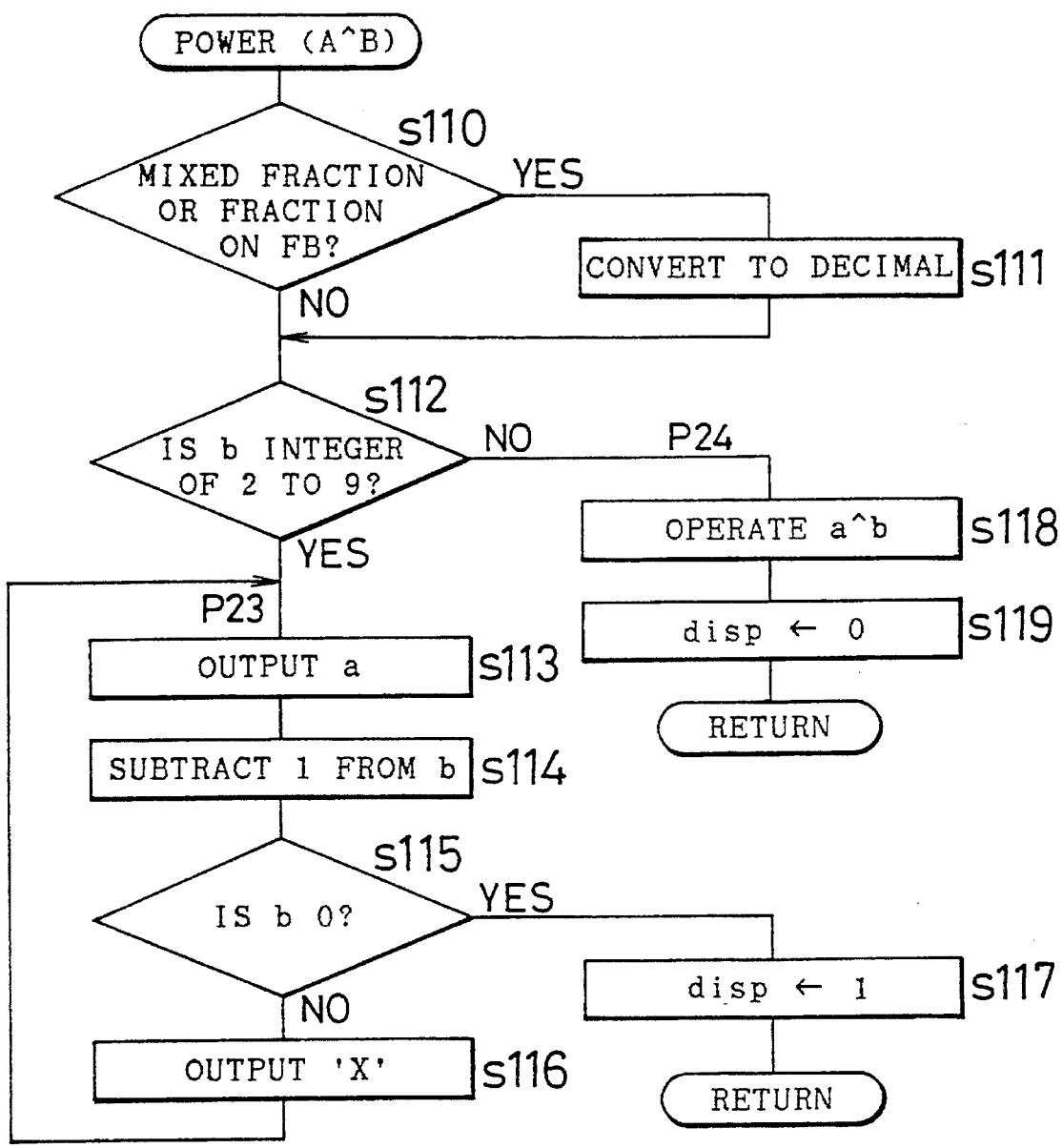
FIG. 25 is a flow chart of a power operation process of the embodiment.

FIG. 25 is a flow chart of the power operation processing of the embodiment. This processing flow chart is used when converting a numerical formula containing a power code (^), and it is judged herein how to convert the power code, and the formula obtained by conversion is outputted. In the processing flow chart of the power code, it is first checked if the function buffer 3e has already stored the mixed fraction code or fraction code (s110), and if the mixed fraction code or fraction code has been stored (YES at s110), it is converted into a decimal according to the content in the numerical value buffer 3d and the function buffer 3e at that time (s111). After conversion into decimal or when neither mixed fraction code nor fraction code has been stored in the function buffer 3e, it is judged to process either P23 or P24 according to the multiplier value relating to the power code (s112).

P23 is a processing to be passed when the multiplier relating to the power code is any integer from 2 to 9 (YES at s112) in the case of power operation processing such as formula "2^3". In the case of such multiplier, the multiplication of the number of times conforming to the multiplier, for example, "2×2×2" is outputted (s113 to S116), and the flag disp is set by using value 1 (s117), and thereby the processing step is returned to an upper processing step.

P24 is a process to be passed when the multiplier relating to the power code is not an integer from 2 to 9 (NO at s11) in the case of operation such as formula "2^0". In the case of such multiplier, the operation processing according to the power code is effected (s118), and the operation result value (1) is outputted, and the flag disp is reset by using value 0 (s119), and thereby the processing step is returned to an upper processing step.

FIG. 26A is a diagram for explaining a display example about processing of function F3-b of the embodiment and FIGS. 26B–26E are internal operation examples of the embodiment. FIG. 26A shows a state that a formula "sin3^2= is" converted and displayed as "sin(3×3(=", and the formula is further operated and displayed as "sin9=". FIG. 26B shows a state that the formula "sin3^2=" is stored in the edit buffer 3b or process buffer 3c, and FIG. 26C shows the processing procedures of the formula in FIG. 26B, the inside of various buffers, and the state of flag disp. FIG. 26D shows a state that the formula "sin(3×3)=" is stored in the process buffer 3c, and FIG. 26E shows the processing procedures of formula in FIG. 26D, the inside of various buffers, and the state of flag disp. In the processing procedures (5) in FIG. 26C, it is judged that the power operation processing is needed for the operator code sin to be processed, and at the same time, since the operator code "sin" exists, the development processing of the power and addition of "(" and ")" are executed. Herein, the formula relating to the power operation process is developed only, and the processing result about the operator code sin by conversion of the formula is not obtained, and therefore the flag disp is set by using value 1, and the formula "sin (3×3)=" obtained by converting into the process buffer 3c is produced.

Furthermore, the formula (see FIG. 26D) outputted to the process buffer 3c is processed according to the processing procedures shown in FIG. 26E, and the process formula "sin9=" is outputted into the next process buffer 3c. As shown in examples in FIGS. 26A to 26E, when converting the power code to a form using the operator code "×", if the priority order of the operator codes positioned before and after the power code is between the power code and the code "×", it is necessary to process by enclosing the converted portion in the formula with parentheses or the like so that the priority order of operation conforming to the operator code may not vary relating to the formulas before and after conversion.

Function F4 makes it possible to create a process formula desired by a user even when plural process elements relating to the functions F1 to F3 are present simultaneously. The function F4 further comprises a function F4-a for processing process elements differing in type in the formula in difference processes, without processing simultaneously. By this function F4, when the formula is calculated by first converting the decimal 0.5 into a fraction, such as "½+⅓+0.5=", the operation process conforming to the operator code "+" of "½+⅓" and the process for converting "0.5" into fraction "½" are not executed simultaneously. Thus, steps in the formula which may be confused if processed simultaneously may be prevented from being processed simultaneously within one process. More specifically, of the necessary steps, those must be always processed simultaneously are put in the same path, and steps not to be processed simultaneously are put into different paths, and each path is executed according to the processing using value 0 as an initial setting. Within a processing of each path, unless operation processing conforming to operator code, development of formula, or any other conversion is done, the flag conv is set by using value 1. After process execution of each path, the flag conv is checked. When the flag conv is set, the subsequent paths are not executed, and the processing result of this path is outputted as a process formula. On the other hand, if the flag conv has been reset, no conversion such as operation following the operator code and development of formula has been done in this path, and hence the next path is executed. The outline of such path changing process and outline of processing in each path are shown in the flow charts in FIGS. 6, 7, of which description is omitted herein.

FIGS. 27A–27C, and FIGS. 28A–28E are diagrams for explaining the display examples about the processing of function F4-a of the embodiment, and internal operation examples.

FIG. 27A shows the state of the formula "3^2+1=" being developed and displayed as "×3+1=", FIG. 27B shows the state of the formula "3^2+1=" stored in the edit buffer 3b or process buffer 3c, and FIG. 27C shows the processing procedure of the formula in FIG. 27B, the inside of various buffers, and the state of flag conv. As shown in FIG. 27C, the moment the path for development of the formula conforming to the power code "^" is terminated (see processing procedure 6 in FIG. 27C), the flag conv is set, and the path for the next operation processing or conversion processing is not executed. Therefore, as shown in FIG. 27A, the process formula "3×3+1=" is stored in the process buffer 3c, and is displayed.

Figures 28D, 28E:

FIG. 28A shows the state of the formula "3×3+1=" operated and processed, and displayed as "9+1=", FIG. 28B shows the state of the formula "3×3+1=" stored in the edit buffer 3b or process buffer 3c, and FIG. 28C shows the processing procedure of the formula in FIG. 28B, the inside of various buffers, and the state of flag conv. FIG. 28D shows the state of the formula "3×3+1=" stored in the edit buffer 3b or process buffer 3c, and FIG. 28E shows the processing procedure of the formula in FIG. 28D, the inside of various buffers, and the state of flag conv. When processing the formula in FIG. 28B in the path for development of power, as shown in FIG. 28C, this path is terminated with the flag conv being reset, and therefore depending on the state that this flag conv is reset, the next path for operation processing is executed, and first the operation processing conforming to the first operator code "×" is conducted according to the procedure in FIG. 28E regarding the formula shown in FIG. 28D, and the process formula "9+1=" is stored in the next process buffer and displayed. Thus, by using the flag conv, it is controlled so that the steps which may be confused if processed simultaneously in one process may be prevented from being processed simultaneously, such as the path of conversion process for power development and the path of operation processing conforming to an operator code.

Incidentally, the number of digits of numerical value that can be held inside the calculator in ordinary operation is limited, and accurate results may not be always obtained in that state. Accordingly, in order to calculate more accurately, various means are devised inside the calculator. Besides, if the calculator has the function for specifying the number of positions of display, it may be sometimes displayed less than the actual number of digits of the numerical value. Or, as in this embodiment, in the case of successively displaying the process formulas as the intermediate processes of operation, if the same display method as that of the final result is applied to the display of the numerical value in the process formula, a contradiction may occur between the result operated through the process formula display and the result of ordinary operation.

Accordingly, the calculator of the embodiment also has a function F5 for creating a process formula and the display in order to avoid the contradiction between the result calculated through the process formula display and the result or ordinary operation.

The function F5 further comprises a function F5-a for holding the number of internal digits in the operation, regardless of the content of the display, whenever the number of internal digits of operation processing (the number of digits of numerical value that can be operated inside the calculator) is greater than the number of digits of display of numerical value, a function F5-b for holding the numerical value in a format always highest in precision regardless of the display format, for the numerical value having plural forms of expression such as decimal and fraction, and a function F5-c for displaying a rounded figure for the numerical value exceeding the number of positions of display at each step of the process, and matching the result of ordinary operation with it.

The functions F5-a and F5-b are the functions for matching the process for obtaining the process formula with the process of ordinary operation, and the function F5-c is a function for conducting the same processing in the intermediate process of operation in both the ordinary operation and the process formula creation.

The function F5-a is described in detail. In operation, in order to operate more accurately, it is general that the calculator is capable of processing a greater number of character positions than the number of character positions displayed. Hence, in the midst of displaying a process formula, there may be numerical values which cannot be displayed in full digits. Or in the case where an irrational number occurs in the midst of operation, if certain digits of the numerical value are displayed and the subsequent display of the remaining digits is omitted, it is not known whether there is any succeeding number or not. Accordingly, when an irrational number occurs in the midst of operation, a display showing that a certain number of digits follows, such as ". . . ", is given, and thereby a rational number and an irrational number can be distinguished. For example, if $\sqrt{2}$ is displayed as 1.414 . . . , it can be clearly distinguished from the real number 1.414. For the provision of this display, a code etc1 is newly provided. When this code is displayed in the LCD 2, it is converted and displayed as ". . . ".

FIGS. 29A and 29B are diagrams showing the state of the inputted formula of the embodiment being converted into and displayed as a process formula containing the code etc1. When a formula "√2+1" is entered by key operation, this formula is stored as an inputted formula in the edit buffer 3b as shown in FIG. 29A, and is displayed in the LCD 2. By operating this inputted formula, an irrational value exceeding the number of display digits occurs about "√2" in the result of operation, and as the output process of this irrational number to the process buffer 3c, first the display portion (1.141) is produced, and the code etc1 is issued, then the undisplayed portion (213562) is outputted. As a result, as shown in FIG. 29B, the process formula "1.141etc1213562+1" is stored in the process buffer 3c.

When the display content about the LCD 2 is created in the display buffer 3a according to this process formula, the codes from the beginning code of the process formula in the process buffer 3c to the code etc1 are transferred to the buffer 3a, and the numerical value codes "0" to "9" after the code etc1 are ignored and not transferred until other code than this is detected. After transfer processing into the display buffer 3a, when data is displayed in the LCD 2 according to the content in the display buffer 3a, the code etc1 in the buffer 3a is converted into and displayed as ". . . ", and hence the process formula is displayed as "1.414 . . . +1" as shown in FIG. 29B. When the operation further continues, the code is read in from the process formula in the process buffer 3c in FIG. 29B, and the code etc1 is ignored, and the subsequent numerical value code following this code is read in, so that the numerical values in all digits held in the process buffer 3c can be used in operation.

Therefore, if the number of digits of operation inside the calculator is greater than the number of digits of display of numerical value in LCD 2, for example in the event of an irrational number, the calculator can always hold the number of digits of operation in operation processing, regardless of the content of display. Hence, for example if an irrational number 1/7=0.1428571 . . . occurs in the process, when the number of digits of display is determined to be 3 digits below the decimal point, it is displayed as "1/7=0.142". When it is followed by the operation of "×3", it is "0.142×3". In this case, the result of calculation is 0.428571 . . . , but when calculated in the displayed formula "0.142×3", the result is "0.425", and the third digit below the decimal point differs. Without allowing such difference, the omission of the display digits is clarified as follows.

Ordinary calculation result: 1÷7×3=0.428571429

Process display: 1÷7×3=0.142 . . . ×3=0.428571429

The function F5-b is described below. Suppose that there are two or more methods for expressing a certain numerical value, and that the operation is more accurate when a certain method of expression is used. By operation for obtaining the process formula, assume an expression format of a certain numerical value is converted into a less accurate method of expression. At this time, in the created process formula, suppose the numerical value of an accurate expression format is held together with the numerical value of the less accurate expression format in the created process format, to use the less accurate numerical value in display and use the accurate numerical value in operation processing in the calculator. Or, when the numerical value is converted, it is also possible to hold the numerical value after conversion and the numerical value before conversion simultaneously. What is held is not limited to a numerical value, but may be a formula, and a formula may store as a more accurate conversion result. This method of realization is described below.

For this processing, in the first place, code etc2 is newly provided. For example, it is explained on assumption that a certain numerical value can be expressed in two methods, that is, fraction and decimal. When a fraction is transformed into a decimal, it is possible to operate more accurately by operating in fraction than in decimal. Therefore, when the fraction is converted into a decimal when specifying the decimal display mode, code etc2 is added after the obtained decimal, and the denominator of the original fraction is added in succession. When creating the display data from thus obtained process formula, the code is transferred from the process buffer 3c to the display buffer 3a, but is sequentially transferred from the beginning code of the process formula of the process buffer 3c to the buffer 3a, and when the code etc2 is detected in the process formula, that code and the succeeding numerical value code are ignored until other code is detected and not transferred to the buffer 3a. As a result, only the decimal portion of the process buffer 3c is transferred to the display buffer 3a. When reading-in the numerical value from the process formula, when the code etc2 is detected by reading-in from the beginning code of the process formula, a fraction is obtained from the hitherto read numerical code and the numerical code expressing the denominator of the fraction after the code etc2 are obtained, and the fraction is read as the value.

In a similar method, when the fraction is transformed into a decimal, the code etc2 is added behind the converted decimal as the fraction is converted to a decimal, and the original fraction formula is added also in succession. When display data is created from thus obtained process formula, the code is transferred from the process buffer 3c to the display buffer 3a, and by transferring to the buffer 3a sequentially from the beginning code of the process formula in the process buffer 3c, and when the code etc2 is detected in the process formula, this code and the subsequent code expressing numerical value and fraction code "/" are ignored until other code is detected, and not transferred to the buffer 3a. Hence, in the display buffer 3a, only the decimal portion is transferred. When reading in the value from the process formula of the process buffer 3c, the codes are read-in sequentially from the beginning code of the process formula, and when the code etc2 is detected, the hitherto read numerical codes are discarded (invalidated). Hence, the decimal positioned before the code etc2 is not read-in, and the fraction formula following the code etc2 is read-in as the value. This is more specifically described below.

Figure 3B:
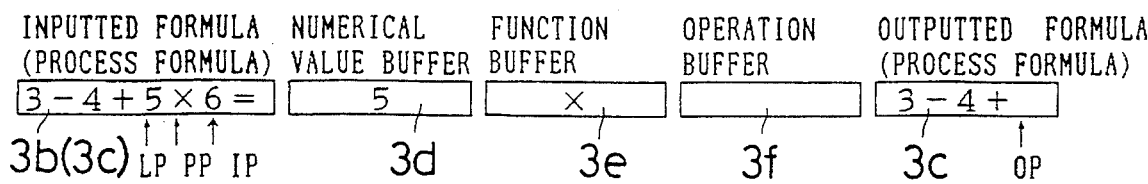

FIGS. 30A and 3B are diagrams for explaining the state of the inputted formula of the embodiment converted into a process formula containing the code etc2, and displayed. By the key input of formula "1/8+4", this formula is stored as inputted formula into the edit buffer 3b as shown in FIG. 30A, and is displayed in the LCD 2. When this inputted formula is operated, as shown in FIG. 30B, the process formula "0.125 etc21/8/+4" is stored in the process buffer 3c as shown in FIG. 30B. When this process formula is displayed in the LCD 2 while transferring the code to the display buffer 3a, the code etc2 in the process formula, the subsequent numerical code, and fraction code are ignored, and not transferred to the display buffer 3a, and hence the process formula is displayed as shown in FIG. 30B.

Or, when reading-out the value from the process buffer 3c in FIG. 30B and performing certain operation processing, as mentioned above, the decimal (0.125) before the code etc2 in the process formula (0.125) is discarded, and the subsequent formula containing a fraction (1/8+4) is read-in.

The code etc1 and etc2 may be mixed in one numerical value of the process formula. At this time, if there is any numerical value code after code etc1, when the code etc2 is detected, the process formula can be shortened by processing so as to ignore the mantissa portion after the code etc1 depending on the process. For example, if the display of result of numerical value is 2 digits below the decimal point, it is as follows:

When holding the denominator: 1/8+4=0.122etc1 5etc2 8+4

When holding a fraction formula: 1/8+1=0.12 etc1 5 etc2 1/8+4

Figure 31:
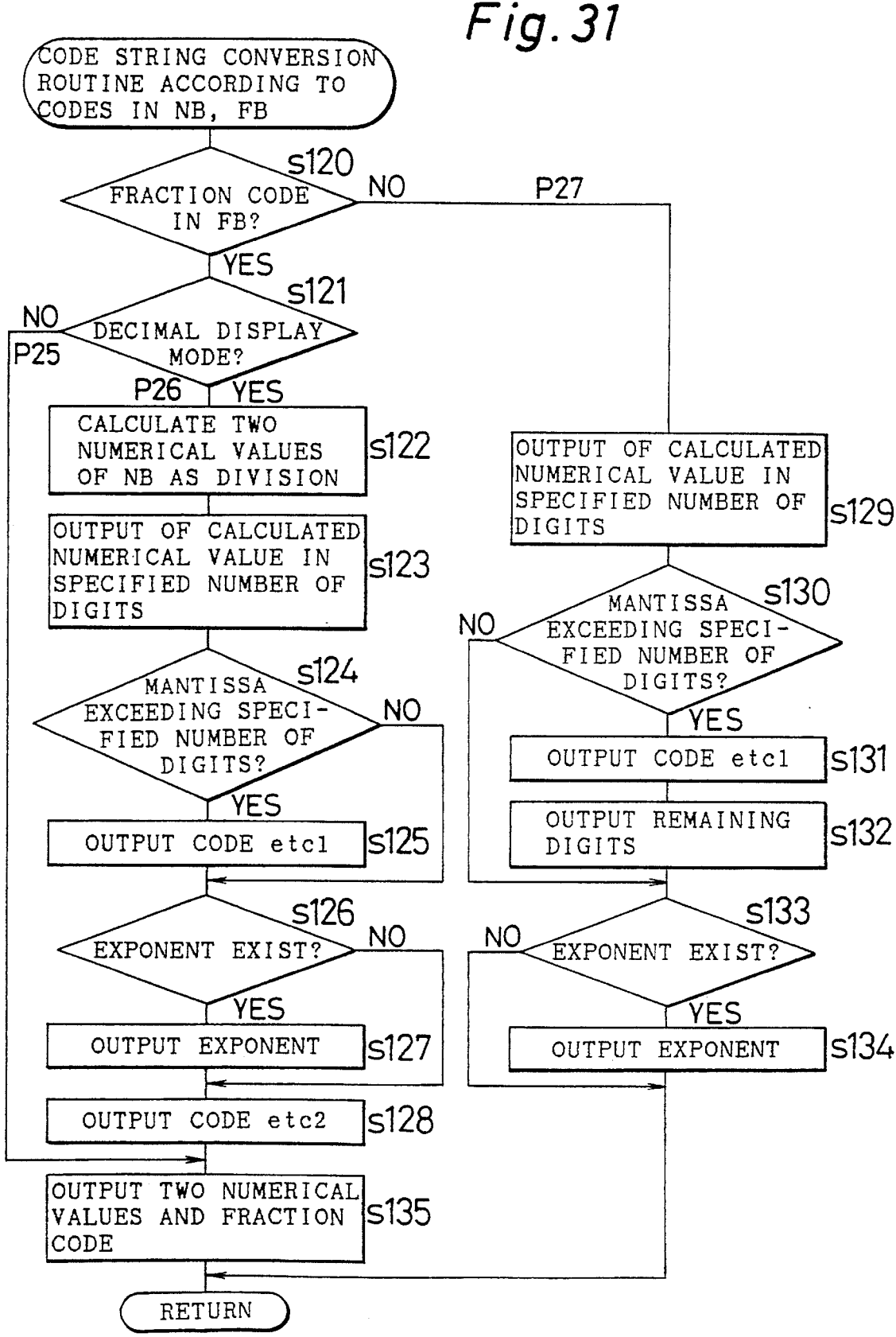
FIG. 31 is a flow chart of processing of output of a code stored in a function buffer or numerical buffer into a process buffer of the embodiment.

FIG. 31 is a flow chart of processing for output of the code stored in the function buffer 3e or numerical value buffer 3d of the embodiment into the process buffer 3c. This processing is one called in the process of S75 in FIG. 14. At the time of outputting a code from the numerical value buffer 3d or function buffer 3e into the process buffer 3c, any one of the processings P25 to P27 in the diagram is executed. Herein, the decimal display mode and fraction display mode are assumed as display mode of numerical value.

P25 is a processing to be passed when the fraction code "/" is stored in the function buffer 3e (YES at s120) and when the fraction display mode is specified (NO at s121). In this processing, according to the code stored in the function buffer 3e and numerical value buffer 3d, the fraction is directly produced into the process buffer 3c (s135), thereby returning to the process of S75 in FIG. 14.

P26 is a processing that is passed when the fraction code "f" is stored in the function buffer 3e (YES at s120) and in the case of decimal display mode (YES at s121). In this processing, the fraction formula for assuring the operation precision is held inside the calculator, and the process formula is displayed in decimal in the LCD 2, and firstly the two values stored in the numerical value buffer 3d are divided (s122), and the numerical value obtained as a result of division is outputted into the process buffer 3c (s12) for the preliminarily specified number of digits. Afterwards, if the mantissa is over the specified number of digits (YES), the code etc1 is issued to the process buffer 3c (s125), and if there is an exponent portion (YES at s126), the exponent portion is outputted to the process buffer 3c (s127), and in succession to the code etc2, the two numerical value codes in the numerical value buffer 3d and the fraction conforming to the fraction code "f" in the function buffer 3e are sent into the process buffer 3c (s128, s135), thereby returning to the process of S75 in FIG. 14. At this time, if the mantissa is not more than the specified number of digits (NO at s124), the code etc1 is not issued, and if the exponent is not present (NO at s126), the exponent portion is not issued.

P27 is a process that is passed when the fraction code "f" is no stored in the function buffer 3e (NO at s120). In the calculator, the calculation is performed while holding a number of digits capable of holding the operation precision, and the display to the LCD 2 is given in the decimal with the number of display digits omitted. Accordingly, when the calculated numerical value is outputted for the portion of the specified number of digits (s129), and the mantissa portion is present more than the specified number of digits (YES at s130), the code etc1 and the numerical code of the remaining digits are outputted to the process buffer 3c (s131, s132). Afterwards, when the exponent portion is present (YES at s133), the exponent portion is outputted to the process buffer 3c (s134), thereby returning to the process of S72 in FIG. 14. If the mantissa is present less than the specified number of digits (NO at s130), the code etc1 is not issued, and if the exponent portion is not present (NO at s133), the exponent portion is not outputted.

Figure 32:
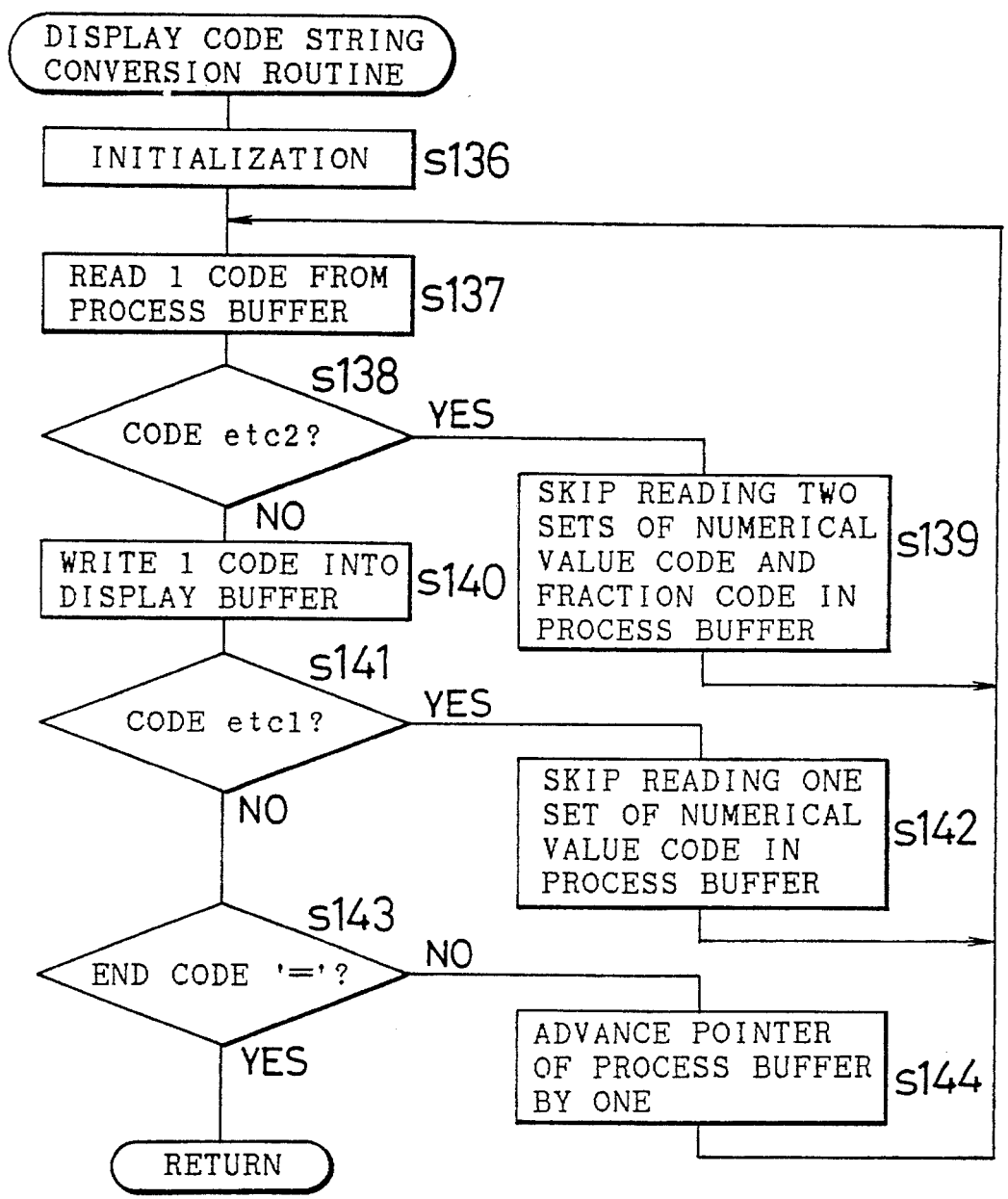
FIG. 32 is a flow chart for creating a code string for displaying of the embodiment.

FIG. 32 is a flow chart for creating a display code string of the embodiment. This flow chart is a processing for transferring the formula held in the processing buffer 3c into the display buffer 3a so as to be a formula to be displayed in the LCD 2, and it also includes the processing about the codes etc1 and etc2 which are special codes for assisting the numerical formula display inside the calculator.

First, the buffers and others are initialized (s136), and the codes are read-in one by one sequentially from the beginning of the process formula stored in the process buffer 3c (s137), and the read code is checked if special code or not (code etc1, code etc2 or code "="), and in the case of special code, the exclusive processing is done. For example, if the read code is code etc2 (YES at s138), this code etc2 and the subsequent two sets of numerical value codes and fraction code "f" are skipped (s139), and one next code is read-in from the process formula. ON the other hand, if the read code is not code etc2, such code is transferred to the buffer 3a (s140), and is checked if code etc1 or not (s141). If the code is etc1 (YES at s130), the one set of numerical value code following the code is skipped (s142), and next one code is read in from the process buffer 3c.

The code read from the process buffer 3c is judged to be end code "=" or not, and if otherwise (NO at s143), the pointer of the process buffer is advanced by one so that next one code is read in from the process buffer 3c. If the code read-in from the process buffer 3c is the end code "=", the operation returns to the upper processing.

In this way, when transferring the content of the process buffer 3c into the display buffer 3a, while the special code is checked, exclusive processing following the special code is executed, and the content of the process buffer 3c is processed and transferred into the display buffer 3a if the code is other than the special codes.

Figure 33:
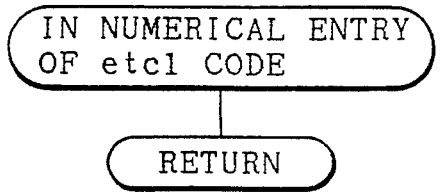
FIG. 33 is a flow chart of processing about the code etc1 in numerical code reading of the embodiment.
Figure 34:
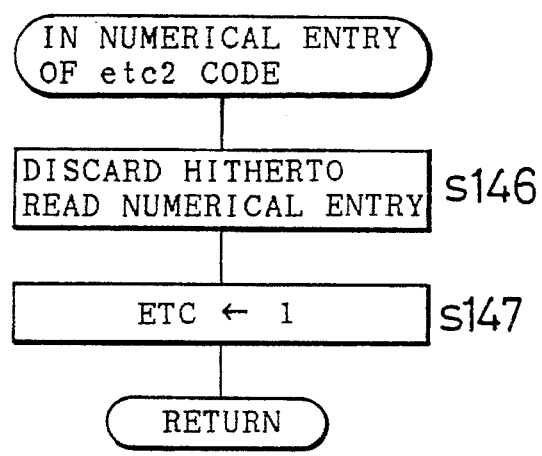
FIG. 34 is a flow chart of processing about the code etc2 in numerical code reading of the embodiment.

FIG. 33 is a flow chart of processing about the code etc1 in numerical code reading of the embodiment, and FIG. 34 is a flow chart of processing about the code etc2 in numerical code reading of the embodiment. The process in FIG. 33 is called when the code etc1 is read when processing the operation while reading the code from the process formula in the process buffer 3c. As mentioned above, the code etc1 shows that the numerical value code in the further lower digit of the numerical code put before the code is present successively behind the code etc1, and therefore when the code etc1 is read, the operation returns to the upper processing for reading the next code. Thus, the read code etc1 is discarded.

The process in FIG. 34 is called when the code etc2 is read when the code is read for next operation from the process formula. As mentioned above, the code etc2 indicates that the code string positioned thereafter is the numerical values in the other more accurate display format, and as the code etc2 is read, the hitherto read numerical value code is ignored (s146), and the flag ETC showing that the read numerical value code is ignored is set by using value 1 (s147), and thereby the processing step is returned to the upper processing for reading the next code from the process buffer 3c.

The function F5-c is described below. For example, when a schoolchild calculates a formula using an irrational number in study, the moment the irrational number occurs, this irrational number is rounded or discarded to a certain number of digits, and the operation is continued. For example, in approximation, $2\pi$ is calculated as $2 \times 3.14 = 6.28$, and it is not that 6.28 is created by calculating $2 \times 3.14159 \ldots = 6.28318 \ldots$ in the calculator and rounding when displaying in the LCD 2. Thus, depending on the manner of rounding of numerical value, a difference may be caused in the results of two operations. To the contrary, contradiction in the results may be voided by rounding similarly in both ordinary operation and in process operation for determining the process formula, upon every operation. For example, when the formula "1/7×3=" is operated when specifying the number of display digits below the decimal point to be 3, the process formula display and ordinary operation result are as follows: p Process formula display: ÷7×3=0.142×3=0.425

Ordinary operation result: 13=0.426

To realize the function F5-c, after execution of all operation processes, rounding is effected if it is necessary to round off the result of operation itself, but not effected otherwise. In actual processing, the operation result obtained by each operation may be rounded. When the ordinary operation and process formula creation are rounded alike, both operations undergo exactly the same process, so that no difference is caused between the two results.

As its application, it is also possible to select mode changeover of whether or not to round. Various rounding methods are considered, including the method of conforming to the specification of number of display digits of LCD2, the method of matching with the predetermined format from the format of the number, and the method of rounding off, for example, the ratio π of the circumference of a circle to its diameter to 3.14 automatically regardless of the specification of the number of display digits whenever determining the ratio π of the circumference of a circle to its diameter because it is specified as 3.14 in school textbooks. Or, instead of always rounding, by rounding-off only when an irrational number occurs, for example, without rounding-off in processing of addition, subtraction or multiplication, by rounding only when an irrational number in division process, it is possible to approach to the operation processing of a higher learning effect.

Figure 35A:
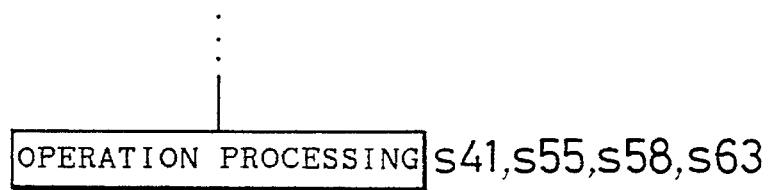
FIGS. 35A, 35B are flow charts for explaining the case of rounding process in every operation processing of the embodiment.
Figure 35B:
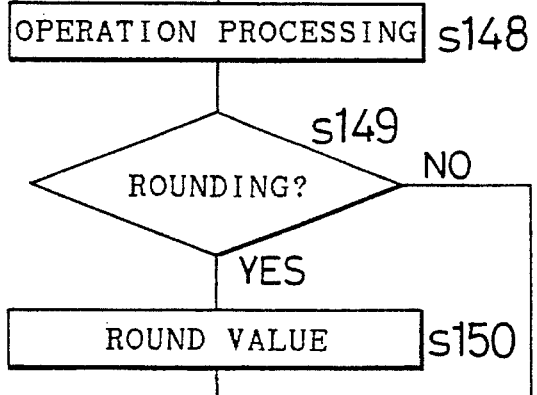

FIGS. 35A and 35B are flow charts for explaining the case of rounding process in every operation processing in the embodiment. When specifying the rounding mode, for example, by pressing − (minus) key 15 in succession to "fix" key 14 of the key board 1, the rounding mode is set, and it is assumed, to the contrary, that the non-rounding mode is set by pressing + (plus) key 16 after the "fix" key 14. In the case of rounding processing in consideration of the rounding mode, in the operation processing in each flow chart in FIGS. 8, 10 and 11, the process flux as shown in FIG. 35A is improved as shown in FIG. 35B. In FIG. 35B, if any operation processing is done in the ordinary operation even during operation for making a process formula (s148), by judging according to the rounding mode specified whether or not to round in each operation (s149), it is instructed to perform rounding processing (s150) when the rounding mode is specified.

Function F6 is a function for producing an arbitrary process formula created until the result is obtained from the formula entered in the edit buffer 3b. The function F6 further comprises a function F6-a for storing which number is the process formula obtained at present counting from the inputted formula, and creating and outputting a desired process formula, and a function F6-b for storing in the process buffer 3c all process formulas created until the present process formula is obtained from the inputted formula, and arbitrarily selecting and outputting these process formulas.

In certain calculators, all process formulas can be simultaneously displayed on the same screen. Generally, however, it is difficult in a calculator to display all process formulas obtained from the inputted formula to the result simultaneously on the same screen because of the limitation of the display screen area. In function F6, to solve this problem, it is possible to display the process formula once created but removed from the display screen by calling again. By storing the number of times of processing by the function F6-a, the process formula obtained just before the process formula being displayed at present can be displayed. At this time, whichever the process formula of the present display may be as counted from the inputted formula, always the process formula one before is displayed. By the function F6-b, moreover, in spite of the process formula created before, the shortcoming of the function F6-a that it takes time to display the process formula is eliminated, and an arbitrary process can be displayed again at high speed.

By applying these functions, simultaneously with the process formula, the number of times of process of the corresponding process formula can be displayed, and by specifying the number to indicate the number of times, the process formula desired to be displayed again can be specified.

Concerning the function F6, suppose always one formula or value is displayed in the display screen of the LCD 2. First, storing which number is the process formula of the present display as counted from the inputted formula, the function of displaying by creating one process formula before or after is explained below.

Figure 36:
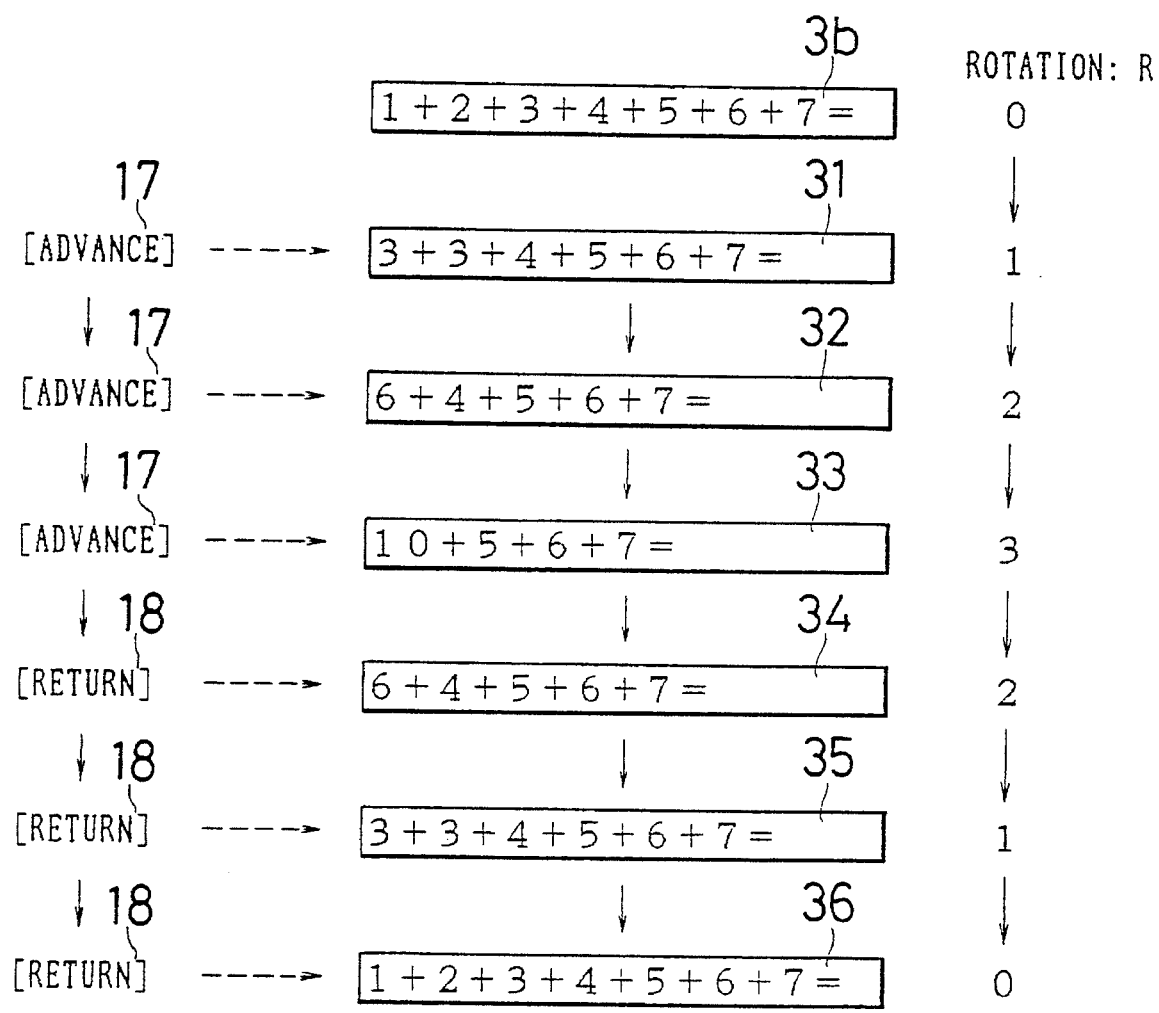
FIG. 36 is a diagram for explaining the display of a process formula controlled by key operation and the update of process processing times, in the process conforming to function F6-a of the embodiment.

FIG. 36 is a diagram for explaining the display of the process formula controlled by key operation and the updating of the number of times of processing, in the processing conforming to the function F6-a of the embodiment. Incidentally, it is assumed that the RAM 3 stores the number of times R indicating which number is the process formula being displayed at present as counted from the inputted formula.

When the user enters a certain formula, and the formula is stored in the edit buffer 3b, the number of times R is cleared (value 0 is set), and as the process is advanced by one, or, every time the "advance" key 17 in the calculation process indication key group 1d in the keyboard 1 is pressed, the number of times R is updated by −1. By pressing of "return" key 18, when the number of times R becomes value 0, it means that the inputted formula in the edit buffer 3b is displayed in the LCD 2. As shown in FIG. 36, an inputted formula "1+2+3+4+5+6+7=" is stored in the edit buffer 3b, and it is supposed that 0 is set in the number of times R. In FIG. 36, process formulas 31 to 36 are shown, and these process formulas are supposed to be stored while being overwritten on the same process buffer 3c. After storing the inputted formula into the edit buffer 3b, when the use presses the "advance" key 17, the process formula 31 is stored in the process buffer 3c, and the number of times R is updated by +1 only. When the "advance" key 17 is further pressed down, the process formula 32 is overwritten on the process buffer 3c, and the number of times R is updated by +1 to become 2. As the "advance" key 17 is pressed further, the process formula 32 is overwritten on the process buffer 3c and stored, and the number of times R is updated by +1 to become 3.

Next, when the user presses the "return" key 18, the number of times R is updated by '1 to become R=2, and the process is executed continuously R times, that is, two times according to the inputted formula stored in the edit buffer 3b. The process formula thus obtained, that is, the process formula 32 is overwritten on the process buffer 3c as the process formula 32 and stored. As the user further presses the "return" key 18, the number of times is updated by −1 to become 1, and the inputted formula in the edit buffer 3b is processed once according to the number of times R, and the process formula 31 is obtained, and this process formula 31 is stored in the process buffer 3c as the process formula 35. When the user moreover presses the "return" key 18, the number of times R is updated by −1 to be 0. The number of times R=0 means no process is done on the inputted formula, and hence the inputted formula in the edit buffer 3b is overwritten on the process buffer 3c as process formula 36, and stored.

In this way, the user can return to one process before by pressing the "return" key 18 to display the corresponding process formula, and can advance to the next process by pressing the "advance" key 17 to display the corresponding process formula.

In the method explained in FIG. 36, every time the key is pressed, it is necessary to repeat processing of the inputted formula stored in the edit buffer 3b by the number of times R, and it takes time until the result is obtained. In order to solve this problem, the function F6-b is used. This function is to store all process formulas created so far in the process buffer 3c, and these process formulas are selected as required and displayed. Therefore, in this function, it is not necessary to process the input formulas by the number of times R required, and a desired process formula can be displayed at high speed.

To realize the function F6-b, a buffer group comprising a plurality of process buffers $3c$ is provided on the RAM 3. If the memory capacity of the RAM 3 is sufficient, the number of process buffers assumed to be necessary can be preserved on the RAM 3, but if the memory capacity is not enough, when all preserved process buffers $3c$ are used up, the data in the process buffer $3c$ is erased so as to clear sequentially starting from the older (earlier) process formula, and newer (later) process formulas are stored therein. The following pointers are provided to indicate these plural process formulas.

Pointer NOW: The pointer to indicate the process buffer in which the presently displayed process formula is stored.

Pointer FIRST: The pointer to indicate the process buffer in which the oldest (earliest) process formula is stored in the process buffer group.

Pointer LAST: The pointer to indicate the process buffer in which the newest (latest) process formula is stored in the process buffer group.

These pointers are cleared when the user enters a formula and the inputted formula is stored in the edit buffer $3b$.

When the user presses the "advance" key 17, if the pointers NOW and LAST are indicating the same process buffer $3c$, the next process formula, that is, the new process formula is not present yet in the process buffer group, and the pointers NOW and LAST are advanced by one each, and a next process formula is created, and stored in the process buffer $3c$ indicated by the pointer NOW, and is displayed. As a result, if the pointers NOW and FIRST indicate the same buffer $3c$, the pointer FIRST is advanced by one, and indicates the buffer $3c$ in which a newer process formula is stored. Hence, the oldest process formula in the process buffer group at that moment is erased. Incidentally, when the 'advance" key 17 is pressed, if the pointer NOW indicates the buffer $3c$ storing the older process formula than the process formula in the buffer $3c$ indicated by the pointer LAST, the next process formula, or the newer process formula is already present in the process buffer group, and the pointer NOW is advanced by one, and the buffer in which a newer process formula is stored is indicated by the pointer NOW.

When the "return" key 18 is pressed down by the user, if the pointer NOW is indicating the buffer $3c$ storing the older process formula than the process formula in the buffer $3c$ indicated by the pointer FIRST, a process formula one step older than the process formula displayed presently is present in the process buffer group, and the pointer NOW is returned to indicate one position before, and the buffer $3c$ storing one older process formula is indicated by the pointer NOW. Meanwhile, in the case where the "return" key 18 is pressed, when the pointer NOW and pointer FIRST are indicating the same process buffer $3c$, the process formula displayed presently is the oldest process formula existing in the process buffer group, and any older process formula is not present in the process buffer group, so that the inputted formula of the edit buffer $3b$ can be displayed.

Figure 37A:
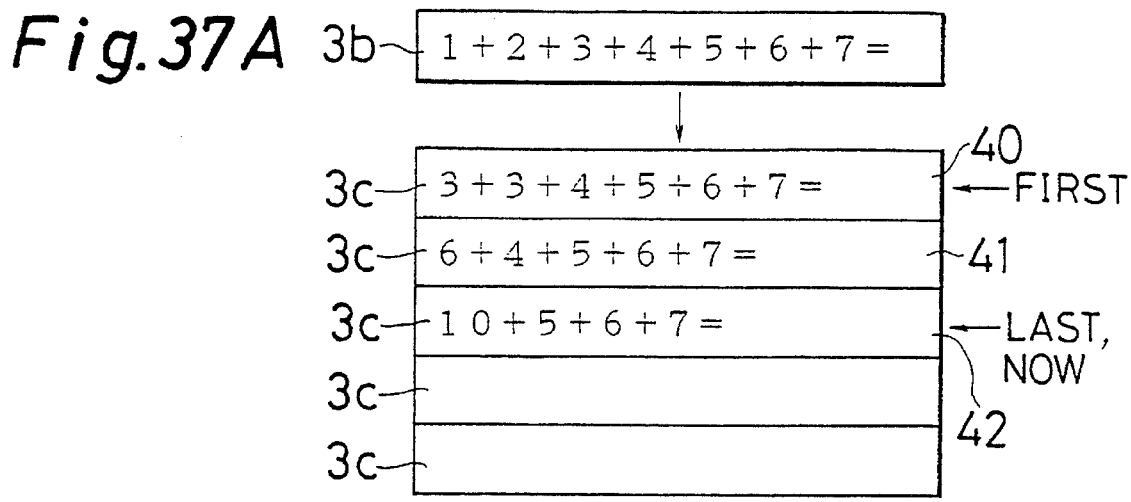
FIGS. 37A, 37B, 37C are diagrams for explaining the process of selecting an arbitrary formula from plural process formulas stored in a process buffer according to a key operation, in the process conforming to function F6-a of the embodiment.
Figure 37B:
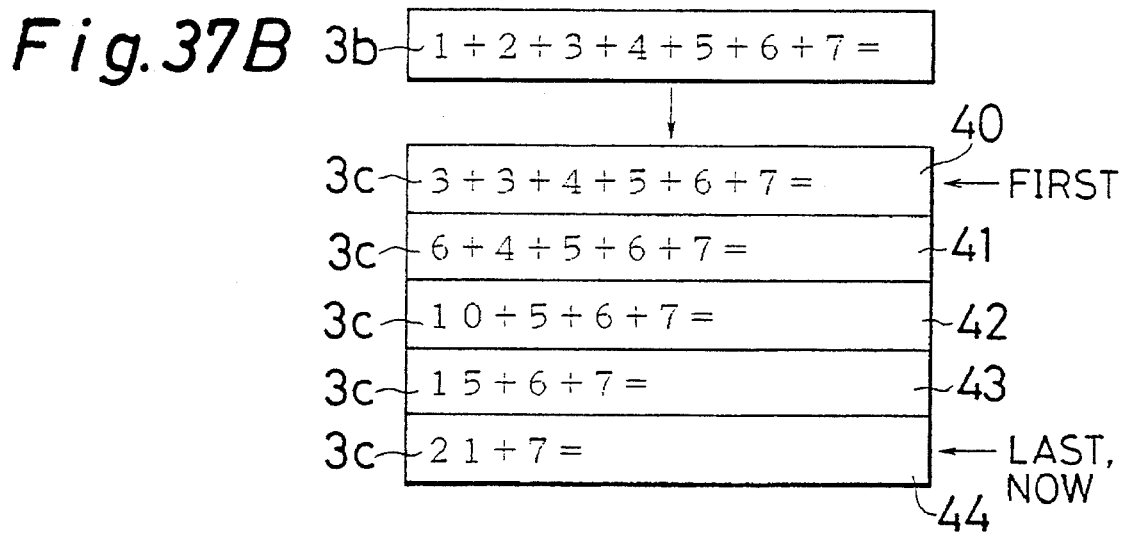
Figure 37C:
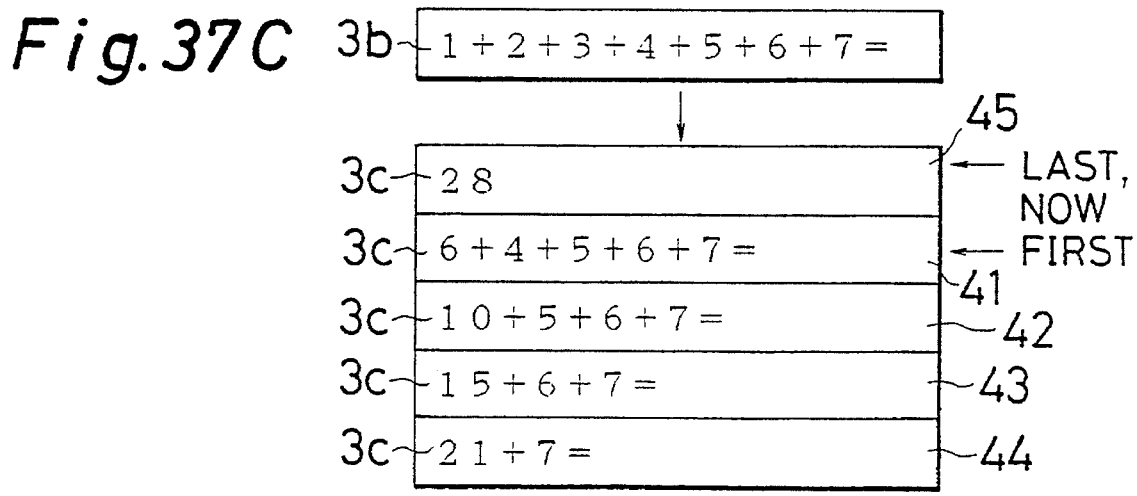

FIGS. 37A to 37C are diagrams for explaining the process for selecting an arbitrary formula from plural process formulas stored in the process buffer group according to the key operation in the process conforming to the function F6-b of the embodiment. In FIG. 37A, as the "advance" key 17 is pressed down three times successively by the user, the input formulas stored in the edit buffer $3b$ are sequentially converted into process formulas 40, 41 and 42, and are stored in the process buffer $3c$ in this order. Therefore, the pointer FIRST indicates the position of the process buffer $3c$ storing the process formula 40, and the pointers LAST and NOW indicate the position of the process buffer $3c$ storing the process formula 42.

From the state in FIG. 37A, when the user further presses the "advance" key 17 twice successively, process formulas 43 and 44 are sequentially obtained as shown in FIG. 37B, and stored sequentially from the next process buffer $3c$. At this time, the buffer $3c$ indicated by the pointer FIRST is not changed, but the pointers LAST and NOW are updated to indicate the process buffer $3c$ storing the process formula 44.

The state in FIG. 37B has no extra room for storing new process formulas as the process formulas are stored in all preserve process buffers $3c$. In this state, if the user further presses the "advance" key 17, the pointers LAST and NOW are updated to indicate the process buffer $3c$ storing the oldest process buffer 40 at this moment, and a next process formula 45 is stored herein. Accordingly, the pointer FIRST is updated to indicate the process buffer $3c$ storing the process formula 41. As the pointer FIRST indicates the buffer $3c$ storing the process formula 41, the process formula 40 is removed from the process buffer group.

As explained in FIGS. 36 and 37, in the function F6-a, as the value of the number of times R becomes larger, It takes a longer time in display of the process formula created one step before, and the function F6-b requires a large memory capacity in order to store all the process formulas created so far. Hence, the method having both functions is considered. The outline of the processing having these two functions is shown in FIGS. 38A and 38B.

Figure 38B:
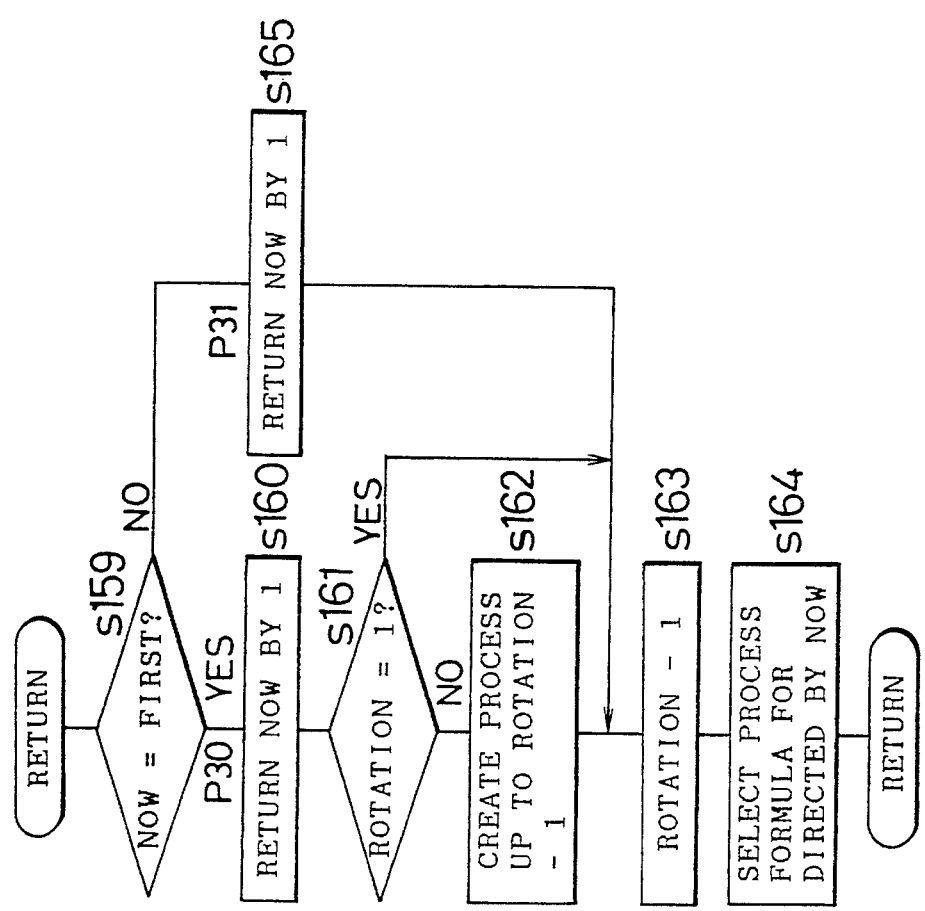
FIGS. 38A, 38B are flow charts of process having both functions F6-a and F6-b of the embodiment.
Figure 38A:
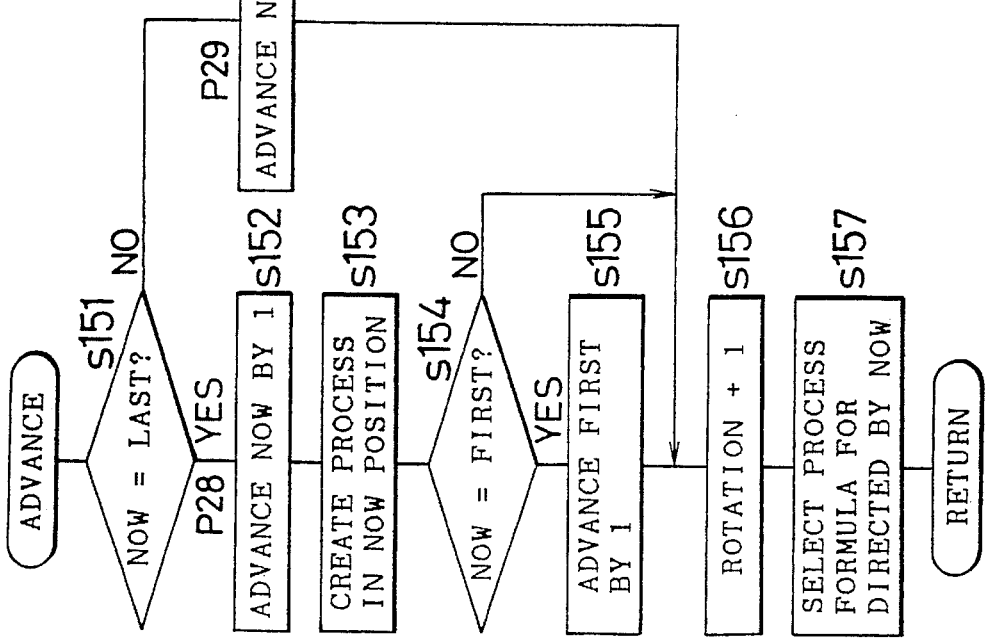

FIGS. 38A and 38B are flow charts for processing by combining the functions F6-a and F6-b of the embodiment. The processing in FIG. 38A is called at s5 in FIG. 4, and the processing in FIG. 38B is called at s6 in FIG. 4. Therefore, at s9 in FIG. 4, the formula selected in FIG. 38A or FIG. 38B is displayed.

When the "advance" key 17 is pressed by the user, as shown in FIG. 38A, it is first judged whether the pointer NOW and pointer LAST indicate the same process buffer $3c$ or not (s151). Depending on the result of this judgement, either the processing of creating newly because the next process formula of P28 is not present, or the processing of selecting an already existing process formula without newly creating process formula because the next process formula of P29 is already present is executed.

In process P28, the pointer NOW indicates the next process buffer $3c$, in which a new process formula is created and stored (s152, s153), and hence it is judged whether the pointer NOW and pointer FIRST indicate the same process buffer $3c$ or not (s154). At this time, if the pointer NOW and the pointer FIRST indicate the same process buffer $3c$, the pointer FIRST is advanced by one (s155), and the oldest process formula is erased from the process buffer group. Afterwards, the number of times R is updated by +1, and the process formula indicated by the pointer NOW is selected (s156, s157), thereby returning to the process at s5 in FIG. 4. In process P29, the pointer NOW is advanced by one (s158), and the number of times R is updated by +1 (s156), and the process formula indicated by the pointer NOW (in the process buffer $3c$) is selected (s157). Afterwards, the operation returns to the processing at s5 in FIG. 4.

When the "return" key 18 is pressed by the user, as shown in FIG. 38B, it is judged whether or not the pointer NOW and pointer FIRST are indicating the same process buffer 3c (s159). According to the result of this judgement, either process P30 or P31 is executed. Process P30 is a process for creating newly because one process formula older than the process formula being displayed presently is not present. First, the pointer NOW is returned to indicate the process buffer 3c one position before (s160), and it is judged if the number of times R is 1 or not (s161). If the number of times R is not 1 (NO at s161), the process is repeated by the number of times R–1 according to the inputted formula in the edit buffer 3b, and the process formula is created (s162), and the number of times R is updated by –1 (s163), and the process formula in the buffer 3c indicated by the pointer NOW is selected (s164). Afterward, the operation returns to s6 in FIG. 4. In the process of R31, the pointer NOW is returned to indicate one process buffer 3c before (s165), and the number of times R is updated by –1 (s163), and the process formula in the process buffer 3c indicated by the pointer NOW is selected (s164). Afterwards, the operation returns to s6 in FIG. 4.

In the embodiment, as plural expression formats for one numerical value, decimal display and fraction display are demonstrated, but the same processing can be applied to a numerical complex value having an ordinary expression format and a polar coordinate format.

Other embodiments of the invention are described below. When displaying the process formula, it is sometimes hard to know which portion of the formula is being operated. The next embodiment is hence intended to show which portion of the formula is being operated at the time of displaying a process formula.

FIGS. 39A–D is an diagram showing an example of data stored in the process buffer 3c and data for operation display. Herein, the operation display means displaying a formula portion operated and to be operated. Referring to FIGS. 39A–D, to control whether or not to under-score each process buffer 3c, two operation display data buffers 3ha and 3hb are prepared as shown at the right side of the process buffer 3c. In the upper operation display data buffer 3ha, data Da1 to Da4 showing the operated portions by underline are stored, and in the lower operation display data buffer 3hb, data Db1 to Db4 are stored to show the portions to be operated henceforth by underline. These operation display data buffers 3ha, 3hb are arrays having the same length as the process buffer 3c, and correspond 1:1 to the codes in the process buffer 3c. When displaying the formulas in the process buffer 3c, if the data corresponding to each code is 1, the underline is drawn, and if 0, the underline is not drawn.

FIGS. 40A–G is a diagram showing the relation between the operation display data shown in FIGS. 39A–D and a practical display format. Referring to FIGS. 40A–C, first in the formula displayed in the state shown in FIG. 40A, when the "advance" key 17 is pressed, the portion to be operated is indicated by the underline (see FIG. 40B). When the "advance" key 17 is further pressed, the portion of the result of operation is indicated by the underline (see FIG. 40C). Thereafter, the same operation is repeated.

FIG. 41 is a diagram showing the method of creating operation display data. Referring to FIG. 41, when creating a next process, on the operation display data Db0 of the present process in operation execution, the data of the portion corresponding to the code ("2×3") from LP to before IP is set as 1, and the data of the portion corresponding to the code ("6") of OP of the operation display data Da1 of the next process is set as 1.

Figure 42:
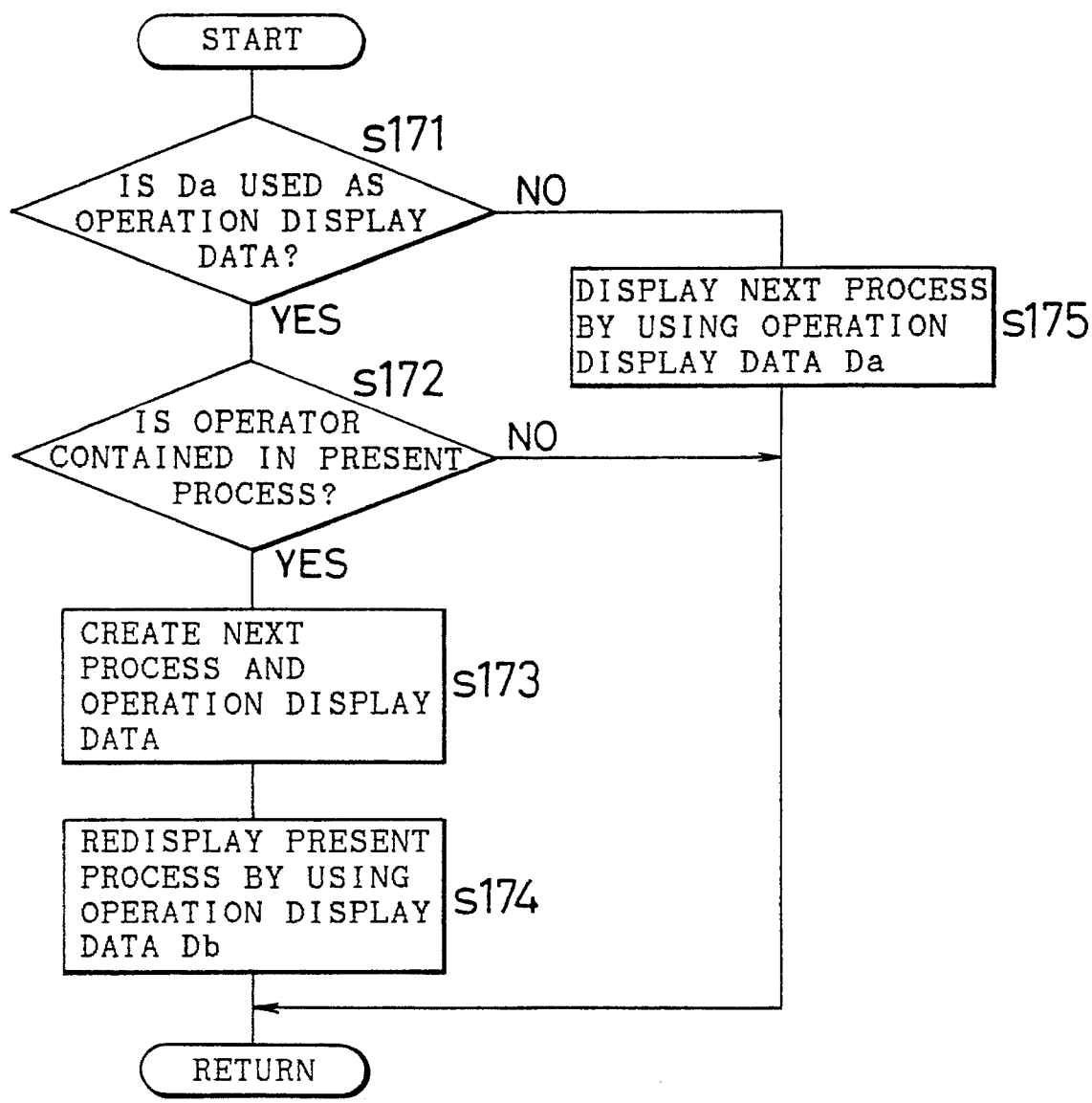
FIG. 42 is a flow chart showing the processing algorithm when a "advance" key is pressed.

FIG. 42 is a flow chart showing the processing algorithm when the "advance" key 17 is pressed. When the "advance" key 17 is entered, if the present process is displayed by using the operation display data D1 (the operated portion indicated by underline) (YES at s171), the operation display data Db of the present process, and the operation display data Da of the next process and further process are created (s173), and the present process is displayed again by using the operation display data Db (the portion to be operated henceforth is indicated by underline) (s174).

On the other hand, if the present process is displayed by using the operation display data Db (the portion to be operated henceforth is indicated by underline) (NO at s171), the next process is displayed by using the operation display data Da (the operated portion is indicated by underline) (s175).

Figure 43:
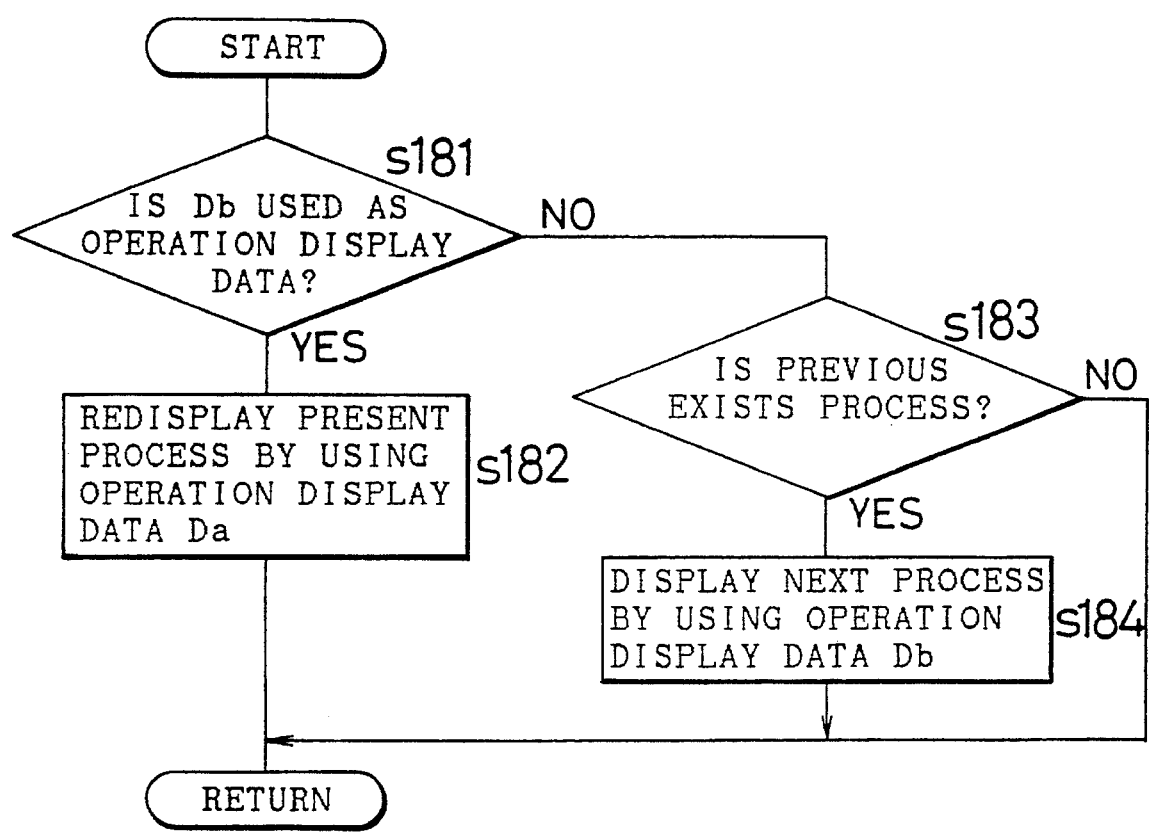
FIG. 43 is a flow chart showing the processing algorithm when a "return" key is pressed.

FIG. 43 is a flow chart showing the processing algorithm when the "return" key 18 is pressed. When the "return" key 18 is entered, if the present process is displayed by using the operation display data Da (NO at s181), the preceding process is displayed by using the operation display data Db (YES at s183, s184). On the other hand, if displayed by using the operation display data Db, the present process is displayed again by using the operation display data Da (YES at s181, s182).

Referring to FIGS. 39A–D and 40A–G, the above operation is described in detail below. First, the inputted formula is directly entered into the process buffer 3c as shown in FIG. 39A. At this time, the operation display data Da1 remains all zero. By these two actions, the inputted formula is displayed as shown in FIG. 40A.

When the "advance" key 17 is pressed, as shown in FIG. 41, the content of the process buffer 3c becomes as shown in FIG. 39B, and the value of the operation display data is as shown in Da2, Db2 at the same time. At this time, from the data DE2 in the process buffer 3c shown in FIG. 39A and the operation display data Db1, the formula showing a portion to be operated by underline is displayed as shown in FIG. 40B.

When the "advance" key 17 is further pressed, from the data DE2 in the process buffer shown in FIG. 39B and the operation display data Da2, the formula showing the operated portion by underline is displayed as shown in FIG. 40C. This job is repeated every time the "advance" key 17 is pressed until the final answer of the formula is obtained.

If the "return" key 18 is pressed, the display is returned to the original from the content of the process buffer 3c created so far and the operation display data.

A further different embodiment of the invention is described below. This relates to a learning function, that is, the operated portion is indicated by symbol when displaying a process formula, the user enters the value, and if the answer is correct, the user can advance to the next process.

FIGS. 44A–F shows a diagram showing the case where the operation result in the process is inputted by the user. In the above embodiment, the operated portion is indicated by underline in the displayed formula, but in this embodiment, before displaying, the operation portion is replaced by the symbol of blank square, and the operation result is entered by the user.

Figure 44A:
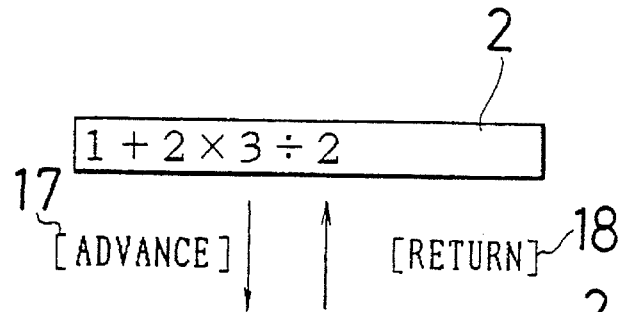
FIGS. 44A, 44B, 44C, 44D, 44ED, 44F are diagrams showing the input of the operation result by the user in the process.
Figure 44B:
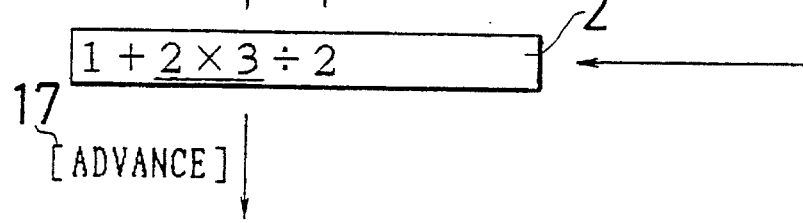
Figure 44C:
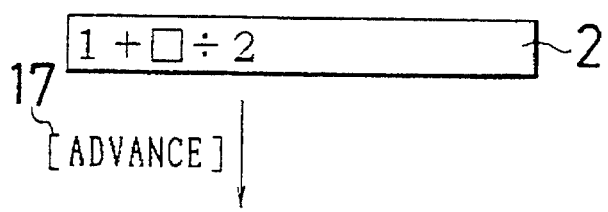

The example in FIGS. 44A–F is described specifically. First as shown in FIG. 44B, using the operation display data Db, suppose the portion to be operated is indicated by underline. At this time, when the "advance" key 17 is entered, the next process is displayed as shown in FIG. 44C by replacing the operation result with the blank square symbol by using the operation display data Da.

Figure 44D:
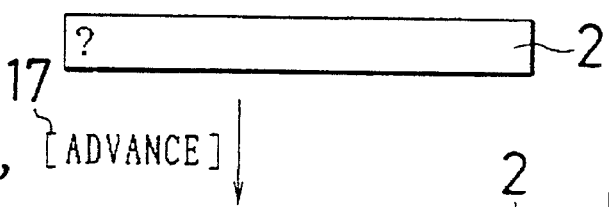
Figure 44E:
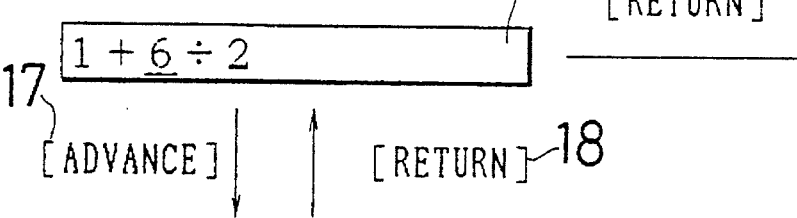
Figure 44F:
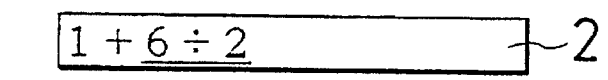

Next, as the "advance" key 17 is entered, "?" is displayed as shown in FIG. 44D, thereby waiting for the input of operation result. Herein, when a correct result "6" is entered as shown in FIG. 44, the operated portion is indicated by underline as shown in FIG. 44E. If a wrong result is entered, the display remains in the state shown in FIG. 44D, and the display in FIG. 44E does not appear unless the correct result is entered or only the "advance" key 17 is entered.

Figure 45:
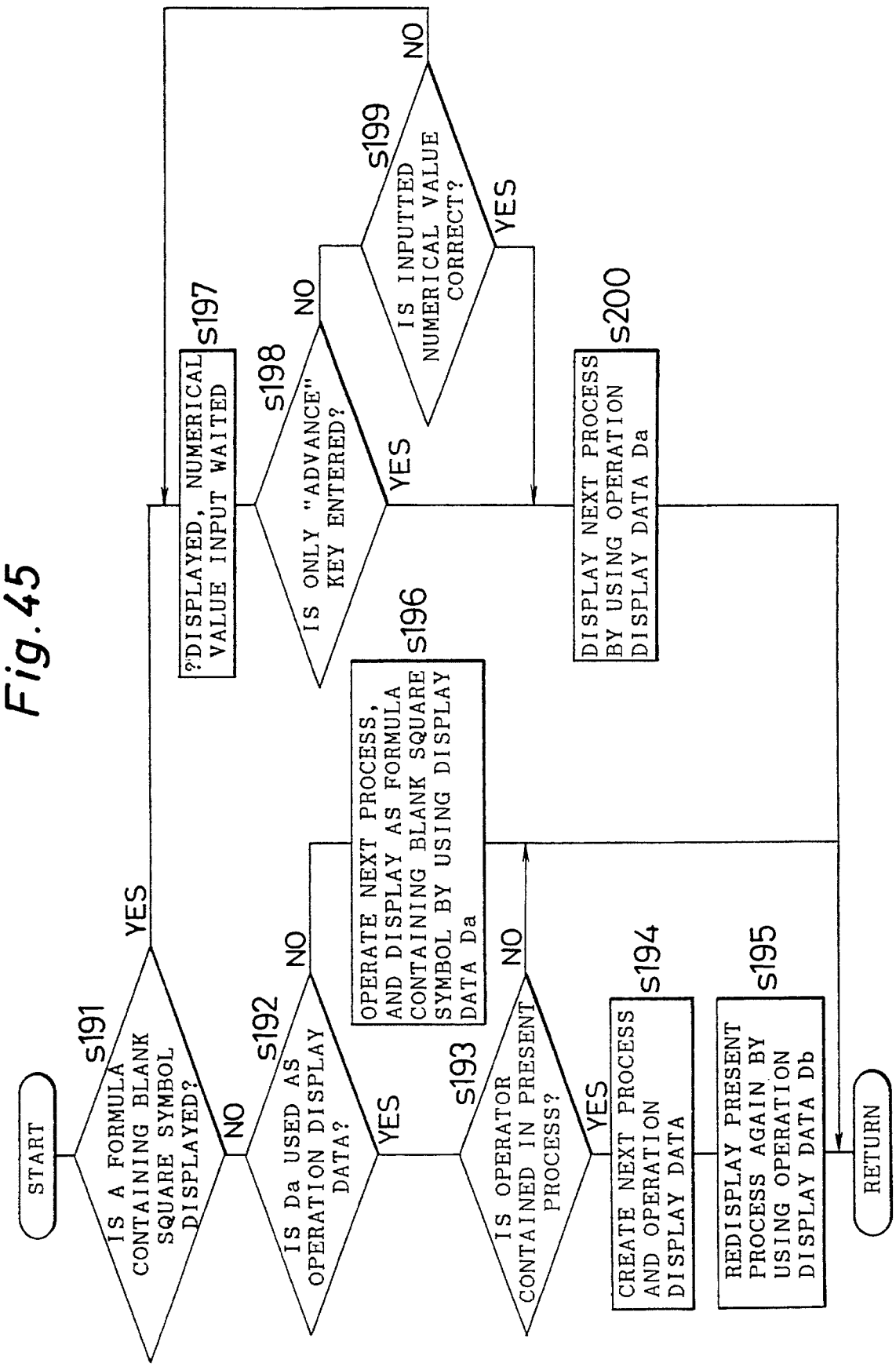
FIG. 45 is a flow chart showing the processing algorithm when the operation result is entered by the user.

FIG. 45 is a flow chart showing the processing algorithm of the "advance" key 17 for entering the operation result by the user shown in FIGS. 44A–F. Referring to FIG. 45, the process when the present process is displayed by using the operation display data Da is same as in the preceding embodiment (NO at s191, yet at s192, s193 to s195). However, when displaying by using the operation display data Db (NO at s192), the operated portion is replaced by the blank square symbol before indicating by underline when displaying the next process by the first "advance" key 17 operation (s196). When the "advance" key 17 is pressed next time (YES at s191), the operation waits until the user enters the operation result (s197). At this time, if only the "advance" key 17 is entered (YES at s198), the operation result is displayed in the formula shown by underline (s200).

Another different embodiment is described below. When the intermediate steps of calculating a numerical formula are being displayed, if the number of digits of numerical value operated inside the calculator is smaller than the number of digits displayed, a difference may be caused between the result of process and the result of ordinary operation. FIGS. 46A–E is a diagram showing an example of contradiction caused between ordinary operation and process, and an example of solving it. Referring to FIGS. 46A–E, suppose the calculator operates in 12 digits, and displays in 10 digits. The final operation result of the formula shown in FIG. 46A is 10. However, when 3.3333333333 is displayed as the result of $10/3$ in FIG. 46C, the digit carry-down has occurred, and the answer is 9.9999999999 in the final result shown in FIG. 46D. Accordingly, without displaying the process in FIG. 46C next to FIG. 46B, when the result of complete calculation of the formula in FIG. 46B is displayed as 10 as in FIG. 46E, the contradiction is eliminated.

The example in FIGS. 46A–E is specifically described. While displaying the process in FIG. 46B, when the "advance" key 17 is entered, "$10/3$" is operated, and the next process is created. The result of this operation in the calculator is 3.333333333333, being given in 12 digits. Hence, the newly created process in FIG. 46C is discarded, and the answer of the entire formula in FIG. 46B is operated, and 10 is displayed as answer as shown in FIG. 46E.

Figure 47:
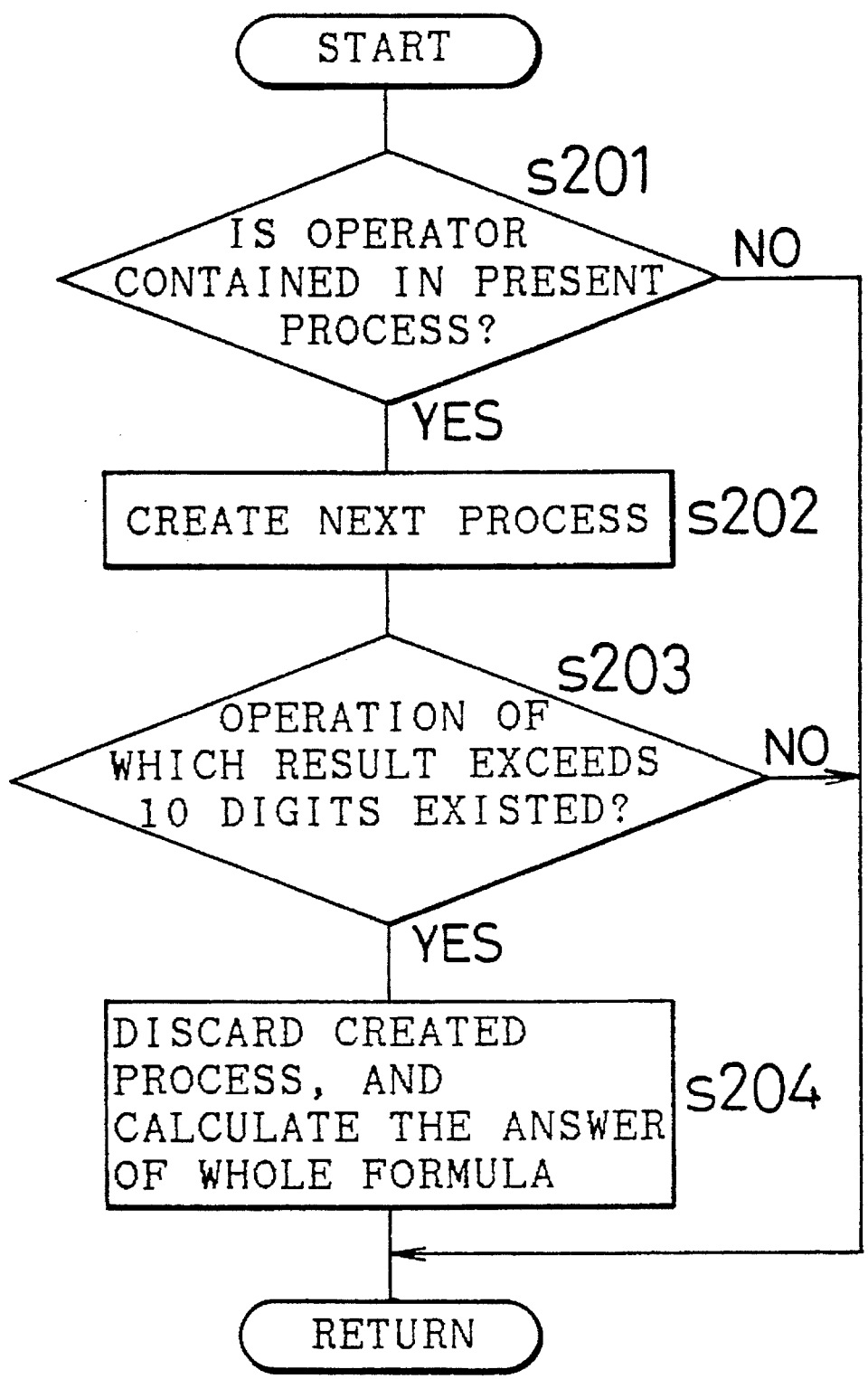
FIG. 47 is a flow chart showing the algorithm for eliminating the difference between the result of ordinary operation processing and the result of process processing.

FIG. 47 is a flow chart showing the algorithm for eliminating such difference. When creating a next process (YES at s201, s202), if there is an operation of which result exceeds 10 digits (YES at s203), the new process is discarded, and the entire formula is operated (s204).

A further different embodiment of the invention is described below. As the understanding of the users about the numerical formulas is advanced, the operating procedure may be understood without all steps of operation being displayed. Besides, if all steps of the process are displayed, the unnecessary portion for understanding the operating procedure increases, which may rather disturb the understanding. In the next embodiment, therefore, the showing of process steps may be freely varied depending on the degree of understanding of the users.

Figure 48A:
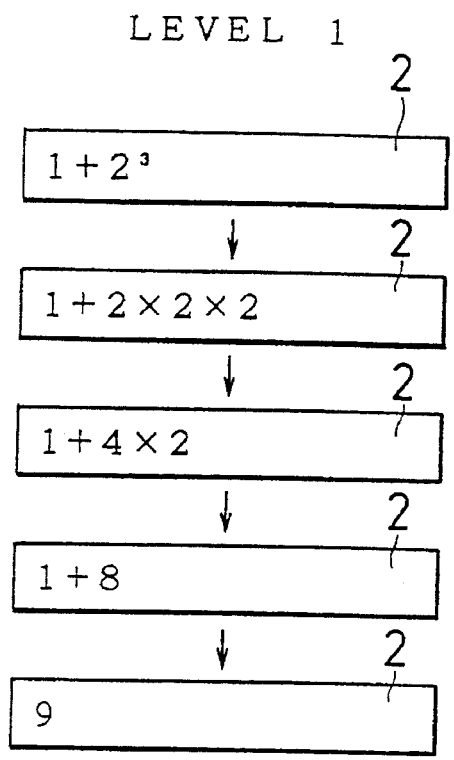
FIGS. 48A and 48B are drawings showing the difference in process when the level is set.
Figure 48B:
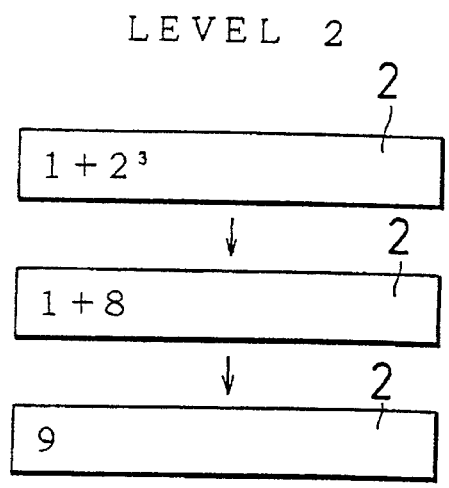
Figure 49:
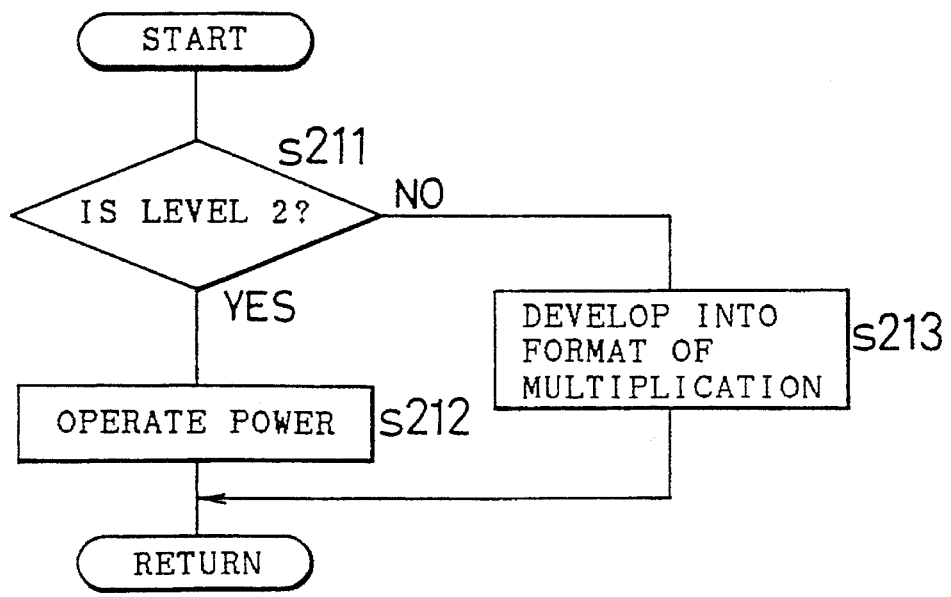
FIG. 49 is a flow chart showing the process for operation of power by judging the set level.

FIGS. 48A and 48B are diagrams showing the difference of the process depending on each level. As shown in FIG. 48A, in the process at level 1, the power calculation is developed in a format of multiplication operation, but at level 2, as shown in FIG. 48B, the power is directly operated. FIG. 49 is a flow chart showing the process of operating the power by judging the set level. At level 2, the power operation is executed (YES at s211, s212), and otherwise it is developed into a format of multiplication operation (NO at s211, s213).

When operating the power, conforming to the algorithm in FIG. 49, the two processes shown in the FIGS. 48A and 48B can be used selectively. This method can be applied to other operations such as fraction and root, and it is also possible to set in more minute levels.

A modified example of the foregoing embodiment is explained. When desired to change the process level, if the calculator can judge the level of understanding of each user, the user does not have to set the level each time.

Figure 50A:
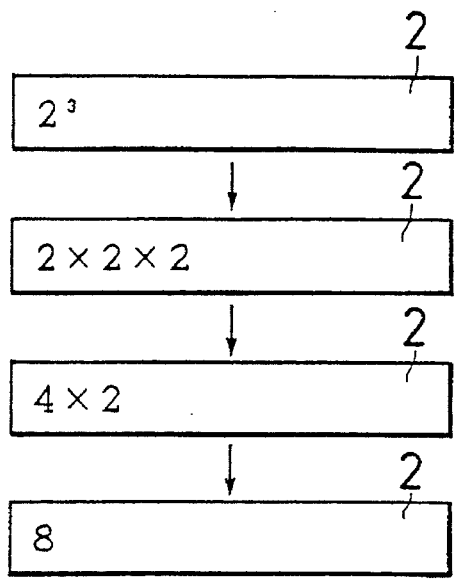
FIGS. 50A, 50B are diagrams showing the difference in process by the input method using the power.
Figure 50B:
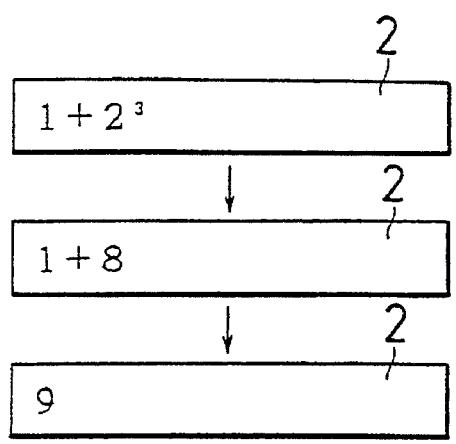

FIGS. 50A and 50B are diagrams showing the difference of process by inputted formula in the case of power operation. As shown in FIG. 50A, when the power operation is entered alone, it is developed into a format of multiplication and the process is displayed, but it is operated directly when the power is entered as a part of a formula as shown in FIG. 50B.

Figure 51:
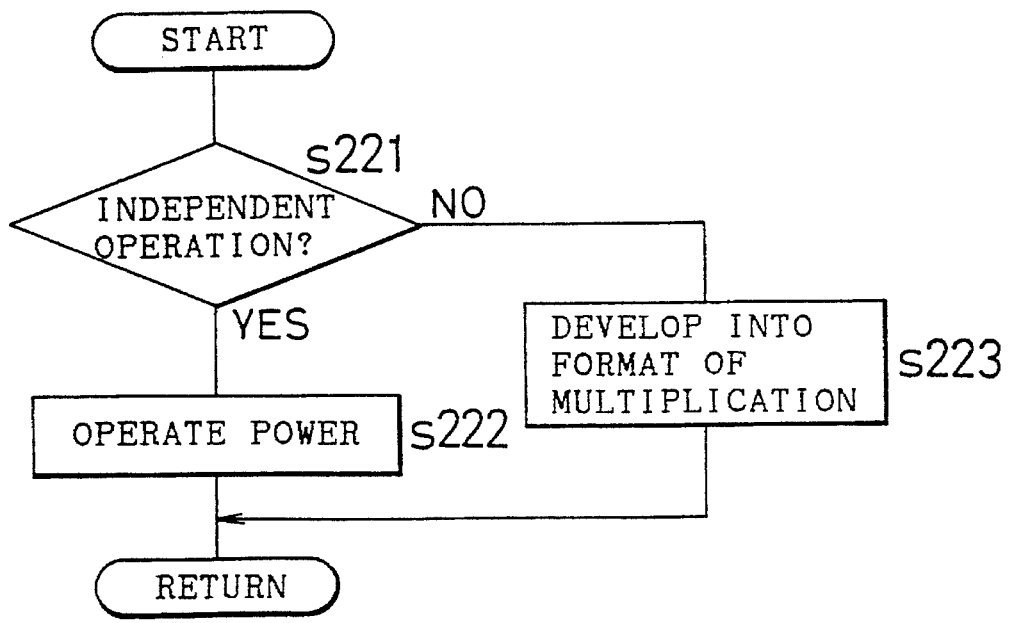
FIG. 51 is a diagram showing an example of operating the power by judging the degree of understanding by the user from the difference in input method.

FIG. 51 is a flow chart showing an example of operation of the power by judging the degree of understanding of the user by the calculator depending on the difference of inputted formula. When operating the power, depending on whether entered alone or not, the degree of understanding of the user about the power operation is judged (s221). When entered alone (YES at s221), it is judged that the understanding of the user about the power operation is not sufficient, and it is developed into a form of multiplication (NO at s221, s223). Otherwise (YES at s221), it is judged that the user understands the power operation sufficiently, thereby operating directly (s222).

By conforming to the algorithm in FIG. 51 when operating the power, two methods of operation may be selectively used as shown in FIGS. 50A and 50B. This method can be applied in other operations such as fraction and root, and by further minute condition divisions, an optimum process is possible for various input formulas.

Figure 52:
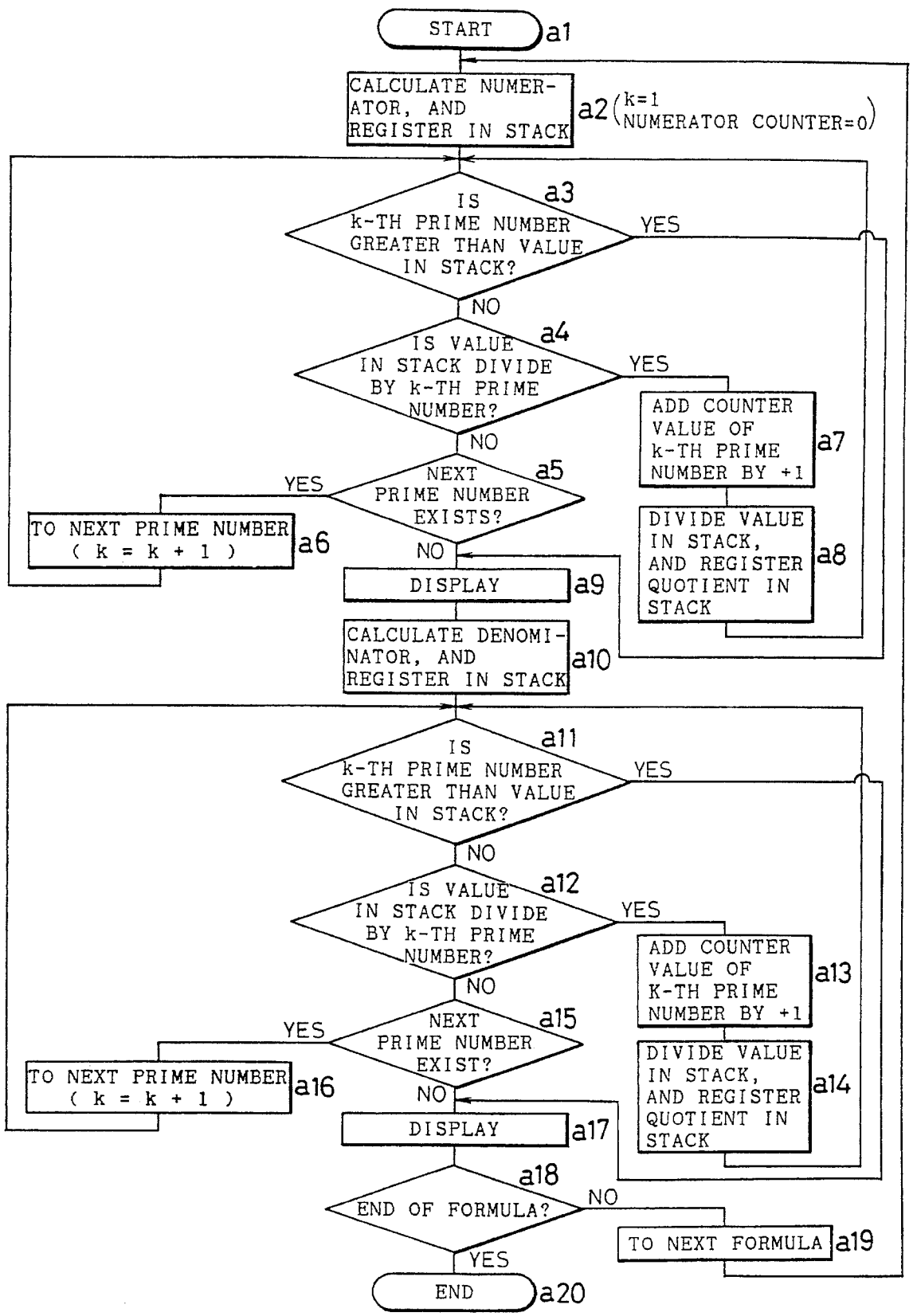
FIG. 52 is a flow chart showing the processing content for factorization of a fraction into prime factors in the calculator shown in FIG. 1.
Figure 53:
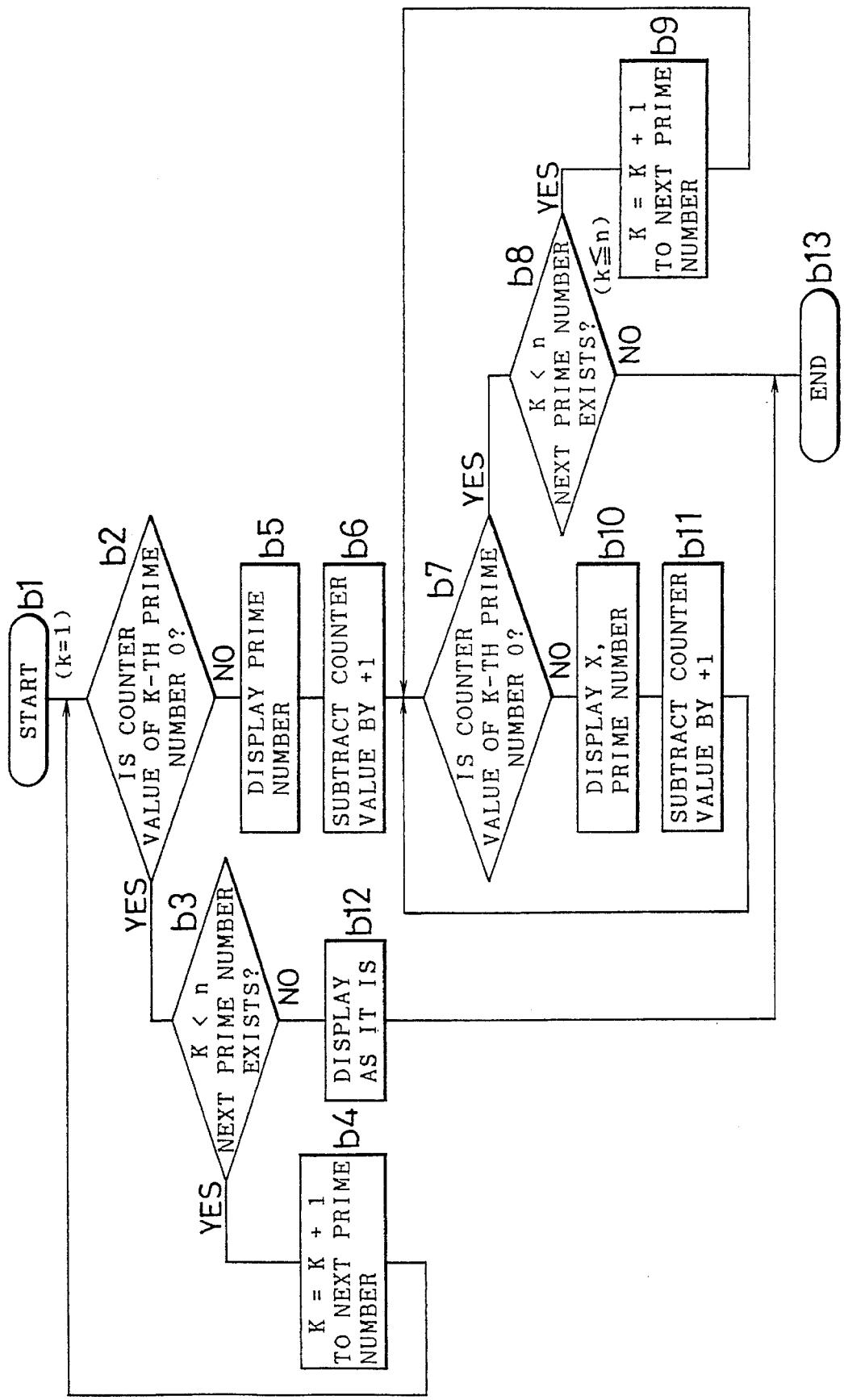
FIG. 53 is a flow chart showing the processing content for displaying the fraction factorized into prime factors.

FIG. 52 is a flow chart showing the process of factorizing a fraction into prime factors by the calculator shown in FIG. 1, and FIG. 53 is a flow chart showing the processing flow displaying the fraction factorized into prime factors. FIGS. 54A and 54B are diagrams showing the table indicating the prime numbers in the process of factorization into prime factors, and values of the counter for calculating the numbers, FIGS. 54A shows a numerator counter table 3*e*, and FIG. 54B shows a denominator counter table 3*j*. The numerator counter table 3*i* and denominator counter table 3*j* are preliminarily provided for n prime numbers, and the memory storing these counter tables is provided in the predetermined region in the RAM 3.

FIG. 55 is a diagram showing the values of numerator counter table 3*i* and stack 3*k* in each step of processing of factorization into prime factors. The stack 3*k* is a memory region for temporarily storing the numerical value of the numerator, and it is provided in the predetermined region in the RAM 3. FIGS. 56A–D diagrams showing the values of denominator counter table 3*j* and stack 3*m* in each step of processing of factorization into prime factors. The stack 3*m* is a memory region for temporarily storing the numerical value of the denominator, and it is provided in the predetermined region in the RAM 3.

FIGS. 57A and 57B are diagrams showing each step of displaying the value according to the numerator counter table 3i for storing the result of factorization into prime factors. FIGS. 58A–D are diagrams showing each step of displaying the value according to the denominator counter table 3j for storing the result of factorization into prime factors.

For example, assuming to factorize the fraction 15/24 into prime factors, it is explained below according to the processing of the flow chart shown in FIG. 52. At step a1, the process is started by pressing a factorization key 19. At step a2, the numerator 15 of the fraction 15/24 is stored in the stack 3k as shown in FIG. 55A. At step a3, it is judged whether the k-th prime number in the numerator counter table 3i is greater than the value of the stack 3k or not. The value of k is initially set at 1, and therefore the first prime number 2 is judged to be greater than 15 in the stack 3k, and it is not greater, thereby going to step a4.

At step a4, it is judged if 15 in the stack 3k can be divided by the k-th (first) prime number 2 without remainder or not, and it is not, thereby going to step a5. At this time, since the value of the numerator counter in the numerator counter table 3i is initially set at all zero, the value of the numerator counter of prime number 2 remains set at 0.

At step a5, it is judged if the next prime number exists or not. As shown in FIG. 54, N prime numbers are registered preliminarily. In this case, the next prime number is present, and the value of k is added by +1 (k=k+1) at step a6 to become 2, and thereby the processing step is returned to step a3. At step a3, it is judged if the k-th (second) prime number 3 is greater than the value 15 in the stack 3, and it is not greater, thereby going to step a4. At step a4, it is judged if the value 15 in the stack 3k can be divided by the k-th (second) prime number 3 without remainder or not, and it is, and going to step a7, the value of the numerator counter of the k-th (second) prime number 3 is added by +1 a shown in FIG. 55B to become 1. Going to step a8, the value 15 in the stack 3k is divided by the k-th (second) prime number 3, and the quotient 5 is stored as the value of stack 3k, thereby returning to step a3.

Next, at step a3, it is judged if the k-th (second) prime number 3 is greater than the value 5 in the stack 3k, and it is not, thereby going to step a4. At step a4, it is judged if the value 5 of the stack 3k can be divided by the k-th (second) value or not, and it is not, thereby going to step a5. At step a5, it is judged if there is next prime number, and it is, thereby going to step a6, and the value of k is added by +1 (k=K+1) to become 3, thereby returning to step a3.

At step a3, it is judged if the k-th (third) prime number 5 is greater than the value 5 in the stack 3k, and it is not, thereby going to step a4. At step a4, it is judged if the k-th (third) prime number 5 can be divided by the value 5 in the stack 3k without remainder, and it is, thereby going to step a7. At step a7, as shown in FIG. 55C, the value of the numerator counter of the k-th (third) prime number 5 is added by +1 to become 1. Going to step a8, the value 5 of the stack 3k is divided by the k-th (third) prime number 5, and the quotient 1 is stored as the value of the stack 3k, thereby returning to step a3.

At step a3, it is judged if the k-th (third) prime number 5 is greater than the value 1 of the stack 3k or not, and it is, and the process for factorization of fraction into prime factors is terminated, thereby going to step a9. At step a9, since the process of factorization of fraction into prime factors is over, the result of the process is displayed in the display 2, according to the numerator counter table 3i shown in FIG. 55C in which it is stored.

The process at step a9 is shown in the flow chart in FIG. 53, and the following description is made by reference to the flow chart in FIG. 53. The process is started at step b1. At step b2, it is judged whether or not the value of the numerator counter of the k-th prime number in the numerator counter table 3i shown in FIG. 55C is 0. Since the value of k is initially set at 1, the value of the numerator counter of the first prime number 2 is judged to be 0 or not, and it is 0, thereby going to step b3, and it is judged if the next prime number exists. In this case, since the second prime number is 3, going to step b4, the value of k is added by +1 to become 2, thereby returning to step b2 so as to process on that prime number. At step b2, it is judged if the value of the numerator counter of the second prime number 3 is 0 or not, and it is not 0 as shown in the numerator counter table 3i in FIG. 55C, thereby going to step b5.

At step b5, as shown in FIG. 57A, the prime number 3 is displayed as numerator in the display 2, and at step b6, the value of the numerator counter of prime number 3 is subtracted by +1 to become 0.

Next, at step b7, it is judged if the value of the numerator counter of the k-th (second) prime number 3 is 0 or not, and it is not 0, thereby going to step b8. At step b8, it is judged if the next prime number exists or not. The next prime number exists in this case, and going to step b9, the value of k is added by +1, thereby returning to step b7 so as to process on the k-th (third) prime number.

At step b7, it is judged if the value of the numerator counter of the k-th (third) prime number 5 is 0 or not, and it is not 0 as shown in the numerator counter table 3i in FIG. 57A, thereby going to step b10. At step b10, as shown in FIG. 47B, "×" and the third prime number 5 are added as the numerator, and displayed in the display 2. At step b11, the value of the numerator counter of the prime number 5 is subtracted by +1 to become 0.

Returning next to step b7, it is judged if the value of the numerator counter of the third prime number 5 is 0 or not, and it is 0, going to step b8, and it is judged if the next prime number exists or not. The next prime number is present, going to step b9, the value of k is added by +1, and thereafter the same process is repeated up to the n-th prime number. As shown in FIG. 57B, in this case, the value of the numerator counter from the fourth to the n-th prime number is 0. After investigating up to the n-th, the n+1-th prime number is not found in the numerator counter table 3i, thereby going to step b13, and the processing is terminated. Herein, at step b3, if the next prime number is not present, the value of the numerator is displayed as it is.

In this way, the numerator value 15 is factorized into prime factors, and displayed in the display 2.

Referring again to FIG. 52, at step a10, as shown in FIG. 55A, the value 24 of the denominator of fraction 15/24 is stored in the stack 3m. At step a11, it is judged if the k-th prime number of the denominator counter table 3j is greater than the value of the stack 3m or not. Since the value of k is initially set at 1 at step a10, it is judged whether the first prime number 2 is greater than the value 24 in the stack 3m, and it is not, thereby going to step a12.

At step a12, it is judged if the value 24 of the stack 3m can be divided by the k-th (first) prime number 2 without remainder or not, and it is, thereby going to step a13, and, as shown in FIG. 56B, the value of the denominator counter of the k-th (first) prime number 2 is added by +1 to become 1. The value of the denominator counter of the denominator counter table 3i is initially set to all zero. Next, going to step a14, the quotient 12 of dividing the value 24 of the stack 3m by the k-th (first) prime number 2 is stored as the value of the stack 3m, thereby returning to step a11.

At step a11, it is judged if the k-th (first) prime number 2 is greater than the value 12 of the stack 3m or not, and it is not, thereby going to step a12. At step a12, it is judged if the value 24 of the stack 3m can be divided by the k-th (first) prime number 2 without remainder or not, and it is, thereby going to step a13, and as shown in FIG. 56D, the value of the denominator counter of the k-th (first) prime number 2 is added by +1 to become 3. Next, going to step a14, the value 6 of the stack 3m is divided by the k-th (first) prime number 2, and the quotient 3 is stored as the value of the stack 3m, thereby returning to step a11.

At step a11, it is judged if the k-th (first) prime number 2 is greater than the value 3 of the stack 3m or not, and it is not, thereby going to step s12. At step s12, it is judged if the value 3 of the stack 3m can be divided by the k-th (first) prime number 2 without remainder or not, and it is not, thereby going to step a15. At step a15, it is judged if the next prime number exists or not. The next prime number is present, and at step a16, the value of k is added by +1 (k=k+1) to become 2, thereby returning to step a11.

Again, at step a11, it is judged if the k-th (second) prime number 3 is greater than the value 3 of the stack 3m, and it is not, thereby going to step a12. Next, at step a12, it is judged if the value 3 of the stack 3m can be divided by the k-th (second) prime number 3 without remainder or not, and it is, thereby going to step a13, and, as shown in FIG. 56E, the denominator counter value of the k-th (second) prime number 3 is set to 1. Next, going to step a14, the value of the stack 3m is divided by the k-th (second) prime number 3, and the quotient 1 is stored as the value of the stack 3m, thereby returning to step a11.

Next, at step a11, it is judged if the k-th (second) prime number 3 is greater than the value 1 of the stack 3m or not, and it is, thereby going to step a17. At step a17, since the processing of factorization of the denominator into prime factors is terminated, the result of the processing is displayed in the display 2 according to the denominator counter table 3i shown in FIG. 56E in which it is stored.

The processing at step a17 is shown in the flow chart in FIG. 53, and it is explained below, referring to the flow chart in FIG. 53. The process starts at step b1. At step b2, it is judged if the value of the denominator counter of the k-th prime number of the denominator counter table 3i shown in FIG. 56E is 0 or not. The value of k is initially set at 1, and it is judged if the value of the numerator counter of the first prime number 2 is 0 or not, and it is not, thereby going to step b5. At step b5, as shown in FIG. 58A, the prime number 2 is displayed as the denominator in the display 2, and at step b6, the value of the denominator of prime number 2 is subtracted by +1 to become 2.

At step b7, it is judged if the value of the denominator counter of the k-th (first) prime number 2 is 0 or not, and it is not 0 as shown in FIG. 58A, thereby going to step b10. At step b10, as shown in FIG. 58B, "×" and the first prime number 2 are additionally displayed as the denominator in the display 2. At step b11, the value of the denominator counter of the prime number 2 is subtracted by +1 to become 1, thereby returning to step b7.

Next, at step b7, it is judged if the value of the denominator counter of the k-th (first) prime number 2 is 0 or not, and it is not 0 as shown in FIG. 58B, thereby going to step b10. At step b10, as shown in FIG. 58C, "×" and first prime number "2" are additionally displayed as denominator in the display 2. At step b11, the value of the denominator counter of the prime number 2 is subtracted by +1 to become 0, thereby returning to step b7.

At step b7, it is judged if the denominator counter of the second prime number 3 is 0 or not, and since it is 0, the processing step is transferred to step b8, and it is judged if the next prime number is present or not. Since the next prime number is present, the processing step is transferred to step b9, the value of k is added by +1, and the same processing is executed up to the n-th prime number. As shown in FIG. 58D, in this case, the value of the denominator counter from the third to the n-th prime number is 0. After investigating up to the n-th, the n+1-th prime number is not found in the denominator counter table 3i, thereby going to step b13, and the processing is terminated. Herein, if the next prime number is not present at step b3, the value of the denominator is displayed as it is.

In this way, the value 24 of the denominator is factorized into prime factors 2×2×2×3, and displayed in the display 2.

Referring again to FIG. 52, at step a18, if there is any fraction formula or not, and if there is other fraction formula, the next fraction formula is processed at step a19, and the process of steps a1 to a17 is repeated, and the fraction formula is factorized into prime factors. In this case, there is no other fraction formula, thereby going to step a20, and the processing of factorization into prime factors is terminated.

Figure 59:
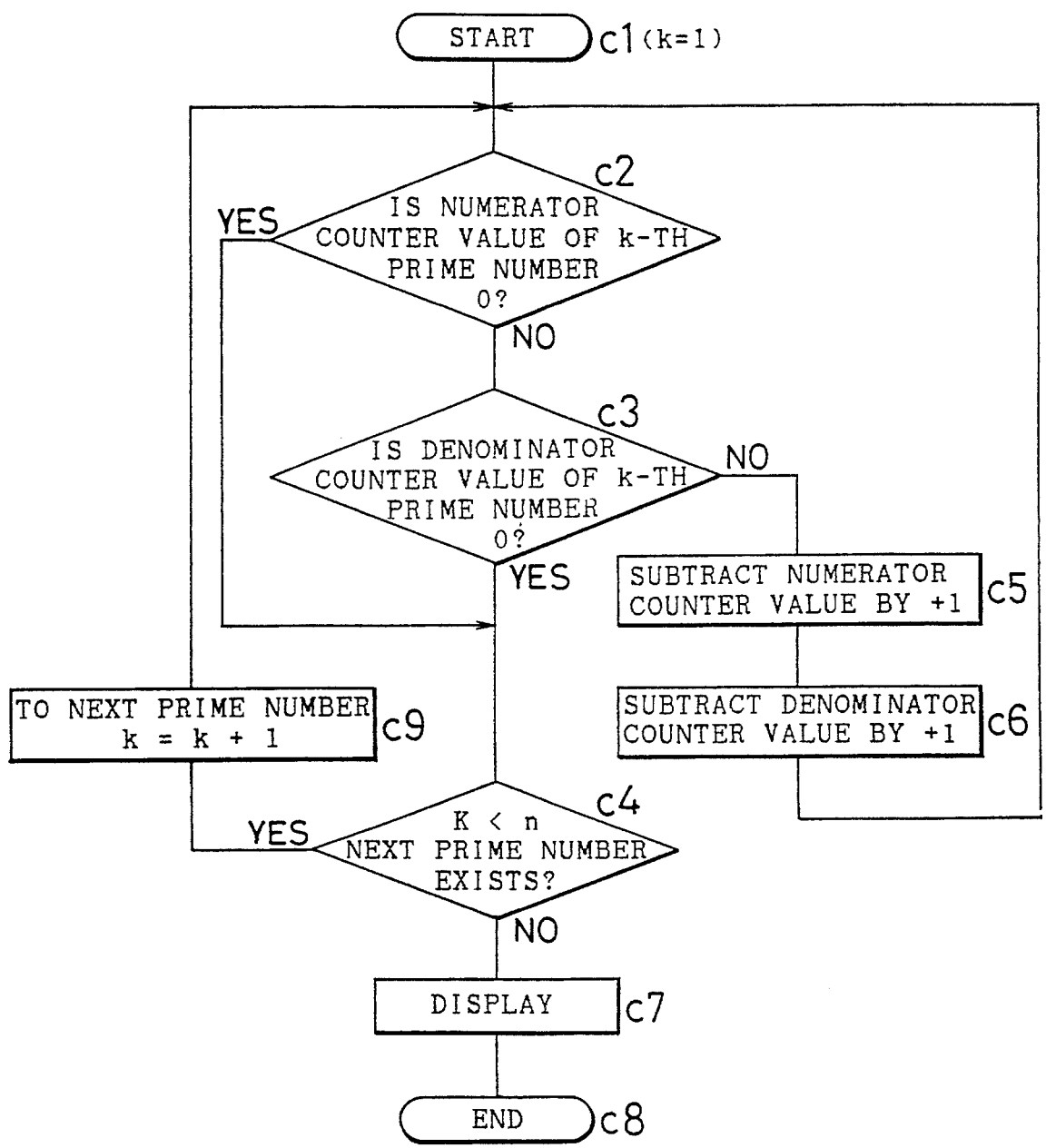
FIG. 59 is a flow chart for showing the processing content for reducing the fraction factorized into prime factors.

FIG. 59 is a flow chart showing the processing for reduction of the fraction factorized into prime factors. An example is described below according to the numerator counter table 3i and denominator counter table 3j shown in FIG. 60 by factorizing the fraction 15/24 into prime factors.

At step c1, by pressing a reduction key 20, the process is started up. At step c2, it is judged if the value of the numerator counter of the k-th prime number is 0 or not. The value of k is initially set at 1, and it is judged if the numerator counter of the first prime number 2 is 0 or not, and it is 0 as shown in FIG. 60A, thereby going to step c4. At step c4, it is judged if the next prime number is present in the numerator counter table 3i, and since the next prime number is present in the numerator counter 3l, the processing step is transferred to step c9, and the value of k is added by +1. Then the step is returned to step c2.

At step c2, it is judged if the value of the numerator counter of the k-th (second) prime number is 0 or not, and since it is not 0 as shown in FIG. 60A, the step is transferred to step c3. At step c3, it is judged if the value of the denominator counter of the k-th (second) prime number 3 is 0 or not, and since it is not 0 as shown in FIG. 60A, the step is transferred to step c5. At step c5, as shown in FIG. 60B, the value of the numerator counter of the prime number 3 is subtracted by +1 to be 0, and at step c5, the value of the denominator counter of the prime number 3 is subtracted by +1 to be 0.

Returning to step c2, it is judged if the value of the denominator counter of the k-th (second) prime number 3 is 0 or not. As shown in FIG. 60B, since it is 0, the operation goes to step c4. At step c4, it is judged if the next prime number exists in the numerator counter table 3i, and the next prime number is found in the numerator counter table 3i, thereby going to step c9, the value of k is added by +1, thereby returning to step c2.

At step c2, it is judged if the value of the numerator counter of the k-th (third) prime number 5 is 0 or not, and since it is not 0 as shown in FIG. 60B, the processing step is transferred to step c3. At step c3, it is judged if the vale of the denominator counter of the k-th (third) prime number 5 is 0 or not, and since it is 0 as shown in FIG. 60B, the processing step is transferred to step c4. At step c4, it is judged if the next prime number is present or not in the numerator counter table 3i, and there is next prime number, thereby going to step c9, and the value of k is added by +1, and thereafter the same process is repeated up to the n-th prime number. The n+1-th prime number is not present in the numerator counter table 3i, and processing of reduction of fraction is terminated, the processing steps is transferred to step c7. At step c7, according to the counter tables 3i and 3j where the processing of reduction of fraction shown in FIG. 60B has been terminated, "5/2×2×2" is displayed in the display 2 as shown in FIG 60c. Next, going to step c8, the processing is terminated.

Figure 61:
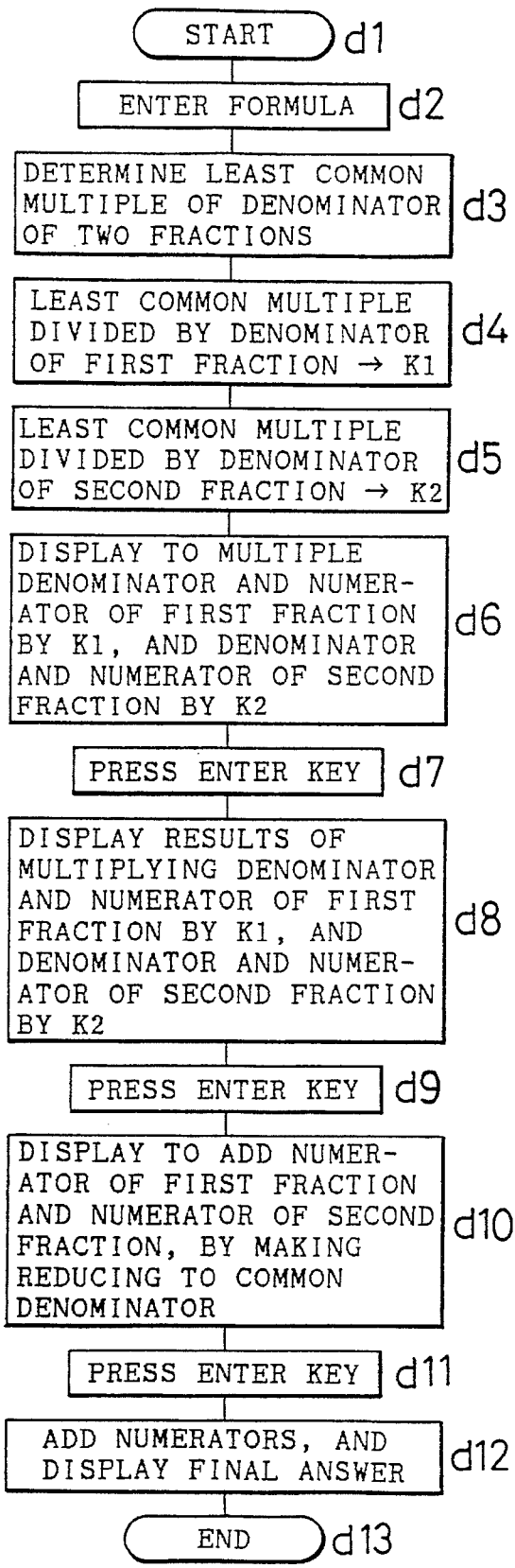
FIG. 61 is a flow chart showing the processing content for reduction to common denominator and addition of fraction formula in the calculator shown in FIG. 1.

FIG. 61 is a flow chart showing the processing for reduction of fraction formula into common denominator and addition in the calculator shown in FIG. 1, and FIG. 62 is a diagram showing the display content of the display 2. For example, calculation of fraction formula ½+⅓ is explained below while referring to the flow chart in FIG. 61.

The process is started at step d1. At step d2, the user manipulates the formula key group 1a shown in FIG. 4 to enter the fraction formula ½+⅓ to display in the display 2 as shown in FIG. 52A, and presses down the ENTER key 12, At step d3, the least common denominator 5 of two fraction ½ and ⅓ is calculated. At step d4, the least common denominator 6 is divided by the denominator 2 of the first fraction, and the value K1=3 is obtained, and at step d5, the least common denominator 6 is divided by the denominator 3 of the second fraction, and the value K2=2 is obtained.

At step d6, as shown in FIG. 62B, the denominator and numerator of the first fraction ½ are multiplied by K1=3, and the denominator and numerator of the second fraction ⅓ are multiplied by K2=2, and they are displayed. At step d7, the ENTER key 12 is pressed, and thereby the processing step is transferred to step d8, and the operation result at step d6 is displayed as shown in FIG. 62C.

At step d9, the ENTER key 12 is pressed, and thereby the step is transferred to step d10. The denominators are set common as shown in FIG. 62D, and thereby a display showing the addition of the numerator of the first fraction and the numerator of the second fraction is outputted. At step d11, the ENTER key 12 is pressed, and thereby the processing step is transferred to step d12, and as shown in FIG. 62E, the numerators are added, and the final calculation result 5/6 is displayed. The process is terminated at step d13.

Thus, by using the calculator of the invention, for example, when the factorization key 19 shown in FIG. 4 is pressed, the fraction is factorized into prime factors and displayed in the display 2, and therefore the configuration of the prime factors of the denominator and numerator of the fraction if known, and further by pressing the reduction key 20, the fraction is reduced according to the prime factors, and the process can be understood.

In the case of fraction, by using the numerical formula key group 1a (including ENTER key 12), the least common denominator of each fraction is obtained, and the denominators are made common, and the process until reaching the final operation result is sequentially displayed, so that the process of calculating a fraction formula can be understood. Therefore, by using this calculator, enormous educational achievements can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A calculator comprising:
    input means for inputting a numerical formula including at least one operator and at least one numerical value or at least one character representing a numerical value;
    a processor for processing the inputted numerical formula according to predetermined processing procedures and successively outputting a numerical formula showing a progress process in accordance with the progress of the processing and a calculation result of the inputted numerical formula; and
    a display for initially displaying the inputted numerical formula, and as processing progresses the successively outputted numerical formula showing a progress process and lastly the calculation result of the inputted numerical formula.

2. A calculator according to claim 1, wherein the numerical formula showing a progress process includes at least one operator and at least one numerical value or at least one character representing a numerical value.

3. A calculator according to claim 1, wherein the processor includes means that operate using an operator in the highest priority order of operation among the operators included in the inputted numerical formula or the numerical formula showing a progress process and creates a numerical formula showing a progress process.

4. A calculator according to claim 1, which further comprises mode selecting means for selecting a display mode of a numerical value, wherein the processor includes means for converting the display mode of the numerical value included in the inputted numerical formula or numerical formula showing a progress process on the basis of an output signal from the mode selecting means and creates a further numerical formula showing a progress process.

5. A calculator according to claim 1, wherein the processor includes means for converting the inputted numerical formula or numerical formula showing a progress process into a mathematical equivalent formula and creating a further numerical formula showing a progress process.

6. A calculator according to claim 4, wherein the processor includes means for storing the at least one numerical value included in the inputted a numerical formula or a numerical formula showing a progress process in a display mode having a highest mathematical accuracy regardless of the selected display mode of numerical value so that the inputted numerical formula, the numerical formula showing a progress process and the calculation result of the inputted numerical formula have an identical mathematical accuracy with that of each other.

7. A calculator according to claim 1, wherein the input means further comprises means for directing advance and return of processing in accordance with predetermined processing procedures, wherein the processor includes means that selects and outputs any one of the inputted numerical formula, the numerical formula showing a progress process and the operation result of the inputted numerical formula in correspondence to the output from the means for directing.

8. A calculator according to claim 1, wherein the processor includes means for outputting the inputted numerical formula or numerical formula showing a progress process together with first identification information showing an object to be next processed, and the display displays an object element to be next processed in a numerical formula to be displayed in a form different from that of other elements composing the numerical formula on the basis of the first identification information.

9. A calculator according to claim 1, wherein the processor includes means for outputting the inputted numerical formula of numerical formula showing a progress process together with second identification information showing a numerical value obtained by a directly preceding processing, and the display displays a numerical value obtained by a directly preceding processing in the numerical formula to be displayed in a form different from that of other elements composing the numerical formulas on the basis of the second identification information.

10. A calculator according to claim 9, wherein the display displays a predetermined character for a numerical value obtained by a directly preceding processing in the numerical formula to be displayed on the basis of the second identification information and displays the obtained numerical value instead of the predetermined character when a correct numerical value is inputted or inputting from the input means is executed by using a predetermined operation.

11. A calculator according to claim 1, wherein the number of character positions of a numerical formula which can be displayed in the display means is predetermined, and the processor includes means for outputting the calculation result of a numerical formula to be outputted instead of the numerical formula to be outputted when the number of character positions of the formula to be outputted exceeds the predetermined number thereof.

12. A calculator according to claim 1, which further comprises understanding level input means for inputting a user's understanding level of the inputted numerical formula, said processor includes means for selecting and batch-processing plural processes on the basis of the output from the understanding level input means from among the processes according to the predetermined processing procedures and creates a numerical formula showing a progress process.

13. A calculator according claim 1, wherein said processor includes means for selecting and batch-processing plural processes on the basis of the number and kind of operators included in the inputted numerical formula among processes according to the predetermined processing procedures and creates a numerical formula showing a progress process.

* * * * *